(12) United States Patent
Goodman et al.

(10) Patent No.: US 8,301,701 B2
(45) Date of Patent: Oct. 30, 2012

(54) CREATING DYNAMIC INTERACTIVE ALERT MESSAGES BASED ON EXTENSIBLE DOCUMENT DEFINITIONS

(75) Inventors: Brian D. Goodman, New York, NY (US); Frank Jania, Norwalk, CT (US)

(73) Assignee: International Business Machines Corporation, Armonk, NY (US)

( * ) Notice: Subject to any disclaimer, the term of this patent is extended or adjusted under 35 U.S.C. 154(b) by 1019 days.

(21) Appl. No.: 10/685,860

(22) Filed: Oct. 15, 2003

(65) Prior Publication Data

US 2004/0128353 A1    Jul. 1, 2004

Related U.S. Application Data

(63) Continuation-in-part of application No. 10/207,685, filed on Jul. 26, 2002.

(51) Int. Cl.
   *G06F 15/16*    (2006.01)
(52) U.S. Cl. ........................................................ 709/206
(58) Field of Classification Search ................... 709/206
   See application file for complete search history.

(56) References Cited

U.S. PATENT DOCUMENTS

| | | | |
|---|---|---|---|
| 5,636,344 A | 6/1997 | Lewis | 395/200.11 |
| 5,778,367 A | 7/1998 | Wesinger, Jr. et al. | |
| 5,870,552 A | 2/1999 | Dozier et al. | |
| 5,893,911 A | 4/1999 | Piskiel et al. | |
| 5,915,240 A | 6/1999 | Karpf | 705/2 |
| 6,018,716 A | 1/2000 | Denardo et al. | 705/7 |
| 6,018,730 A | 1/2000 | Nichols et al. | 706/45 |
| 6,028,601 A | 2/2000 | Machiraju et al. | 346/336 |
| 6,128,655 A | 10/2000 | Fields et al. | |
| 6,138,120 A | 10/2000 | Gongwer et al. | 707/10 |
| 6,154,781 A * | 11/2000 | Bolam et al. | 709/238 |
| 6,158,007 A | 12/2000 | Morch et al. | |
| 6,185,603 B1 * | 2/2001 | Henderson et al. | 709/206 |
| 6,209,100 B1 | 3/2001 | Robertson et al. | |
| 6,223,165 B1 | 4/2001 | Lauffer | 705/8 |
| 6,226,359 B1 * | 5/2001 | Montgomery et al. | 379/67.1 |
| 6,236,991 B1 | 5/2001 | Frauenhofer et al. | |
| 6,268,856 B1 | 7/2001 | Bruck et al. | |
| 6,286,001 B1 * | 9/2001 | Walker et al. | 707/9 |
| 6,301,609 B1 | 10/2001 | Aravamudan et al. | |
| 6,324,587 B1 | 11/2001 | Trenbeath et al. | |

(Continued)

FOREIGN PATENT DOCUMENTS

EP    1130845 A2    9/2001

(Continued)

OTHER PUBLICATIONS

Microsoft Corporation, Internet Explorer 4.0 Accessibility, Oct. 1997, Microsoft Corporation, p. 2 and 5.*

(Continued)

*Primary Examiner* — Brian P Whipple
(74) *Attorney, Agent, or Firm* — John E. Campbell; Floyd A. Gonzalez

(57) ABSTRACT

An unsolicited dynamic interactive message is created wherein the message defines any graphical user interface elements to be displayed, the rules associated with the message, the appropriate methods and functions which can be performed and specific contextual interactions supported. The message definition can originate from a local or remote computer and can be pre and post processed as specified by the computing environment and the message definition itself.

72 Claims, 28 Drawing Sheets

U.S. PATENT DOCUMENTS

| | | | |
|---|---|---|---|
| 6,341,960 B1 | 1/2002 | Frasson et al. ............... 434/322 |
| 6,421,709 B1* | 7/2002 | McCormick et al. ......... 709/206 |
| 6,438,580 B1 | 8/2002 | Mears et al. |
| 6,442,529 B1 | 8/2002 | Krishan et al. |
| 6,442,590 B1 | 8/2002 | Inala et al. |
| 6,477,708 B1 | 11/2002 | Sawa |
| 6,496,851 B1 | 12/2002 | Morris et al. |
| 6,519,629 B2 | 2/2003 | Harvey et al. |
| 6,535,586 B1 | 3/2003 | Cloutier et al. |
| 6,539,421 B1 | 3/2003 | Appelman et al. |
| 6,574,658 B1* | 6/2003 | Gabber et al. ............... 709/206 |
| 6,587,668 B1 | 7/2003 | Miller et al. |
| 6,609,103 B1 | 8/2003 | Kolls |
| 6,651,086 B1 | 11/2003 | Manber et al. |
| 6,677,968 B1 | 1/2004 | Appelman |
| 6,699,125 B2 | 3/2004 | Kirmse et al. |
| 6,732,101 B1 | 5/2004 | Cook |
| 6,750,881 B1 | 6/2004 | Appelman |
| 6,751,657 B1* | 6/2004 | Zothner ....................... 709/220 |
| 6,771,154 B1 | 8/2004 | Funayama et al. |
| 6,807,562 B1 | 10/2004 | Pennock et al. |
| 6,807,675 B1 | 10/2004 | Maillard et al. |
| 6,832,245 B1 | 12/2004 | Isaacs et al. |
| 6,941,345 B1 | 9/2005 | Kapil et al. |
| 6,981,223 B2 | 12/2005 | Becker et al. |
| 7,017,175 B2 | 3/2006 | Alao et al. |
| 7,073,129 B1 | 7/2006 | Robarts et al. |
| 7,124,167 B1 | 10/2006 | Bellotti et al. |
| 7,152,094 B1* | 12/2006 | Jannu et al. .................. 709/206 |
| 7,155,475 B2 | 12/2006 | Agnoli et al. |
| 7,194,004 B1 | 3/2007 | Thomsen |
| 7,209,964 B2 | 4/2007 | Dugan et al. |
| 7,287,057 B2 | 10/2007 | Lagarde et al. |
| 7,305,442 B1* | 12/2007 | Lundy ......................... 709/206 |
| 7,319,882 B2 | 1/2008 | Mendiola et al. |
| 7,539,763 B2 | 5/2009 | Toyota et al. |
| 7,596,578 B1 | 9/2009 | Marks |
| 2001/0034015 A1 | 10/2001 | Raichur et al. |
| 2001/0034763 A1* | 10/2001 | Jacobs et al. ................. 709/204 |
| 2001/0049721 A1 | 12/2001 | Blair et al. |
| 2001/0056422 A1 | 12/2001 | Benedict, Jr. et al. |
| 2002/0007453 A1* | 1/2002 | Nemovicher ................. 713/155 |
| 2002/0023131 A1 | 2/2002 | Wu et al. |
| 2002/0032771 A1* | 3/2002 | Gledje ......................... 709/224 |
| 2002/0040374 A1 | 4/2002 | Kent |
| 2002/0052919 A1 | 5/2002 | Morris et al. |
| 2002/0062391 A1 | 5/2002 | Densmore |
| 2002/0072039 A1 | 6/2002 | Rtischev et al. |
| 2002/0099777 A1* | 7/2002 | Gupta et al. .................. 709/206 |
| 2002/0131407 A1 | 9/2002 | Muhonen |
| 2002/0133534 A1 | 9/2002 | Forslow |
| 2002/0138588 A1 | 9/2002 | Leeds |
| 2003/0023692 A1* | 1/2003 | Moroo ......................... 709/206 |
| 2003/0028525 A1 | 2/2003 | Santos et al. |
| 2003/0061365 A1 | 3/2003 | White et al. |
| 2003/0065805 A1 | 4/2003 | Barnes, Jr. |
| 2003/0070176 A1 | 4/2003 | Parker et al. |
| 2003/0093480 A1 | 5/2003 | Lagarde et al. |
| 2003/0108543 A1 | 6/2003 | Lewandowski |
| 2003/0131073 A1 | 7/2003 | Lucovsky et al. |
| 2003/0158913 A1 | 8/2003 | Agnoli et al. |
| 2003/0208543 A1 | 11/2003 | Enete et al. |
| 2003/0212800 A1 | 11/2003 | Jones et al. |
| 2003/0217105 A1 | 11/2003 | Zircher et al. |
| 2003/0220972 A1 | 11/2003 | Montet et al. |
| 2004/0002049 A1 | 1/2004 | Beavers et al. |
| 2004/0010808 A1 | 1/2004 | deCarmo |
| 2004/0015554 A1 | 1/2004 | Wilson |
| 2004/0044635 A1 | 3/2004 | Gordon et al. |
| 2004/0080534 A1 | 4/2004 | Quach |
| 2008/0307040 A1 | 12/2008 | So |

FOREIGN PATENT DOCUMENTS

| | | |
|---|---|---|
| EP | 1365553 A1 | 11/2003 |
| WO | WO/00/77661 A2 | 12/2000 |

OTHER PUBLICATIONS

Nguyen, T,Office Actions for U.S. Appl. No. 10/207,711, filed Jul. 26, 2002.

Nguyen, T,Office Actions for U.S. Appl. No. 10/732,020, filed Dec. 10, 2003.

Nguyen, T,Office Actions for U.S. Appl. No. 11/197,964, filed Aug. 5, 2005.

Nguyen, T,Office Actions for U.S. Appl. No. 11/197,998, filed Aug. 26, 2005.

Patel, D,Office Actions for U.S. Appl. No. 10/207,685, filed Jul. 26, 2002.

Patel, D,Office Actions for U.S. Appl. No. 10/730,227, filed Dec. 8, 2003.

Patel, D,Office Actions for U.S. Appl. No. 11/226,593, filed Sep. 14, 2005.

Patel, D,Office Actions for U.S. Appl. No. 11/234,987, filed Sep. 26, 2005.

Patel, D,Office Actions for U.S. Appl. No. 11/245,577, filed Oct. 7, 2005.

Nguyen, T,Office Actions for U.S. Appl. No. 11/197,933, filed Aug. 5, 2005.

Nguyen, T, Office Actions filed after Mar. 31, 2009 for U.S. Appl. No. 10/207,711, filed Jul. 26, 2002.

Nguyen, T, Office Actions filed after Mar. 31, 2009 for U.S. Appl. No. 10/732,020, filed Dec. 10, 2003.

Nguyen, T, Office Actions filed after Mar. 31, 2009 for U.S. Appl. No. 11/197,964, filed Aug. 5, 2005.

Nguyen, T, Office Actions filed after Mar. 31, 2009 for U.S. Appl. No. 11/197,933, filed Aug. 5, 2005.

Nguyen, T, Office Actions filed after Mar. 31, 2009 for U.S. Appl. No. 11/197,998, filed Aug. 5, 2005.

Patel, D, Office Actions filed after Mar. 31, 2009 for U.S. Appl. No. 10/207,685, filed Jul. 26, 2002.

Patel, D, Office Actions filed after Mar. 31, 2009 for U.S. Appl. No. 10/730,227, filed Dec. 8, 2003.

Patel, D, Office Actions filed after Mar. 31, 2009 for U.S. Appl. No. 11/226,593, filed Sep. 14, 2005.

Patel, D, Office Actions filed after Mar. 31, 2009 for U.S. Appl. No. 11/234,987, filed Sep. 26, 2005.

Patel, D, Office Actions filed after Mar. 31, 2009 for U.S. Appl. No. 11/245,577, filed Oct. 7, 2005.

Patel, D, Office Actions dated Dec. 24, 2009 for U.S. Appl. No. 10/207,685, filed Jul. 26, 2002.

Patel, D, Office Action dated Dec. 10, 2009 for U.S. Appl. No. 11/234,987, filed Sep. 26, 2005.

Patel, Dhairya A, Final Action dated Feb. 22, 2010 for U.S. Appl. No. 10/730,227, filed Dec. 8, 2003.

Patel, Dhairya A, Final Rejection dated Jul. 22, 2010 for U.S. Appl. No. 11/245,577, filed Oct. 7, 2005.

Patel, Dhairya A, Rejection dated Aug. 18, 2010 for U.S. Appl. No. 10/730,227, filed Dec. 8, 2003.

Patel, Dhairya A, Office Action dated Dec. 9, 2010 for U.S. Appl. No. 10/207,685, filed Jul. 26, 2002.

Patel, Dhairya A, Advisory Action dated Oct. 5, 2010 for U.S. Appl. No. 11/245,577, filed Oct. 7, 2005.

Patel, Dhairya A, Final Office Action dated Dec. 23, 2010 for U.S. Appl. No. 10/730,227, filed Dec. 8, 2003.

* cited by examiner

CREATING DYNAMIC INTERACTIVE ALERT MESSAGES BASED ON EXTENSIBLE DOCUMENT DEFINITIONS

CROSS-REFERENCE TO RELATED APPLICATIONS

The invention disclosed in this application is a continuation in part of U.S. patent application Ser. No. 10/207,685 "INTERACTIVE ONE TO MANY COMMUNICATION IN A COOPERATING COMMUNITY OF USERS" by Goodman et al. filed Jul. 26, 2002 and assigned to the assignee of this application. The disclosure of the forgoing application is incorporated herein by reference.

COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

REFERENCE TO A COMPUTER PROGRAM LISTING APPENDIX SUBMITTED ON A COMPACT DISK

Computer program listings incorporated herein by reference are submitted herewith on one compact disk (Copy 1) and one duplicate compact disk (Copy 2) as follows:
Disk one of one:

| Filename | Size B | Created on |
|---|---|---|
| AlertManagerPlugIn.jar | | |
| com/ibm/webahead/ict/plugin/alertmanager: | | |
| AlertWindowHandleBar.java | 7887 | Jul. 24, 2003 |
| AlertWindowTitleBar.java | 7383 | Mar. 17, 2003 |
| FadeEffect.java | 1230 | Jan. 14, 2003 |
| ICTAlertContentComposite.java | 9214 | Feb. 5, 2003 |
| ICTAlertData.java | 953 | Jan. 16, 2003 |
| ICTAlertManagerCornerPicker.java | 9314 | Jul. 24, 2003 |
| ICTAlertManagerData.java | 5710 | Jan. 14, 2003 |
| ICTAlertManager.java | 19198 | May 8, 2003 |
| ICTAlertManagerPlugIn.java | 12783 | Jul. 7, 2003 |
| ICTAlertSettingsData.java | 11605 | Feb. 4, 2003 |
| ICTAlertWindowData.java | 1334 | Jan. 14, 2003 |
| ICTAlertWindow.java | 7155 | Sep. 8, 2003 |
| NullEffect.java | 462 | Jan. 14, 2003 |
| SettingsFileParser.java | 3072 | Jan. 15, 2003 |
| SlideEffect.java | 2139 | Jan. 14, 2003 |
| TransitionEffect.java | 3358 | Jul. 24, 2003 |
| UIDependencies.java | 2005 | Jan. 14, 2003 |
| AwarenessGuiPlugIn.jar | | |
| com/ibm/webahead/ict/plugin/awarenessgui: | | |
| AwarenessGui.java | 23339 | Oct. 8, 2003 |
| MOTDDialog.java | 5253 | Oct. 7, 2003 |
| PluginEventSelectionAdapter.java | 1536 | Apr. 4, 2003 |
| BCSPlugIn.jar | | |
| com/ibm/webahead/ict/plugin/bcs: | | |
| ActivateApplicationsWizardPage.java | 1391 | Jan. 29, 2003 |
| ActivateCommunityWizardPage.java | 7696 | Sep. 10, 2003 |
| AdaptiveFilter.java | 5421 | Sep. 2, 2003 |
| ApplicationSettingsListComposite.java | 409 | Jan. 14, 2003 |
| BCSApplication.java | 4519 | May 8, 2003 |
| BCSApplicationPlugIn.java | 10657 | May 8, 2003 |
| BCSCommunity.java | 14276 | Feb. 4, 2003 |
| BCSFilter.java | 759 | Jan. 20, 2003 |
| BCSFilterStore.java | 7722 | Sep. 2, 2003 |
| BCSFilterStoreXMLParser.java | 4611 | Sep. 2, 2003 |
| BCSListComposite.java | 3199 | Jan. 21, 2003 |
| BCSPlugIn.java | 49037 | Sep. 3, 2003 |
| BCSSessionApplicationPlugIn.java | 4362 | May 2, 2003 |
| CommunityIconLegendDialog.java | 4869 | Mar. 28, 2003 |
| CommunityNotificationWizardPage.java | 3742 | Jun. 20, 2003 |
| CommunitySettingsListComposite.java | 2142 | Feb. 4, 2003 |
| FilterRuleWizard.java | 819 | Jun. 20, 2003 |
| FilterRuleWizardPage1.java | 7596 | Feb. 2, 2003 |
| FilterRuleWizardPage2.java | 10060 | Sep. 2, 2003 |
| GettingStartedFinishPage.java | 1640 | Feb. 6, 2003 |
| GettingStartedWelcomePage.java | 6513 | Jun. 20, 2003 |
| LocalCommunityXMLParser.java | 3796 | Apr. 9, 2003 |
| ManualFilter.java | 3211 | Feb. 4, 2003 |
| MQUtil.java | 9687 | Jun. 20, 2003 |
| MyDialog.java | 1369 | Jan. 14, 2003 |
| RecentBroadcastListable.java | 473 | Jan. 14, 2003 |
| RecentBroadcastListEntry.java | 2508 | Jan. 14, 2003 |
| RecentBroadcastListItem.java | 12787 | May 30, 2003 |
| RecentBroadcastList.java | 5357 | May 30, 2003 |
| RecentBroadcastStressTest.java | 1289 | May 30, 2003 |
| RemoteCommunityXMLParser.java | 3461 | Jun. 20, 2003 |
| RPCUtil.java | 6892 | May 15, 2003 |
| SessionData.java | 717 | Jan. 14, 2003 |
| SessionDataListener.java | 118 | Jan. 14, 2003 |
| SessionDataTable.java | 541 | Jan. 14, 2003 |
| FreeJamPlugIn.jar | | |
| com/ibm/webahead/ict/plugin/freejam: | | |
| FreeJamBroadcastWizardPage.java | 2166 | Feb. 3, 2003 |
| FreeJamPlugIn.java | 7711 | Aug. 1, 2003 |
| GryphonPlugin.jar | | |
| com/ibm/webahead/ict/plugin/gryphon: | | |
| GryphonConnectionInstance.java | 9942 | Jul. 2, 2003 |
| GryphonPlugIn.java | 11387 | Jun. 23, 2003 |
| IMChatWindowPlunIn.jar | | |
| com/ibm/webahead/ict/plugin/imchatwindow: | | |
| FreeJamTranscriptParser.java | 4572 | Jun. 24, 2003 |
| ImChatWindowHandler.java | 66214 | Oct. 1, 2003 |
| ImChatWindowPartner.java | 832 | Jan. 20, 2003 |
| ImChatWindowPlugIn.java | 52203 | Oct. 8, 2003 |
| InviteOthersDialog.java | 13017 | Jun. 4, 2003 |
| ModelessYesNoDialogForInvites.java | 3189 | Oct. 7, 2003 |
| IMHPlugIn.jar | | |
| com/ibm/webahead/ict/plugin/imhub: | | |
| ConnectionData.java | 9403 | Jul. 24, 2003 |
| DragNDropProvider.java | 9459 | Sep. 10, 2003 |
| GroupGUI.java | 24010 | Oct. 8, 2003 |
| GroupModel.java | 13741 | Aug. 13, 2003 |
| GroupService.java | 3288 | Aug. 13, 2003 |
| IconLegendWindow.java | 8909 | Jul. 24, 2003 |
| ImageRegistryThatDoesNotSuck.java | 1051 | Jul. 22, 2003 |
| IMHubConfiguration.java | 7228 | Sep. 26, 2003 |
| IMHubPlugIn.java | 136106 | Oct. 8, 2003 |
| NodeGUI.java | 1265 | Jan. 20, 2003 |
| NodeModel.java | 3703 | Aug. 25, 2003 |
| OverlayImageDescriptor.java | 1131 | Jun. 3, 2003 |
| PartnerGUI.java | 23523 | Oct. 7, 2003 |
| PartnerListContentProvider.java | 6378 | Oct. 7, 2003 |
| PartnerListFilter.java | 1350 | Apr. 3, 2003 |
| PartnerListSorter.java | 688 | Apr. 3, 2003 |
| PartnerModel.java | 6488 | Oct. 7, 2003 |
| PartnerReference.java | 4651 | Sep. 26, 2003 |
| PlugIn.java | 13338 | Aug. 27, 2003 |
| ToolTipHandler.java | 5073 | Jan. 20, 2003 |
| ToolTipHelpTextHandler.java | 583 | Jan. 20, 2003 |
| PollcastPlugIn.jar | | |
| com/ibm/webahead/ict/plugin/pollcast: | | |
| PollCastBroadcastWizardPage.java | 12466 | Jun. 23, 2003 |
| PollCastDataEntry.java | 913 | Jan. 15, 2003 |
| PollCastPlugIn.java | 4340 | Jul. 25, 2003 |
| PollCastResponseComposite.java | 6159 | Jun. 23, 2003 |
| PollCastResultsBarChart.java | 3416 | Feb. 4, 2003 |
| PollCastResultsComposite.java | 3708 | Apr. 3, 2003 |
| PollCastSessionData.java | 13863 | Jul. 25, 2003 |

| | | |
|---|---:|---|
| PollCastSessionWindow.java | 4933 | Apr. 3, 2003 |
| SametimePlugIn.jar | | |
| com/ibm/webahead/ict/plugin/sametime: | | |
| HiddenConstants.java | 1181 | Sep. 2, 2003 |
| MaintainedList.java | 928 | Apr. 8, 2003 |
| PlaceInvite.java | 1924 | Jan. 24, 2003 |
| SametimeConnectionInstance.java | 48042 | Oct. 1, 2003 |
| SametimeConversation.java | 1079 | Jan. 21, 2003 |
| SametimePartner.java | 5145 | Sep. 26, 2003 |
| SametimePlace.java | 23749 | Oct. 1, 2003 |
| SametimePlugIn.java | 137790 | Oct. 1, 2003 |
| StatusMessageContainer.java | 1948 | Jan. 21, 2003 |
| SkillTapPlugIn.jar | | |
| com/ibm/webahead/ict/plugin/skilltap: | | |
| SkillTapAccessProxy.java | 15571 | May 6, 2003 |
| SkillTapBroadcastWizardPage.java | 6219 | Aug. 7, 2003 |
| SkillTapPlugIn.java | 112071 | Aug. 21, 2003 |
| SkillTapRequest.java | 2166 | Oct. 3, 2003 |
| TeamringPlugIn.jar | | |
| com/ibm/webahead/ict/plugin/teamring: | | |
| TeamRingBroadcastWizardPage.java | 2520 | Jan. 29, 2003 |
| TeamRingPlugIn.java | 2535 | Feb. 4, 2003 |
| TeamRingSessionData.java | 665 | Jan. 14, 2003 |
| TeamRingSessionWindow.java | 7092 | Jan. 14, 2003 |
| w3alertPlugIn.jar | | |
| com/ibm/webahead/ict/plugin/w3alert: | | |
| w3alertBroadcastWizardPage.java | 3280 | Feb. 4, 2003 |
| w3alertPlugIn.java | 1566 | Jan. 25, 2003 |
| ICT.jar | | |
| com/ibm/webahead/ginie: | | |
| MessageEventConstants.java | 18297 | Aug. 29, 2003 |
| SearchEventConstants.java | 4649 | Sep. 29, 2003 |
| com/ibm/webahead/ginie/plugin: | | |
| AudioCache.java | 3584 | Jul. 28, 2003 |
| SWTGuiPlugIn.java | 8785 | Aug. 20, 2003 |
| com/ibm/webahead/ginie/runtime: | | |
| AuthenticationClient.java | 2297 | Aug. 21, 2003 |
| Ginie.java | 35843 | Oct. 6, 2003 |
| GinieLoginSplashScreen.java | 24093 | Aug. 26, 2003 |
| LoginSettingsDialog.java | 4789 | Apr. 8, 2003 |
| NetworkSettingsComposite.java | 10759 | Apr. 8, 2003 |
| SettingsDialog.java | 8438 | Apr. 8, 2003 |
| Sleak.java | 7795 | Sep. 6, 2002 |
| SWTDisplayLoop.java | 1911 | Sep. 16, 2002 |
| com/ibm/webahead/ginie/util: | | |
| AlertSenderCallback.java | 789 | Jul. 2, 2002 |
| ARSPost.java | 1048 | Apr. 22, 2003 |
| DoubleKeyHashtable.java | 3401 | Apr. 12, 2002 |
| ExplorerFrame.java | 7715 | Oct. 3, 2003 |
| ExplorerWindow.java | 4489 | Jul. 24, 2003 |
| FileSave.java | 1788 | Feb. 4, 2003 |
| GetImageForLabel.java | 1728 | Apr. 29, 2003 |
| GinieARSInterface.java | 11052 | May 2, 2003 |
| LinuxSystemTray.java | 4219 | Jul. 24, 2003 |
| LinuxWindowUtils.java | 1808 | Jul. 15, 2003 |
| OSUtils.java | 631 | Jul. 15, 2003 |
| SystemTray.java | 1141 | Jul. 15, 2003 |
| Win32SystemTray.java | 1517 | Jul. 15, 2003 |
| Win32WindowUtils.java | 1693 | Jul. 15, 2003 |
| WindowUtils.java | 985 | Jul. 15, 2003 |
| com/ibm/webahead/ict/alertmanager/util: | | |
| AlertInfo.java | 2230 | Jan. 27, 2003 |
| AlertSettingsDataConstants.java | 2116 | Jan. 21, 2003 |
| com/ibm/webahead/ict/bcs/util: | | |
| Application.java | 1549 | Jan. 13, 2003 |
| BCSBroadcast.java | 2699 | Jan. 17, 2003 |
| BCSBroadcastParser.java | 4685 | Apr. 29, 2003 |
| BCSConstants.java | 2309 | Feb. 2, 2003 |
| BCSListable.java | 168 | Jan. 13, 2003 |
| BCSListModelEvent.java | 170 | Jan. 12, 2003 |
| BCSListModel.java | 1595 | Jan. 27, 2003 |
| BCSListModelListener.java | 173 | Jan. 12, 2003 |
| BCSObject.java | 1382 | Jan. 29, 2003 |
| BroadcastWizard.java | 1321 | Apr. 29, 2003 |
| BroadcastWizardPage.java | 2721 | Apr. 29, 2003 |
| ChooseApplicationWizardPage.java | 1845 | Aug. 14, 2003 |
| ChooseCommunityWizardPage.java | 2055 | Aug. 14, 2003 |
| Community.java | 2805 | Jan. 16, 2003 |
| SettingsListable.java | 428 | Jan. 13, 2003 |
| SettingsListItem.java | 8445 | Aug. 14, 2003 |
| SettingsList.java | 6113 | Aug. 14, 2003 |
| com/ibm/webahead/ict/swt/widgets: | | |
| AdvancedLabel.java | 16918 | Jun. 9, 2003 |
| HyperlinkLabel.java | 3065 | Jun. 9, 2003 |
| com/ibm/webahead/ict/util: | | |
| BlueGroup.java | 4184 | Apr. 11, 2003 |
| ConnectionFactory.java | 3249 | Oct. 1, 2003 |
| MessageBoxWithCheckbox.java | 4002 | Aug. 21, 2003 |
| MessageEventMenuMap.java | 2211 | Feb. 5, 2003 |
| ModalessDialog.java | 1949 | Apr. 18, 2003 |
| Person.java | 4243 | Apr. 29, 2003 |
| com/ibm/webahead/ict/wizard: | | |
| ICTWizard.java | 9475 | Aug. 14, 2003 |
| ICTWizardPage.java | 3259 | Feb. 4, 2003 |
| com/ibm/webahead/utils: | | |
| BuddyListParser.java | 8674 | May 29, 2003 |
| HttpRequestToString.java | 1668 | Aug. 6, 2003 |
| JStringTokenizer.java | 1200 | Apr. 10, 2003 |
| ListImplodeExplode.java | 871 | Aug. 9, 2002 |
| PasswordMangler.java | 1130 | Aug. 9, 2002 |
| RGBSerializer.java | 1871 | Jun. 12, 2003 |
| SametimeConnectListParser.java | 7798 | Jul. 28, 2003 |
| XMLEscaper.java | 1016 | Nov. 19, 2002 |
| com/ibm/webahead/utils/base64: | | |
| Base64.java | 2299 | Aug. 9, 2002 |
| com/ibm/webahead/utils/idle: | | |
| ActivityMonitor.java | 2213 | Dec. 9, 2002 |
| ActivityMonitorTest.java | 730 | Apr. 9, 2003 |
| com/ibm/webahead/utils/md5: | | |
| GenerateMD5.java | 937 | Aug. 9, 2002 |
| com/ibm/webahead/utils/win32: | | |
| DesktopWorkArea.java | 1004 | Nov. 21, 2002 |
| TransparencyControl.java | 230 | Jan. 14, 2003 |
| com/ibm/webahead/utils/wizard: | | |
| TestWizard.java | 8106 | Apr. 29, 2003 |
| WizardAdapter.java | 558 | Aug. 9, 2002 |
| Wizard.java | 11618 | Apr. 29, 2003 |
| WizardPage.java | 1534 | Apr. 29, 2003 |
| loader: | | |
| ExtensionMatcher.java | 628 | Feb. 20, 2002 |
| Loader.java | 3276 | Jul. 15, 2003 |
| org/eclipse/swt/ole/win32: | | |
| OleAutomationFactory.java | 475 | Dec. 3, 2002 |
| MagicCarpet.jar | | |
| com/ibm/webahead/magiccarpet: | | |
| DynamicURLClassLoader.java | 2502 | Sep. 6, 2002 |
| MagicCarpet.java | 3005 | Mar. 4, 2003 |
| MessageEventCode.java | 1643 | Sep. 6, 2002 |
| MessageEvent.java | 1952 | May 2, 2003 |
| MessageEventListenerInf.java | 488 | Sep. 6, 2002 |
| messageprocessor | 4096 | Oct. 7, 2003 |
| PropertyObject.java | 1371 | Oct. 25, 2002 |
| StandardMessageEventConstants.java | 2087 | Sep. 6, 2002 |
| com/ibm/webahead/magiccarpet/exceptions: | | |
| EventRegistrationException.java | 430 | Sep. 6, 2002 |
| com/ibm/webahead/magiccarpet/messageprocessor: | | |
| EventQueueItem.java | 627 | May 2, 2003 |
| FIFO.java | 1191 | Dec. 13, 2002 |
| MessageEventRegistry.java | 2355 | Sep. 16, 2002 |
| MessageProcessor.java | 5041 | May 2, 2003 |
| WorkItemRunnable.java | 1269 | Dec. 18, 2002 |
| WorkQueue.java | 668 | May 2, 2003 |
| WorkThread.java | 1306 | Mar. 24, 2003 |
| com/ibm/webahead/magiccarpet/plugin: | | |
| PlugInConfigParser.java | 3651 | Oct. 2, 2003 |
| PlugInFileParser.java | 6697 | Oct. 7, 2003 |
| PlugInInfo.java | 804 | Oct. 7, 2003 |
| PlugIn.java | 6950 | Oct. 7, 2003 |
| PlugInLoader.java | 9021 | May 2, 2003 |
| PlugInRegistry.java | 1242 | Sep. 6, 2002 |
| XMLEscaper.java | 1029 | Nov. 19, 2002 |

-continued

| NAME: | SIZE: | CREATED ON: |
|---|---|---|
| ShotgunApplication.java | 16 KB | Jun. 24, 2002 |
| ShotgunApplicationConfigParser.java | 8 KB | Jun. 24, 2002 |
| ShotgunApplicationHistory.java | 3 KB | Jun. 24, 2002 |
| ShotgunApplicationHistoryItem.java | 12 B | Jun. 24, 2002 |
| ShotgunApplicationSendForm.java | 7 KB | Jun. 24, 2002 |
| ShotgunApplicationSettingsPage.java | 29 KB | Jun. 24, 2002 |
| ShotgunChannelsDisplayPage.java | 11 KB | Jun. 24, 2002 |
| ShotgunChannelsDisplayPageTableEntry.java | 1 KB | Jun. 24, 2002 |
| ShotgunChannelsParser.java | 4 KB | Jun. 24, 2002 |
| ShotgunConstants.java | 5 KB | Jun. 24, 2002 |
| ShotgunPlugIn.java | 35 KB | Jun. 24, 2002 |
| ShotgunPlugInSettingsPage.java | 9 KB | Jun. 24, 2002 |
| ShotgunSOAP.java | 7 KB | Jun. 24, 2002 |
| ShotgunXMLParser.java | 16 KB | Jun. 24, 2002 |
| xSkilltapAccessProxy.java | 13 KB | Jun. 24, 2002 |
| xSkilltapPlugIn.java | 33 KB | Jun. 24, 2002 |
| xSkilltapRequest.java | 2 KB | Jun. 24, 2002 |
| SkilltapSendForm.java | 3 KB | Jun. 24, 2002 |
| auth.htm | 7 KB | Aug. 9, 2001 |
| BasicFilter.htm | 5 KB | Jul. 12, 2001 |
| channels.htm | 14 KB | Aug. 10, 2001 |
| docs.htm | 1 KB | Oct. 22, 2001 |
| HelperWindows.js | 4 KB | Aug. 8, 2001 |
| info.htm | 3 KB | Aug. 8, 2001 |
| login.htm | 2 KB | Sep. 13, 2001 |
| logviewer.htm | 6 KB | Feb. 1, 2002 |
| notify.htm | 11 KB | Apr, 25, 2001 |
| Shotgun_main.htm | 68 KB | Aug. 26, 2001 |
| startup.html | 1 KB | Aug. 26, 2001 |
| shotgun_util.js | 4 KB | Sep. 20, 2001 |
| xorcrypt.js | 3 KB | May 18, 2001 |
| ChatClient.htm | 35 KB | Mar. 11, 2002 |
| faq_editor.htm | 6 KB | Sep. 20, 2001 |
| main.htm | 1 KB | Oct. 5, 2001 |
| resp.htm | 4 KB | Sep. 13, 2001 |

The following files:
SkilltapAccessProxy.java
SkilltapPlugIn.java
SkilltapRequest.java
Are renamed in this specification and on the accompanying Compact Disks because of file name conflict, the new names are:
xSkilltapAccessProxy.java
xSkilltapPlugIn.java
xSkilltapRequest.java

FIELD OF THE INVENTION

The present invention is related to visual event notification as defined by messages in a network aware environment. It is more particularly related to the control and interaction enablement of notifications.

BACKGROUND OF THE INVENTION

There are several ways that a requester can solicit help from a group of listeners today. He could use e-mail to send a request to a predetermined group of listeners who could each make a decision whether to engage in e-mail conversation with the requester. The problem is that e-mail's persist and have an indeterminate turn around, thus a listener may happen to see the requesters e-mail "immediately" but another listener may see the e-mail hours (or months) later. Conversing by e-mail would be very frustrating. The requester may enter a chat room to make his request, the problem is that all the members of the chat room are peers so it would be difficult to assure that listeners were interested enough to engage in conversation on a requesters subject and even if they were, the chat room would be cluttered with many users messages pertaining to many subjects all interspersed. The requester could open an instant message (IM) session with one listener at a time but he'd have to know which listener to direct the request to and wait a period for response to the listener to decide that the listener wasn't responding. Prior art methods often require the requester know the ID of the members of the community, know their interest and skills, share conversation with other requesters, take a long time to negotiate to find the appropriate listener, allow only one to one communication and the like.

FIG. 1 depicts the elements that make up a typical computer for use in networked applications. The computer 100 consists of a Base Computer 101 which comprises a processor 106, storage media such as a magnetic disk 107 and a high speed volatile main memory 105. An operating system and application programs 111 reside on the storage media 107 and are paged into main memory 105 as needed for computations performed by the processor 106. The Base computer may include optional peripheral devices including a video display 102, a printer or scanner 110, a keyboard 104, a pointing device (mouse) 103 and a connection 108 to a network 109. In a client environment, a user will interact with a (Graphical User Interface) GUI by use of a keyboard 104 and mouse 103 in conjunction with the display of information on the display 102 under control of an application program (application 1) 112. The client application program 112 will then interact with remote users by way of the network 109.

In FIG. 2 an example Internet system is shown. A user at client 1 201 uses applications on his system. This user (user 1 210) at client 1 201 can interact with clients 2-4 202-204 by way of a client server computer 206. Applications 112 may be provided by each client 201-205 and or the client server 206 or some remote server 208 by way of the network 207. The user at client 1 201 can interact with a remote user (user 5 211) at client 5 205 by way of the Internet 207.

Networked clients comprise applications for communication. E-mail applications provide for sending a message to a mail server that then makes the recipient aware of the waiting message. The recipient then can elect to open the message and view it at his client machine. E-mail messages can be sent to a single recipient or can contain a list of several recipients (one to many). One to many e-mail transactions are popular with advertisers and the use of one to many e-mails has been dubbed "SPAM-ing". Recently Instant Messaging (IM) has gained popularity in the form of sending text messages directly to another client. A first user composes an IM and selects a second user as the target. A message is then sent directly to the second user and appears on his display as either a message or the notification of a message. IMs are typically one to one messages.

A pub/sub service 304 receives messages originating from a content service and delivers them to client subscribers. An example message published includes a topic string, a set of property name-value pairs, and a body. A subscriber identifies a topic string pattern and properties tests and receives matching messages according to a standard, for instance JAVA Message Service (JMS).

The World Wide Web (The Web) is a popular computer networking platform today with millions of people daily using it for a wide variety of applications from personal e-mail and research "web surfing" to highly sophisticated business and scientific uses. The web was developed to make use of the Internet simple and easy to use. The concept was to provide Browser programs at user (client) personal computers (PCs) to interpret information from host servers using HTML and graphic files. The Internet provided the communication means to interconnect web clients and servers.

Personal computers rely upon an operating system to perform fundamental operations. Operating systems provide the minimum program function necessary for other computer code to run on a computer. Operating systems might manage access to hardware or offer a graphical environment that applications can leverage. Some operating systems provide windowing toolkits providing native access to the basic widgets making up the windowing environment. A widget might be a window decoration or a button. The widget has a certain appearance and behavior defined by the windowing environment. Programs that leverage this toolkit inherit these foundations.

An important part of windowing environment is the ability to present a dialog to an end user notifying (alerting) them of an event. The event might be a simple notification or offer limited choices such as Yes, No, Okay or Cancel. Dialog boxes offer a simple means to allow programs to communicate with end users.

Web pages provide a means for presenting content. Web applications allow for richer content organization and specific functions and features. Either a windowing environment or a Web application provides a means to notify an end user of a message. If the Web application chooses to use a window, it will be using the native windowing environment on which the browser client application is running or a windowing environment of a downloaded piece of code. These downloaded pieces of code are often known as applets. Applets are applications that can be embedded in web markup.

Email has become the method for one user or agent of a system to send a persistent asynchronous message to another user or agent of the system. Email has become the choice medium for direct marketing efforts and general advertising. Email alerts are email messages that a given event or news has occurred. Some examples of events causing Email alerts are:
  A stock has hit a high or low.
  A shipment has reached its destination.
  A news event on a given topic has occurred.

For the end user to receive alerts destined for their address, the user must check (poll) their email account for notification. Their response is limited to hyper linking and replying via email message. Replies are usually structured and used to unsubscribe to the alerting mechanism. Anyone can send email to anyone that can receive.

With the advent of pagers and now mobile telephones and like devices, text messaging has become a common form of alert notification. Messages sent to a pager or Simple Messaging Service (SMS) capable device function based on the push model. Messages are tagged as destined for a given device id and then routed to that device. Response can take the form of another text message. Pagers and phones can light up and vibrate indicating the arrival of an alert message. With the advent of media on phones, sound, video and images can be sent along with the text messages. Anyone can send a page or SMS.

Instant messaging (IM) is a method for one user or agent of a system to send a synchronous message to another user or agent of the system. A common IM system is AMERICA ON LINE (AOL) Instant Messenger and other AOL like clients provide web based customized alerts. The alerting is essentially a web page in a window or a web browser pop up with content specified by the user. User experiences and actions performed are those found in a normal web browser environment. AOL application programs are the only creator of alerts on the AOL system. End users or agents can not send AOL alerts to other end users or agents. In other systems, business partners are allowed to engage in broadcasts.

SUMMARY OF THE INVENTION

The shortcomings of the prior art are overcome and additional advantages are provided through common extensible document definitions and dynamic graphical user interfaces. Prior art does not provide the capability to create, send or receive alert notifications that include the instructions of how they might be experienced (displayed, interacted with or expressed) independent of the protocol, device, and environment or location. This invention achieves such capability through the provision of a system and computer program products corresponding to the above-summarized methods described and claimed herein.

Additional features and advantages are realized through the techniques of the present invention. Other embodiments and aspects of the invention are described in detail herein and are considered a part of the claimed invention.

The present invention is a system for providing event notification in a network enabled environment, where the notification of the event defines elements of control and interaction enablement. The presentations of these notifications might be dependent upon user and application settings. An event occurs on a client system of which the user desires notification. The notification message defines all aspects of how the target user might experience the message. The present invention allows target user and application overriding control of the way in which the notification is presented. The mechanism used for display might be modified according to both the message as defined by the sender and optionally the end user's or application's settings.

An objective of this system is to provide a form of event notification that is defined by one user and optionally controllable by the target user according to a number of specifications. In an embodiment of the present invention where the notification takes a visual form, the target user is given control of the location of the notification on the display device, as well as the user interface elements that display the notification. The user sending the notification can specify the aspects described as part of their message. If absent from the message the target user or application settings take precedence. In another embodiment of the present invention where the event notification has been specified as aural, the user provides settings that determine the type of audio notification and volume. These settings over ride any settings specified by the sender. If these settings do not exist at the user or application level, the sender's definition takes precedence.

A further objective of this system is to provide event notification which enables the target user to interact with the sender's defined notification. In an embodiment of the present invention where the notification is a visual display of an amalgam of user interface elements any such elements may allow the user to perform an interaction (e.g. clicking a button). The interaction would result in an action relative to the original event notification, where an event notification is the extensible message format. In an embodiment of the present invention where the event notification is defined as aural, the system presenting the alert might expect a spoken response. The processing of the spoken response might be facilitated by limiting the potential vocabulary and grammar of an acceptable response.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF EMBODIMENTS

The present invention is related to U.S. patent application Ser. No. 10/207,711 "INTERACTIVE FILTERING ELECTRONIC MESSAGES RECEIVED FROM A PUBLICATION/SUBSCRIPTION SERVICE" assigned to IBM, filed Jul. 26, 2003 which application is incorporated herein by reference.

Figure 1:
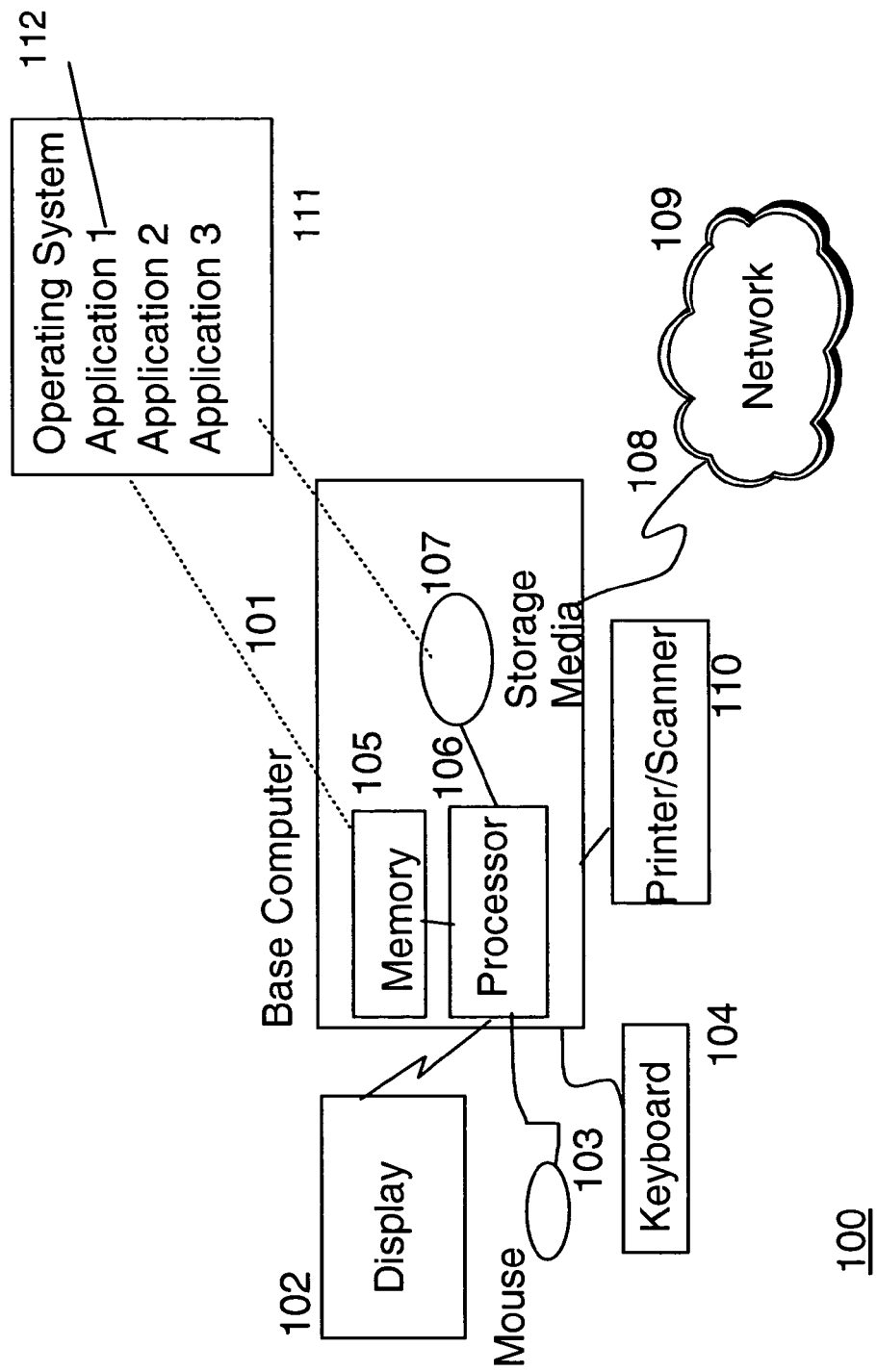
FIG. 1 is a diagram depicting a prior art computer.
Figure 2:
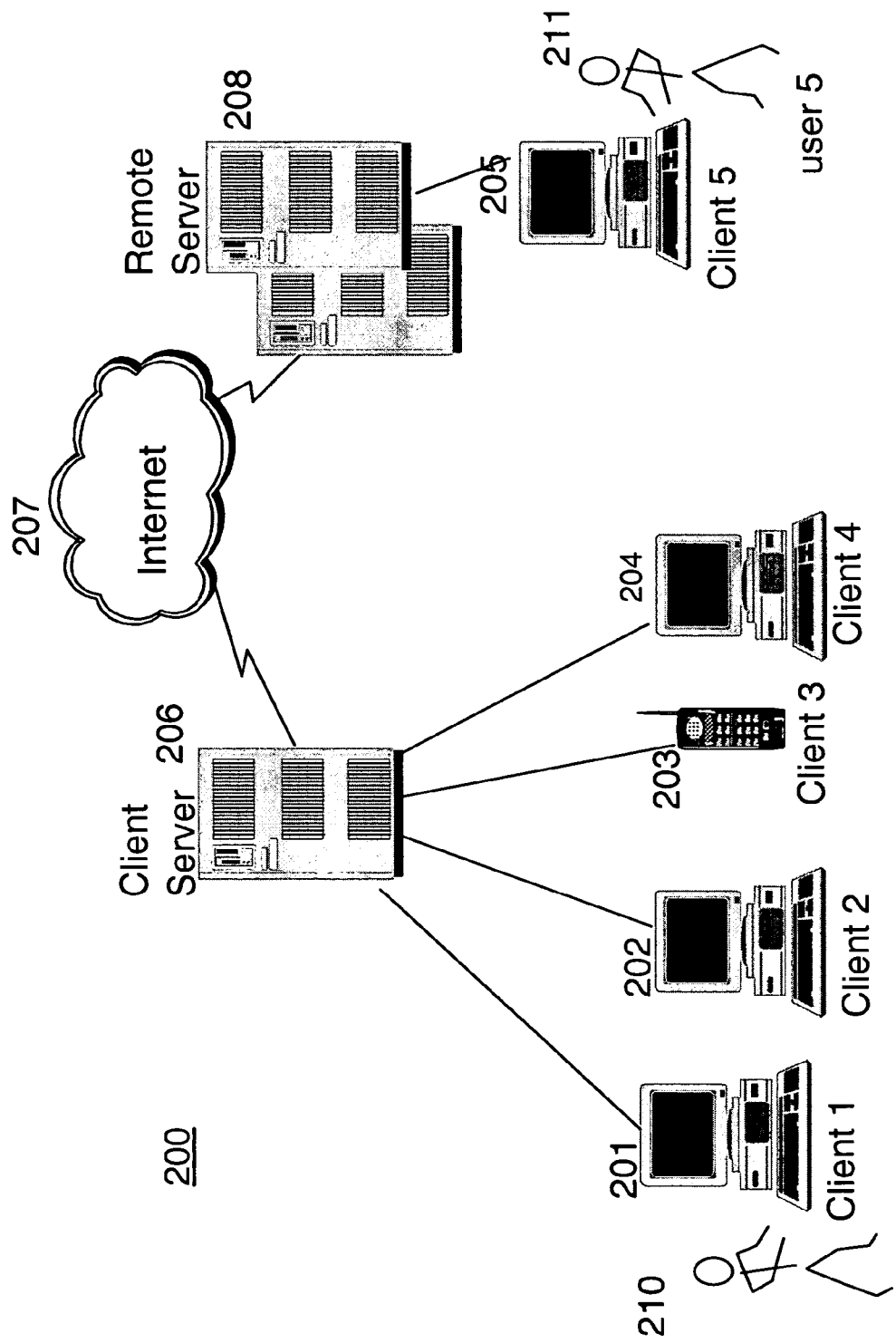
FIG. 2 is a diagram of user computers interconnected in an Internet network.
Figure 3:
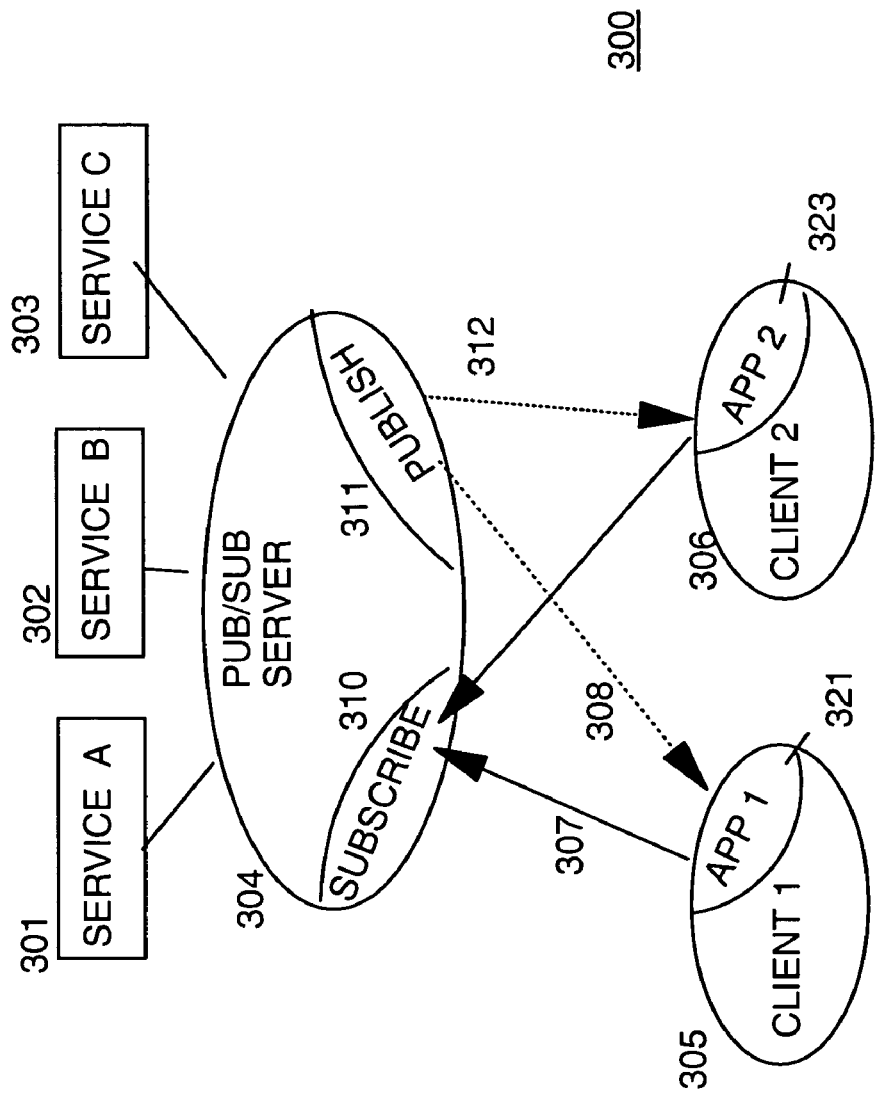
FIG. 3 is a logical depiction of a Pub/Sub implementation.

Referring to FIG. 3 a pub/sub system is made up of a Content Provider application (Service) 301-303, the Subscriber (Client) 305-306, and the Pub-Sub Service 304. Applications may implement one or more of these roles. The content provider 301-303 generates content for distribution through the pub/sub system 300. Content providers 301-303 send structured content to one or more instances of the pub/sub service 304. The subscriber 305-306 sends subscription requests 307 to an instance of the pub/sub service 304 and, subject to acceptance of a particular subscription request, receives content 308 from the pub/sub service. The actual content received will be determined by the subscription and the message selection process.

The pub/sub service 304 acts as both a subscription manager 310 and a content distribution agent 311. Applications implementing the pub/sub service role 304 accept subscription requests 307 from subscribers 305 and, subject to any applicable authentication or access control policies, accept or reject subscription requests; and distribute content 308 to valid subscribers 305.

The actual content sent to each subscriber 305-306 by the pub-sub service 304 will be determined by the subscription process 310 and through the message selection process 311.

Applications implementing some aspect of the pub/sub system may act in different roles in different circumstances. For example, an application implementing the pub/sub service role 304 may itself act as a subscriber, subscribing to and receiving content from another instance of the pub-sub service. Similarly, an application acting in the subscriber role may act as a content producer if the end-user of the application wishes to publish a message to the service.

The pub/sub system provides for communication among applications implementing the application roles. There are two primary communications in the pub/sub system: messages are sent from content providers to pub/sub services; and pub/sub services send messages to subscribers 308, 312.

Content providers 301-303 may generate messages from any content source, and subscribers may dispose of messages in any manner they choose. For example, a content provider may simply be a gateway between a raw content source, such as e-mail or web pages, to the pub-sub service. Similarly, a subscriber 305, 306 may act as a gateway between the pub-sub service and an external service such as NNTP or e-mail.

Figure 4:
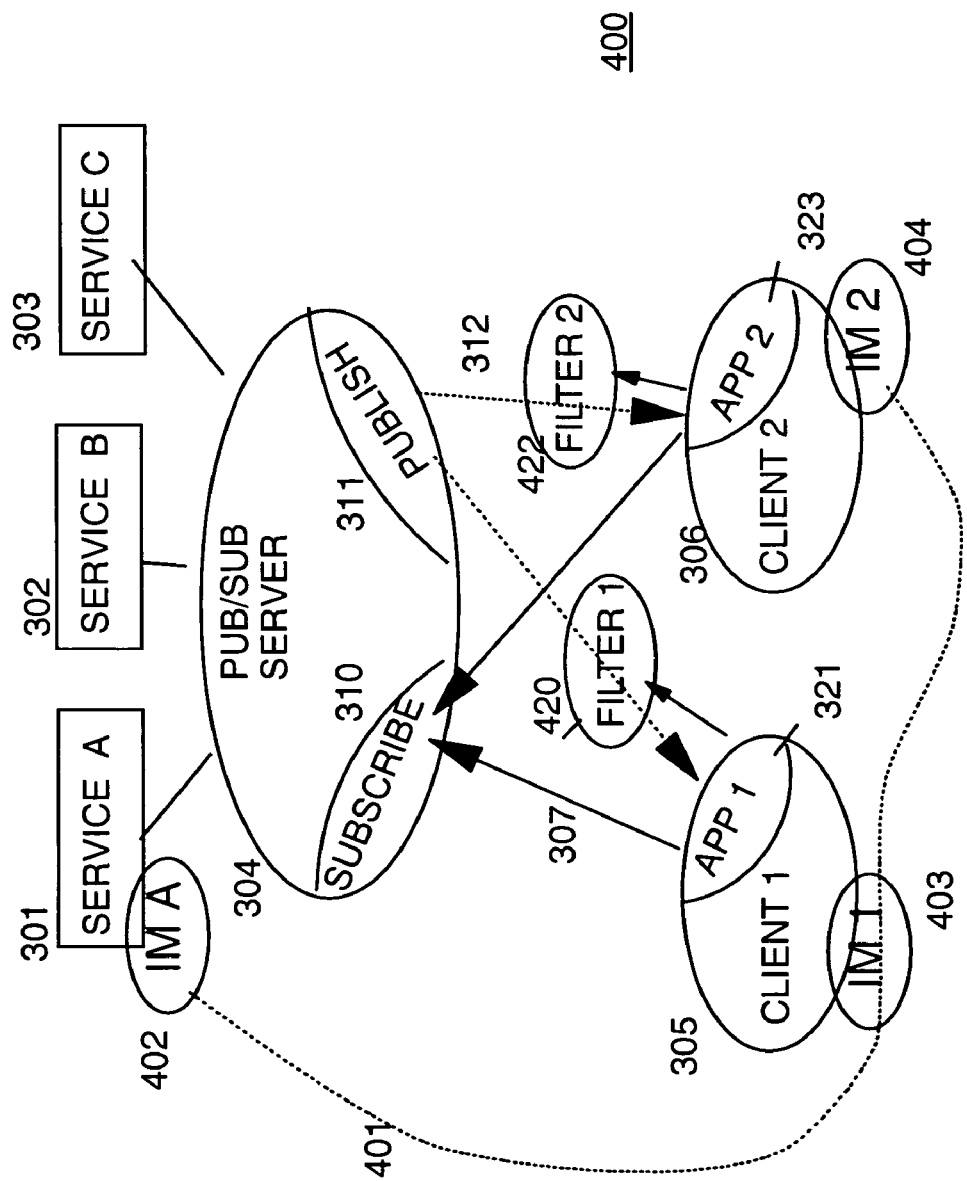
FIG. 4 is a logical depiction of a messaging system of the present invention.

FIG. 4 depicts a logical representation of components of the present invention. The system enables a client to send an IM to an automated client (Bot). Bots used to present an interface to program applications are described in U.S. patent application Ser. No. 10/002,685 "Accessing Information Using An Instant Messaging System" assigned to IBM and incorporated herein by reference. The client Bot re-sends the message to many listeners. The listeners each receive a special IM window. When a listener responds to the requester using his special window for the transaction, a new special IM window is presented to the requester. This completes the one to one IM connection between the requester and one of the listeners. The requester elects to commence conversation with a responding listener by using the IM window assigned to that listener's response. Other embodiments enable window sharing for multiple listeners responding to the same request or prompt the requester in a single GUI displaying listeners responding to a request in order that the requester can elect to open windows associated with the responding listeners.

More specifically, Clients 305-306 have downloaded App 1 (321) and App 2 (323) which enable message filtering 420 for message published 311 by a Pub/Sub service 304. One component of Service A (301) includes an automated IM user (Bot) 402 which communicates to other applications 403-404 using IM technology. Service A (301) associates the Bot with a Pub/Sub channel. The Bot is represented to the community by an IM ID as if it were another user. Clients can be requesters or listeners or both. Requesters initiate requests to Service A's Bot exactly as in any IM initial event. Service A's Bot ID is associated with a Pub/Sub channel which has a plurality of subscriber clients (listeners). Listeners have subscribed to the Bot channel because they have common interests. The subscribers' IM ID's are preferably unknown to the requester. SkillTap associates subscribers with a channel by use of a table holding the information at the SkillTap server.

Service A's Bot (402) receives an IM from a requester's 305 IM session 403 and publishes it 311 to the active subscribers of the Pub/Sub channel associated with the Bot including client 2 (306). The requester's 305 IM window may then be closed. The Pub/Sub service 304 distributes messages to SkillTap applications running on client machines. One of these applications, App 2 provides filtering techniques on incoming messages to eliminate messages that are not of interest to the client 2. App 2 (323) presents the request message to the listener user's display at client 2 (306). In one embodiment, the display at client 2 is like an IM display. If the listener is interested in responding, he transmits a response special IM by typing text in the displayed window. App 2 (323) uses IM 404 to transmit the message to the requester at client 1 (305). App 1 at client 1 (305) intercepts the response message and opens up a special IM window on the requester's display. This completes the negotiation from the requester for an IM session with a group of listeners. Communication between the two special IM windows continues until one window is closed.

It should be noted that in the preferred embodiment, the SkillTap client provides a "special IM" GUI that is used to provide the special SkillTap features. In the preferred embodiment, the initial request uses a standard IM GUI which is closed after transmitting the request. The requester receives responses from listeners in standard IM GUI. Thus a requester needs any IM service to initiate a SkillTap request and a special SkillTap IM application for the listening function. Another embodiment would provide all IM services in the special SkillTap IM application. These and other embodiments of the present invention could be created by one skilled in the art after learning the example embodiments herein.

In the example that follows, Brian has installed an IM (instant messaging) application on his PC. He adds a user name "SkillTap@us.ibm.com" to his IM buddy list. In this case, SkillTap is not the name of a person, it is the name of an automated user robot (Bot) that receives and sends IMs as if it were any other user. The Bot also communicates with a Pub/Sub service as a content provider. Brian sends a request to "listeners" for information. Brian doesn't know who is listening specifically but he does know that they subscribe to the SkillTap Service. Mike, a "listener" has downloaded an application called Shotgun. Shotgun in this case is an IBM SASH Weblication from an IBM Web site. Mike has also downloaded the SkillTap weblication. The SkillTap application is enabled under the Shotgun client. Mike uses Shotgun Documentation to understand how the SkillTap application works. Mike has defined Shotgun Filters for his SkillTap channel to limit messages to topics of his interest and expertise. the Filters base their decision to present messages directed to SkillTap to listeners based on the content of the messages.

Shotgun receives IMs directed to predetermined services (SkillTap Bot in this case) and enables the service to publish messages via channels to subscribers (listeners in this case). Listeners may respond by returning an IM to the requester (Brian). The return messages opens an IM window on Brian's computer which initiates the IM conversation between Brian and Mike. In another embodiment, the return message opens a chat room and Brian selectively engages in IM conversations with multiple listeners via the chat room. The chat room enables multiple listeners to participate in the conversation, it allows multiple listeners to view the conversation between Brian and Mike or optionally only provides Brian with a single instance of an IM window to converse with multiple listeners wherein each listener only sees conversation directed to him. Many other window variations would be useful and become obvious in light of the present invention.

Figure 5:
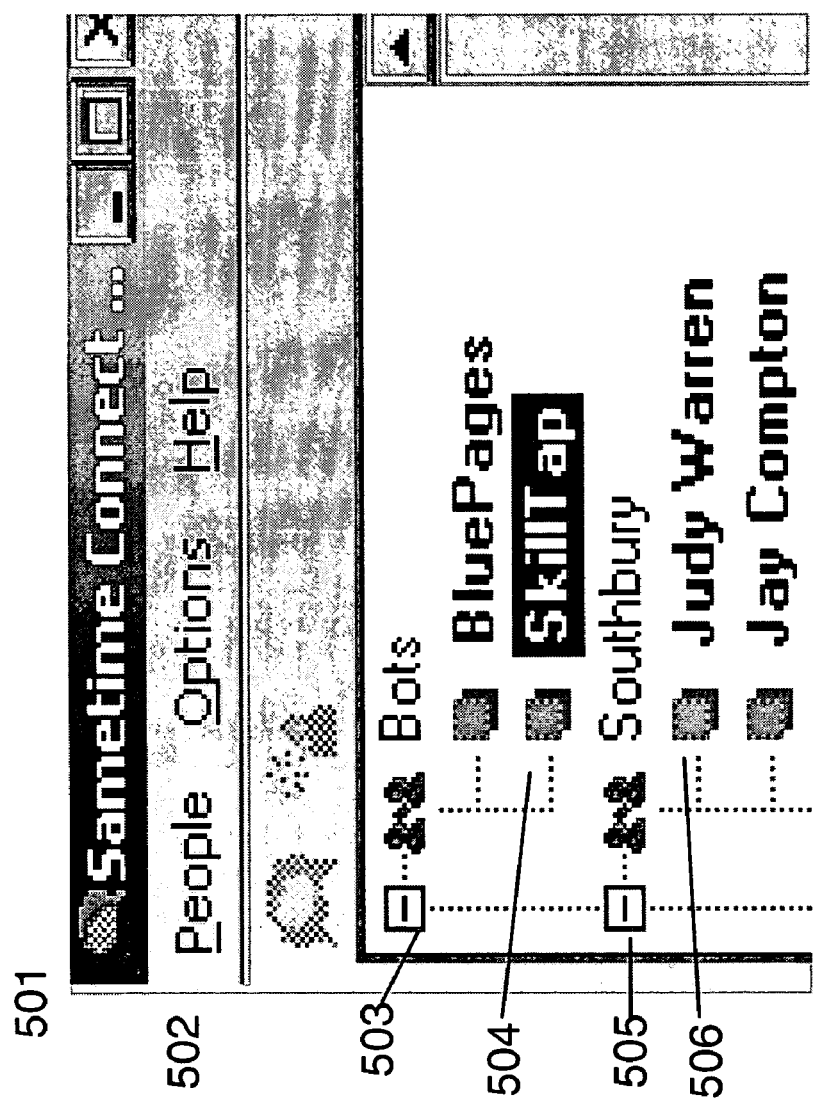
FIG. 5 is a GUI view of an IM window employing the invention.

An embodiment is demonstrated in the following example. In FIG. 5, Brian, a marketing rep clicks on the "SkillTap" Bot 504 in his Instant Messaging (IM) Sometime window 501.

Figure 6:
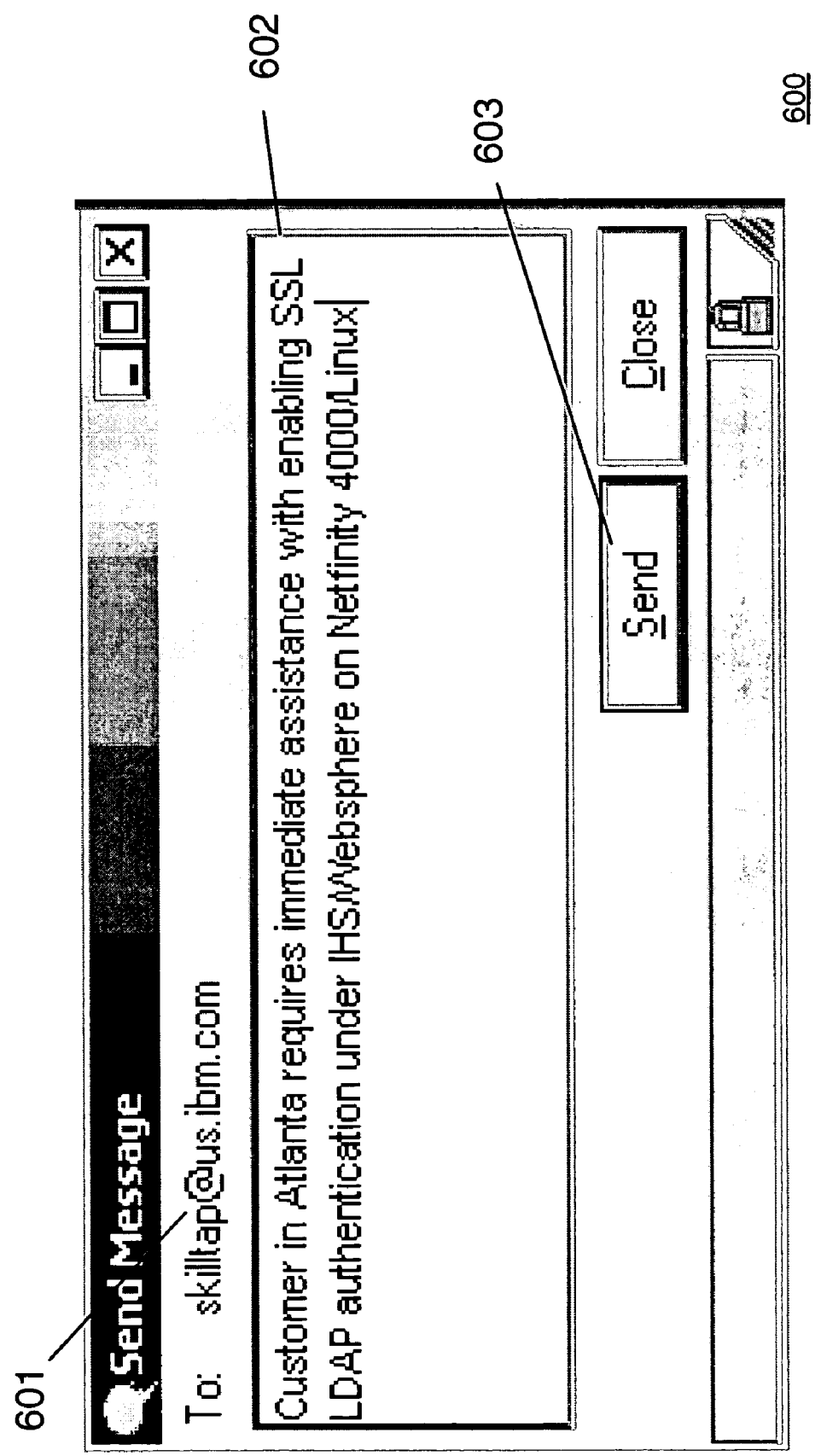
FIG. 6 is a requester's IM window for broadcasting.

In the resulting IM window shown in FIG. 6, Brian defines a problem 602 and sends 603 a request to the SkillTap Bot 601 for publication to a group of users currently running the Shotgun client. The SkillTap service application publishes (via a Pub/Sub service) Brian's message to a predefined group of active clients.

Figure 7:
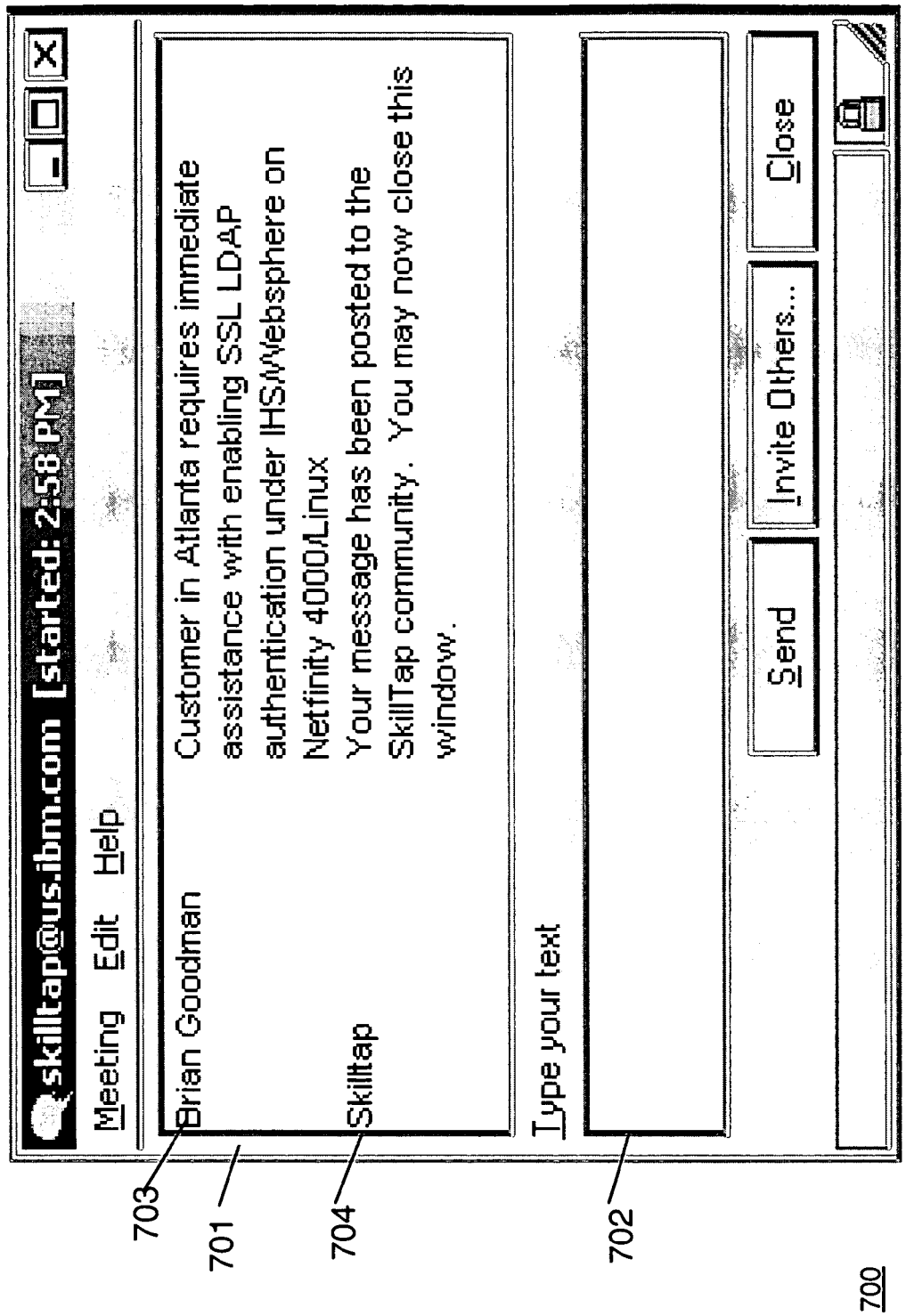
FIG. 7 is a requester's IM window with a listener's response.

In FIG. 7, the SkillTap service responds to Brian's request with an acknowledgment 704 that the request message 703 has been successfully delivered to the community of active listeners. SkillTap imitates a knowledgeable client in one embodiment by returning messages from a FAQ database using artificial intelligence querying known in the art. In another preferred embodiment, SkillTap returns procedural information or prompts such as instructions to close the present window.

Figure 8:
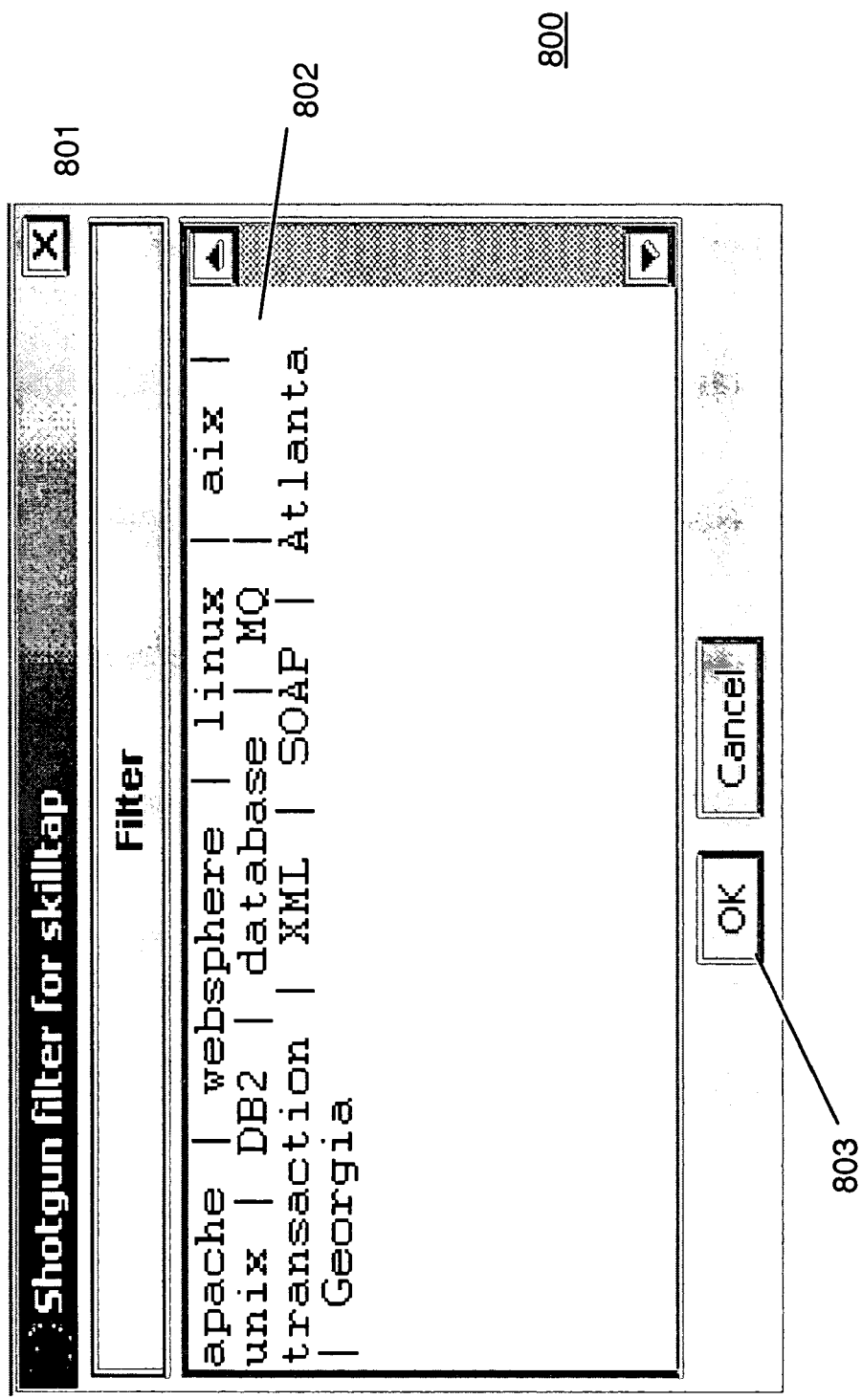
FIG. 8 is a listener's IM filter creation window.

In FIG. 8, an example filter window 801 is shown. Shotgun users subscribing to the SkillTap service are permitted to define message content filters. The example filter 802 of FIG. 8 shows a Boolean list of keywords or'd together. The Boolean "OR" is depicted by "|". The filter defines the user's areas of interest or expertise. In the example, the user has entered "Atlanta" because he is interested in what's happening in his hometown of Atlanta. When Brian sent his request, the words in his request would have to pass the listener's filter in order for the listener to see the request.

Figure 9:
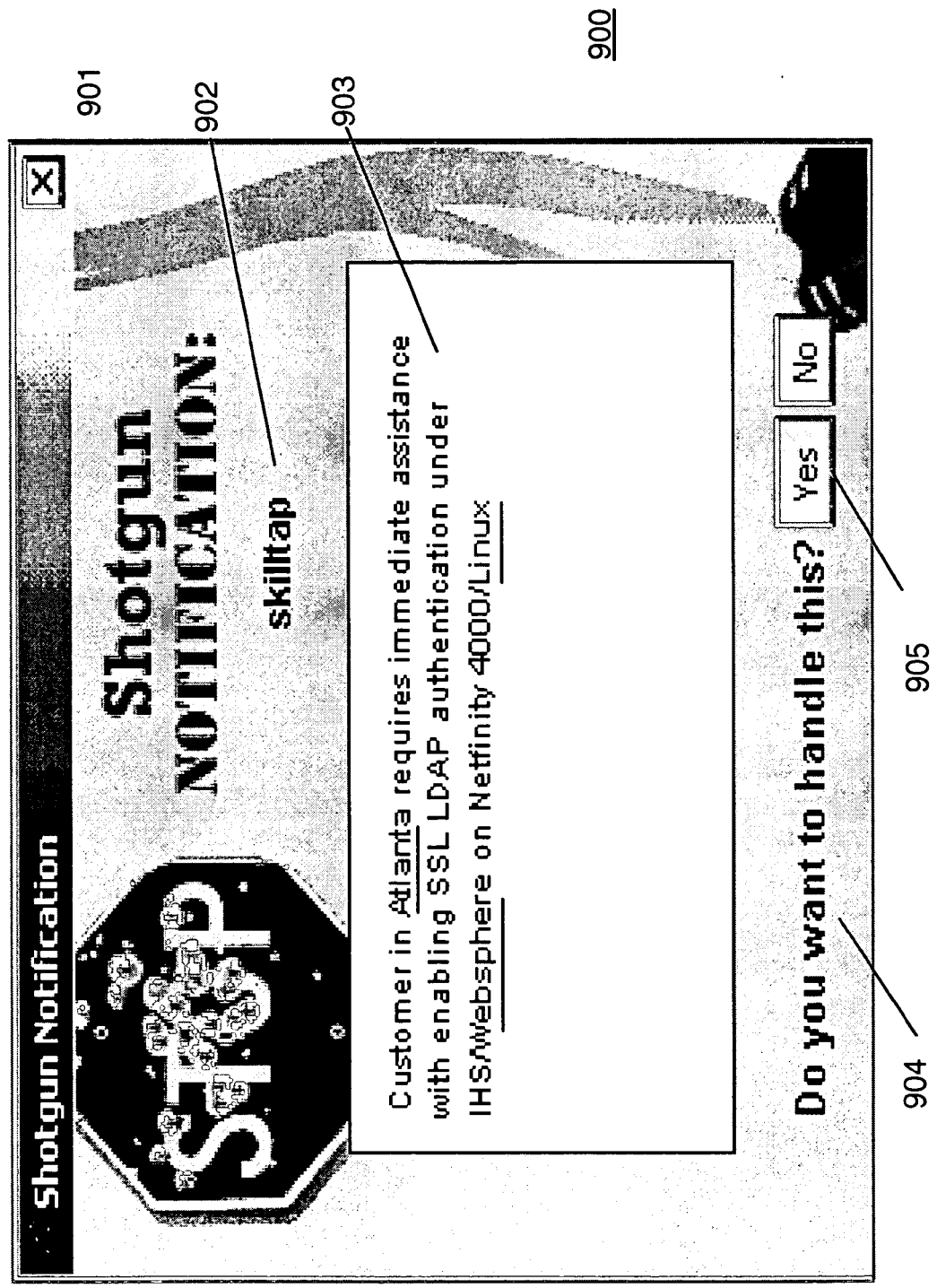
FIG. 9 is a listener's alert window highlighted according to his filter.

In FIG. 9, if the request passes the filter test, a Shotgun notification 901 immediately appears on the listener's screen. In the example, the filter keywords 903 "Atlanta", "Websphere" and "Linux" are highlighted in the message. The window in the preferred embodiment also identifies the SkillTap service 902 as the Channel and supplies radio buttons for actions to be taken. In the example, the listener is asked if he wants to "Handle" this request. If he hits the No radio button, the operation is aborted.

Figure 10:
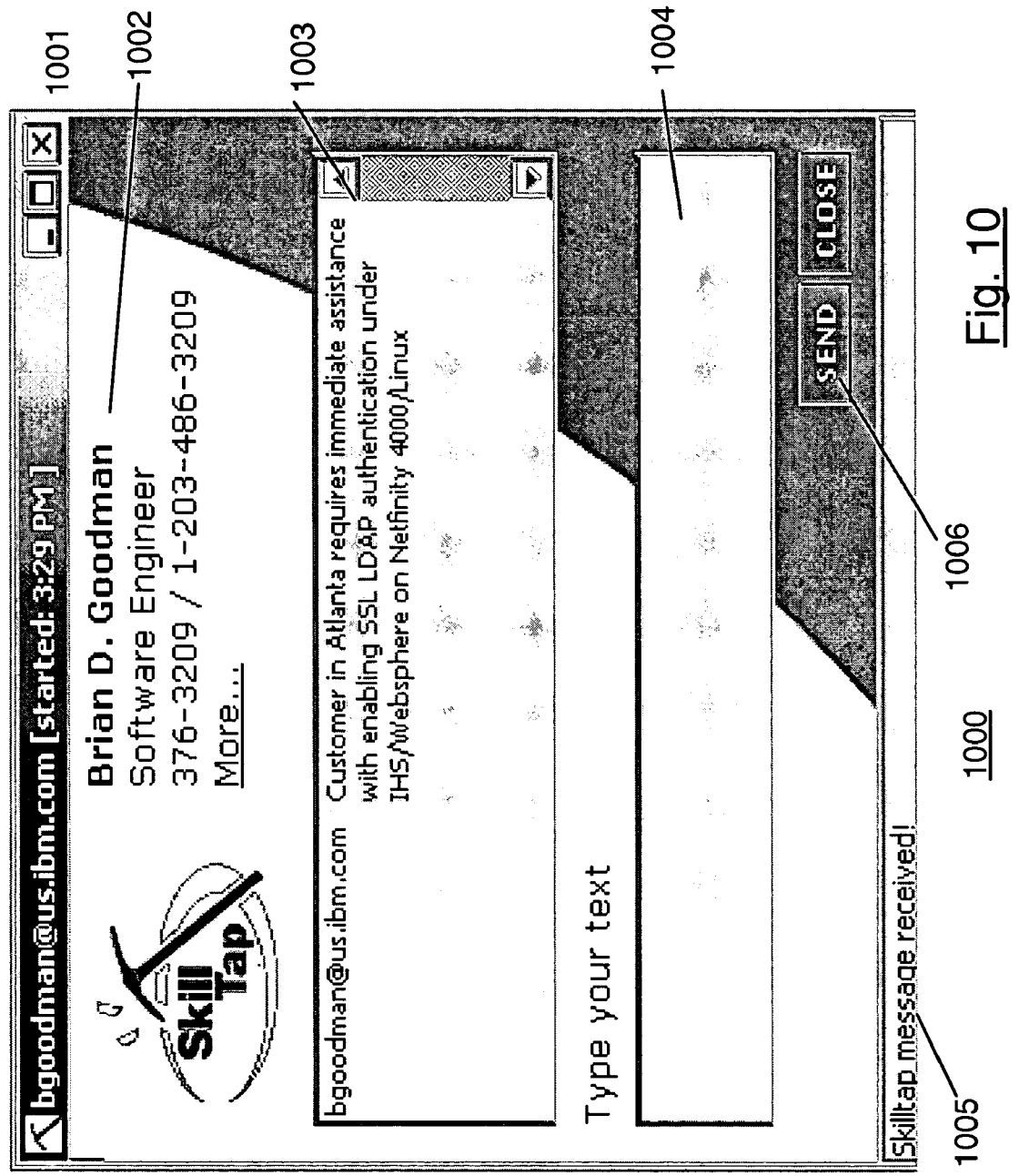
FIG. 10 is a listener's window comprising the initial request.

If the listener wants to proceed, he hits "Yes" and the window depicted in FIG. 10 is displayed. This window 1000 is similar to any IM window. In the preferred embodiment the window shows additional information about the requester 1002, in this case Brian's name, occupation, phone number and a hyperlink for more information about Brian. The information having been retrieved from data bases or subscription information. The listener is presented with the request message in the top field and in a second field is provided a place to type his response. His response includes text only or in another embodiment, the listener provides a link to image, audio or video information or any other media known in the art. Once the listener has typed his response he hits the "Send" UI (User Interface) button.

Figure 11:
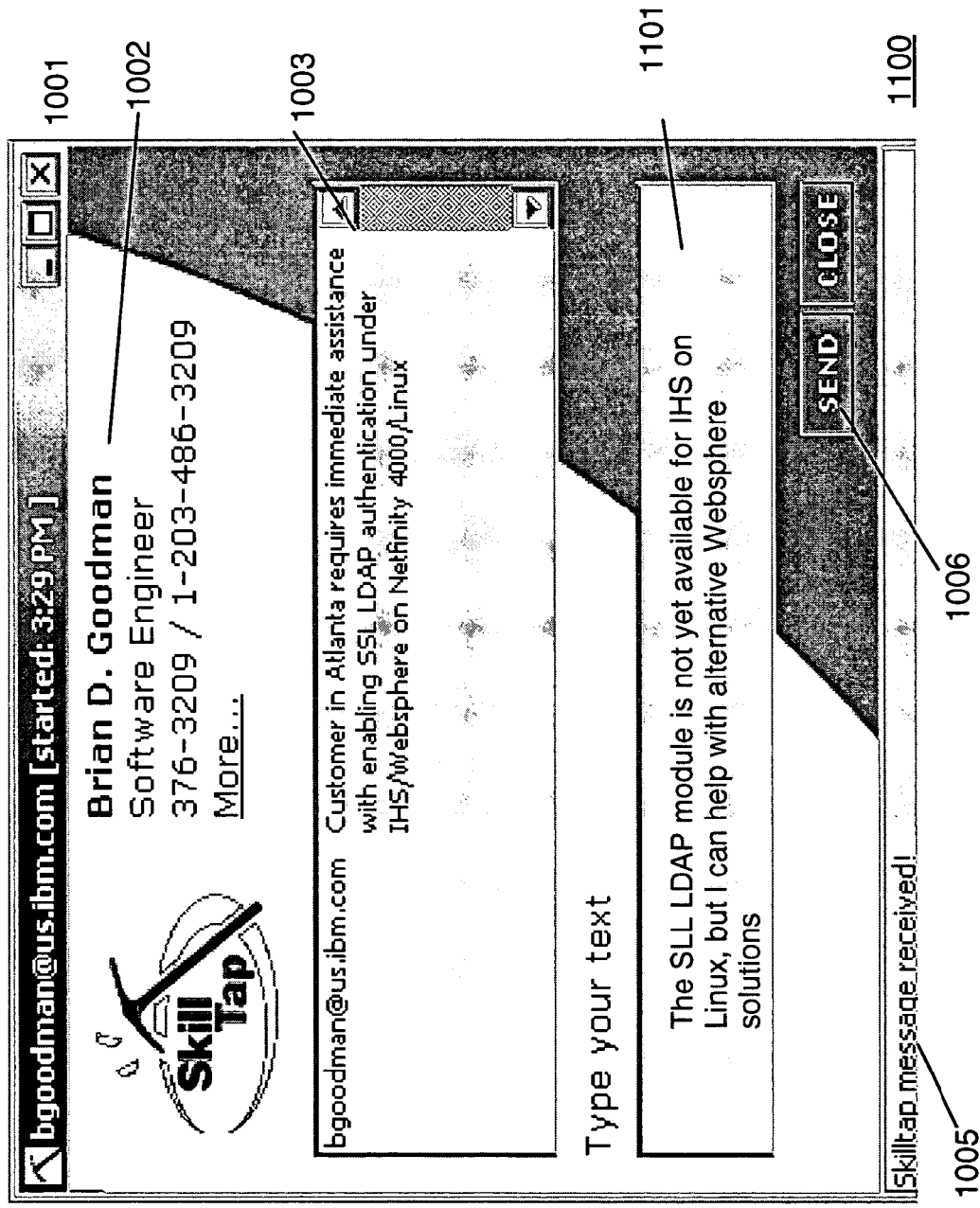
FIG. 11 is a listener's IM window comprising the listener's response text.

FIG. 11 shows the listener's window after he has entered his response 1101.

Figure 12:
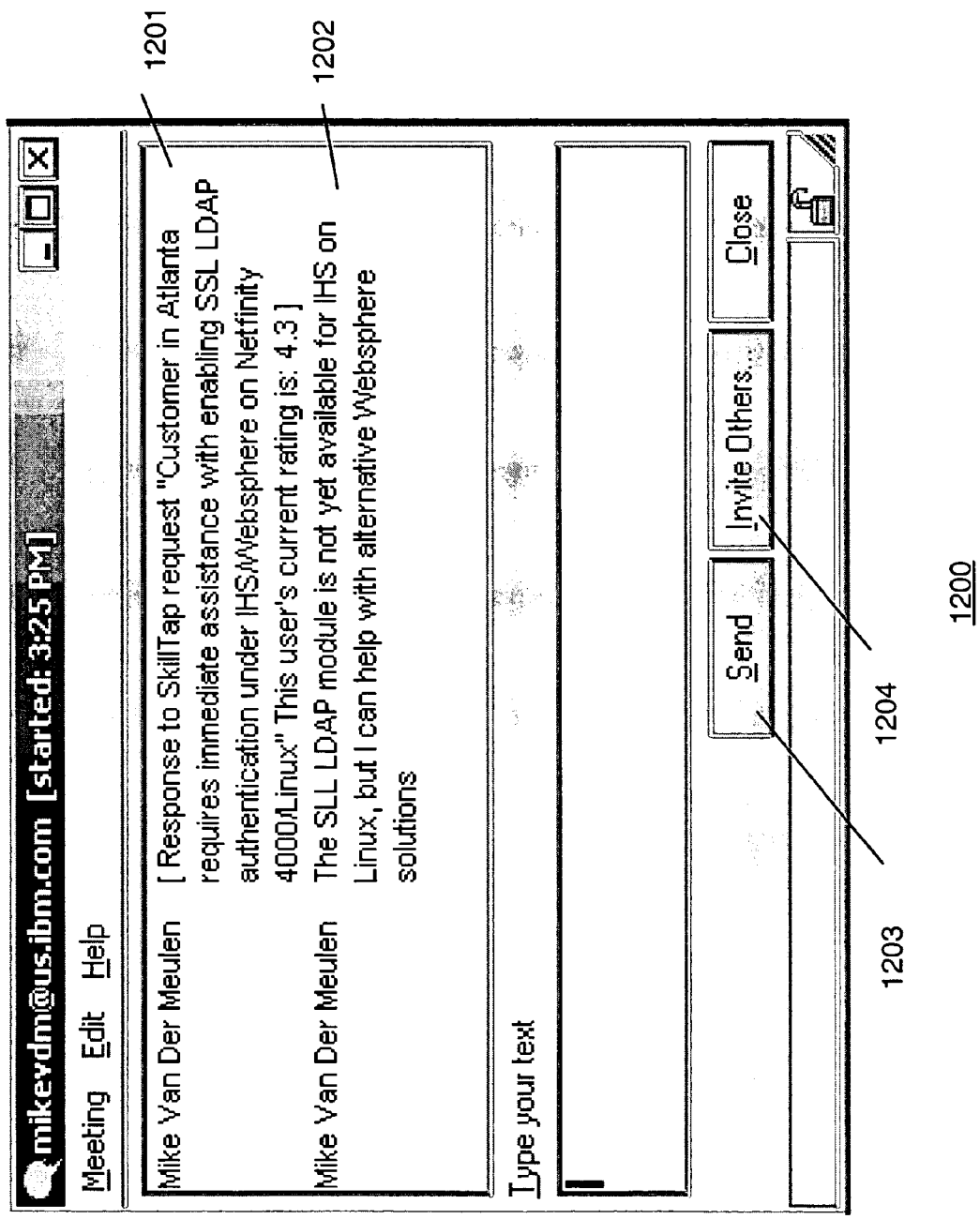
FIG. 12 is the requester's IM window opened by the listener's first response.

FIG. 12 shows Brian's window after receiving one response. Note that in a preferred embodiment, Brian is reminded by SkillTap of his original request and that the IM transactions relate to that request. If Brian wanted to begin a new request, a new set of windows would be created and each one would remind Brian of the topic of his request. Part of the SkillTap service function is to provide an indication of the value of the responding listener's credentials. In the embodiment shown, the SkillTap application has asked past requesters to rate responding listener's on a 1-5 basis. The responder "Mike Van Der Meulen" in the example currently has an accumulated rating value of 4.3. The responses from Listeners open normal IM windows at the requesters' terminal, in this case IBM Sametime IM. In one embodiment, Brian elects to have one IM window displaying conversations related to his first request from multiple listeners. In a preferred embodiment, the SkillTap application allows Brian to use his mouse to drag a conversation window into another conversation window. The resulting new combination window displays messages from both listeners in a single window. Similarly, Brian uses his mouse to drag a user's message out of the window which creates a new conversation window for that conversation and optionally eliminates the dragged user from the original window.

Figure 13:
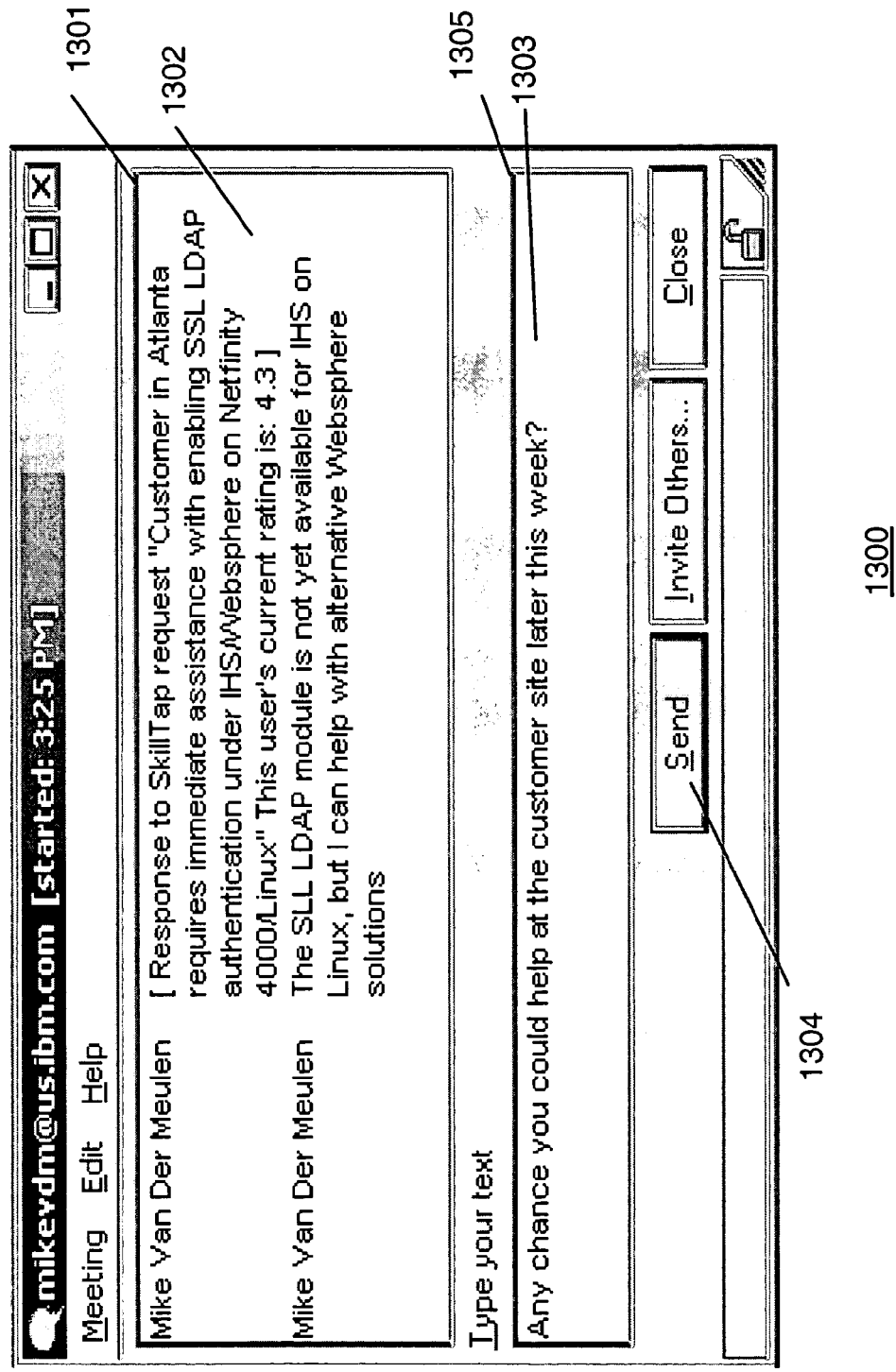
FIG. 13 is the requester's IM window including a reply to the listener's message.

In FIG. 13, Brian continues the communication by entering his IM text directed to Mike. In another embodiment, continued negotiations via IMs are broadcast to all listeners.

Figure 14:
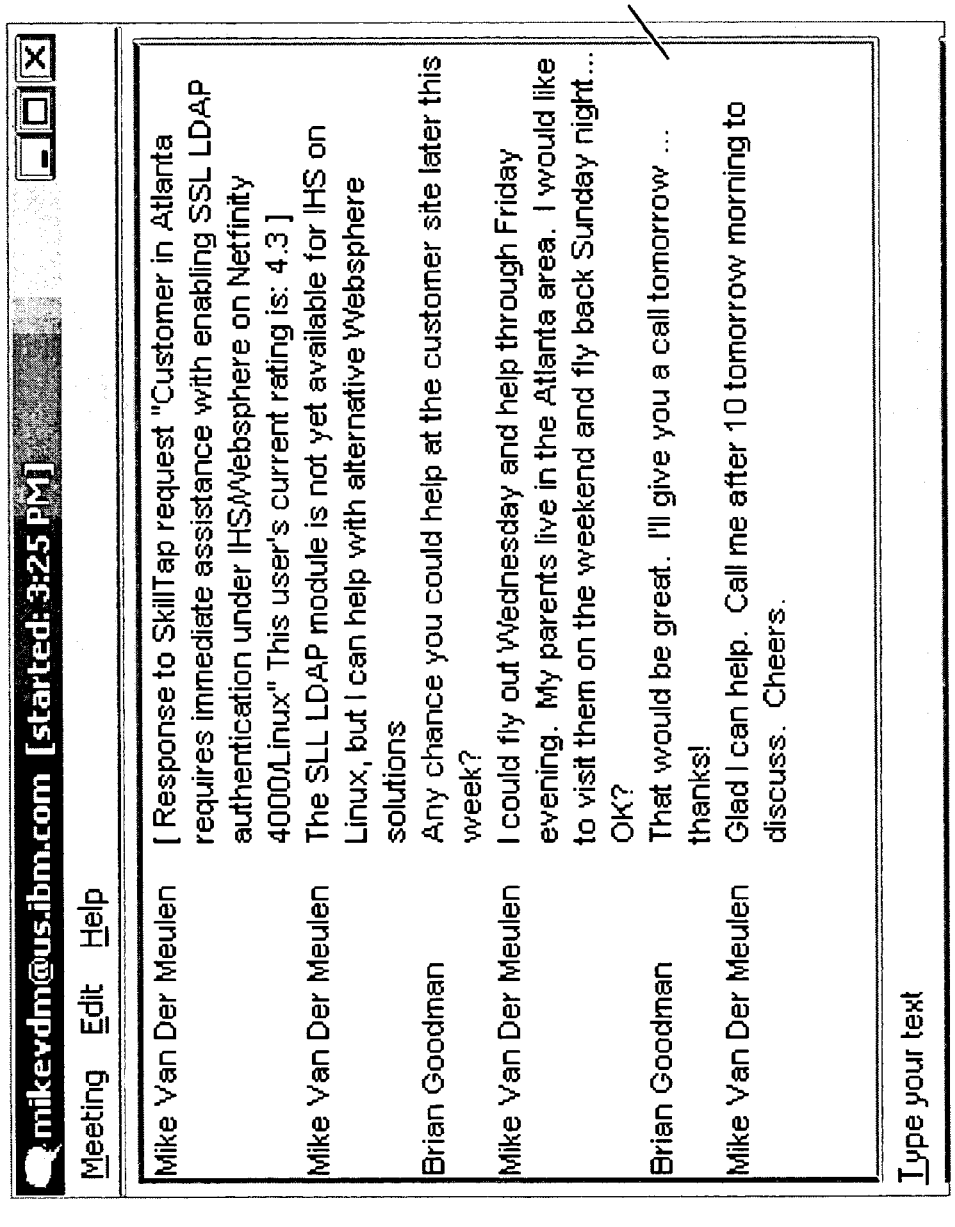
FIG. 14 is the IM window comprising the session communication.

FIG. 14 shows Brian's IM window after all negotiations with Mike have been completed. Brian closes this window to end communications.

Figure 15:
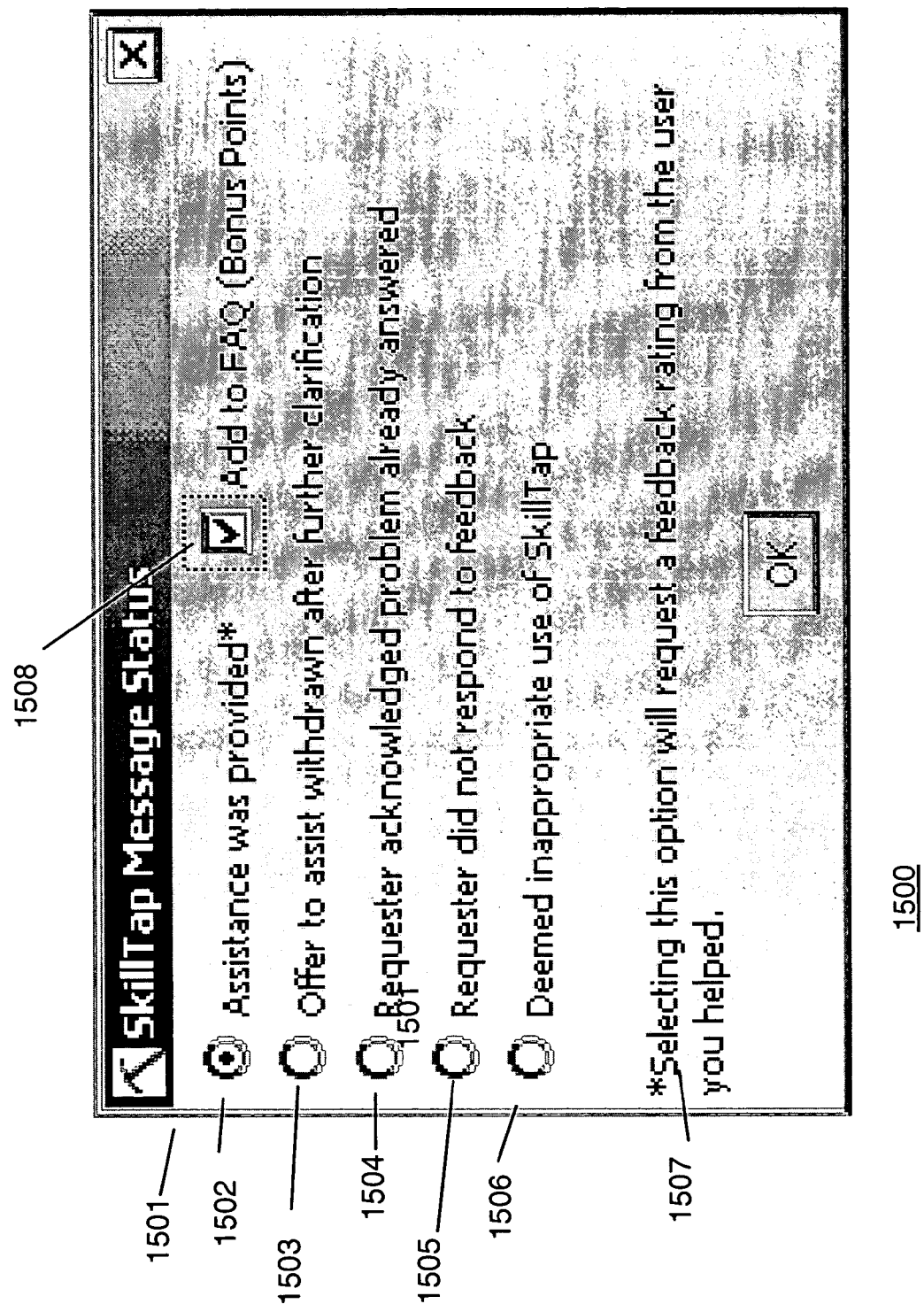
FIG. 15 is an optional requester window opened at conclusion of a session.

FIG. 15 depicts a preferred embodiment of a method for the SkillTap service to assess the value of the responder's participation. In the example, a window appears when the conversation is closed. The window permits the requester to select from a list of predetermined categories. In the example, Brian selects "Assistance was provided*". He also checks the "Add to FAQ" function.

Figure 16:
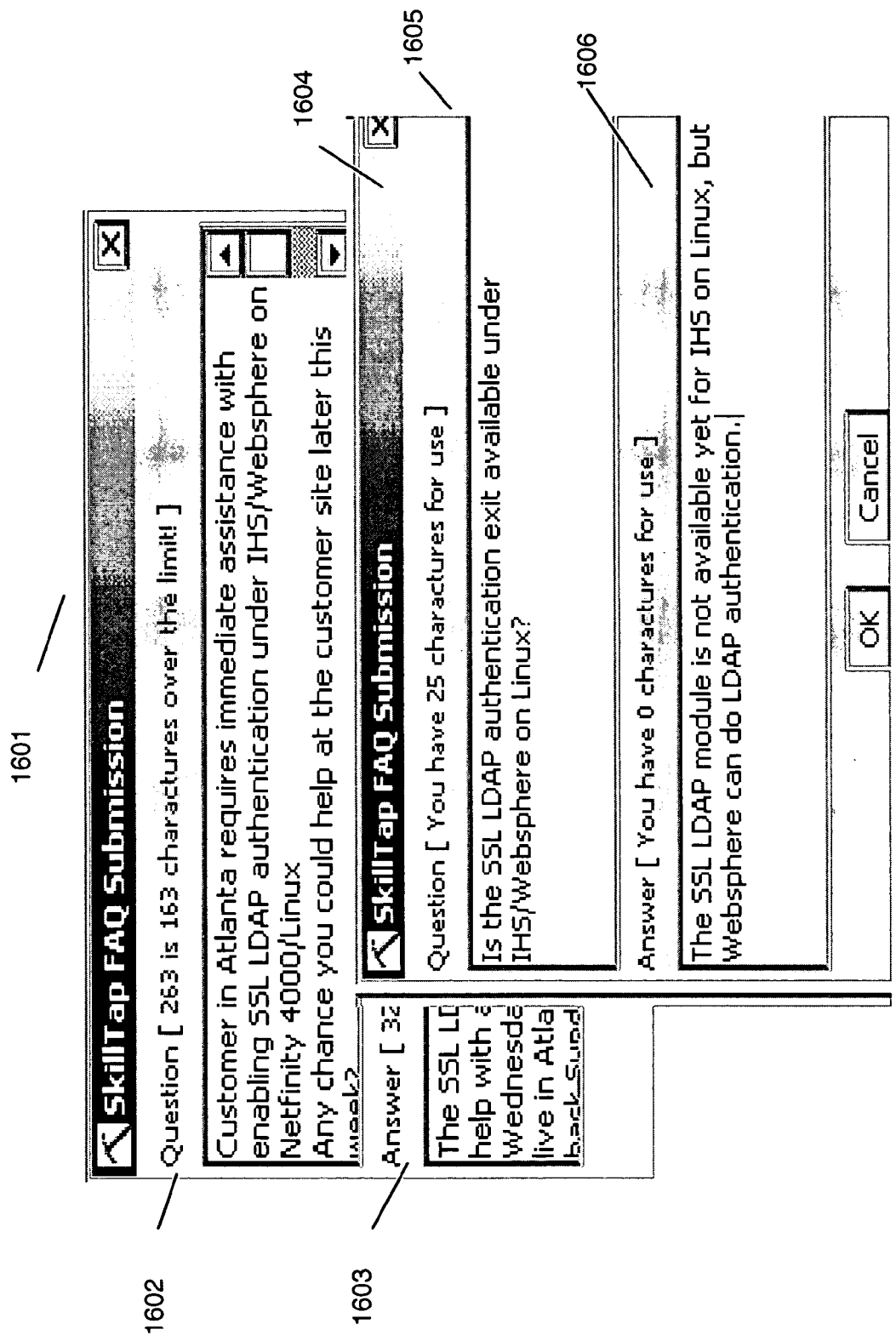
FIG. 16 is a requester window for creating a FAQ.

In the next window of the example, FIG. 16 shows an embodiment of a FAQ creation window. In this embodiment, Brian is presented two fields, one containing text from Brian and the other containing text from Mike. Brian edits these windows (or in another embodiment, types into new windows) to create a brief paraphrase of the question and a brief paraphrase of the answer. In one embodiment of the present invention, Brian's value rating is increased by creating the FAQ. This is an incentive for Brian since his value rating will be seen when he is a responder listener to a request from another user.

Figure 17:
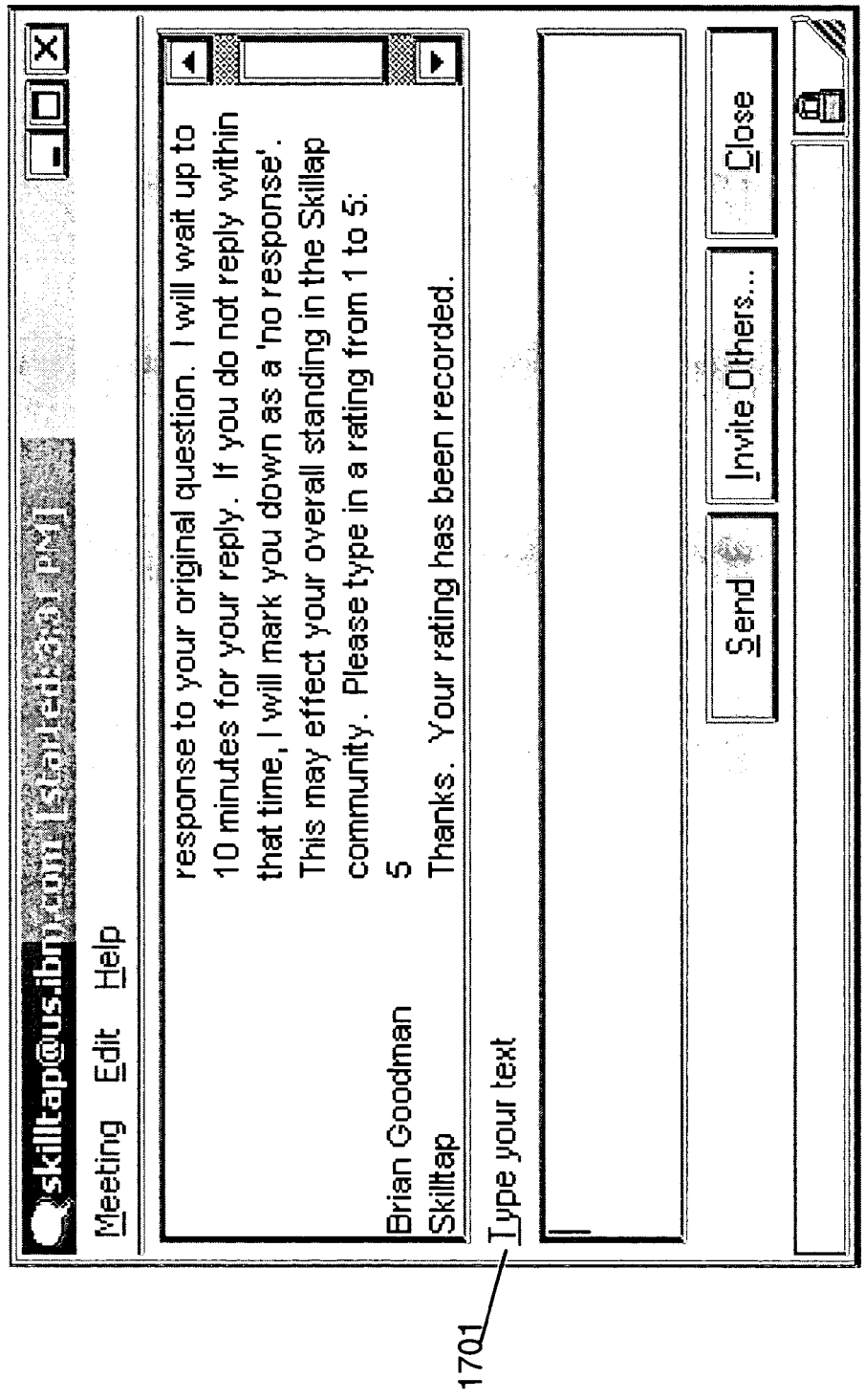
FIG. 17 is an automated message requesting a value rating from the requester.

FIG. 17, shows SkillTap (an agent program Bot) asking Brian to rate Mike's response and explains the criteria. Mike's rating is provided to the SkillTap service and will be provided with Mike's response to future listening. In one embodiment, the value rating of listeners is used to prioritize responses from listeners.

In one embodiment, users can see their relative value rating by asking SkillTap for their standing. Mike, for instance could see that he is currently the 10th rated listener overall.

In another embodiment of the present invention, a SkillTap application optionally receives messages or publishes messages other than IMs. Messages can be transmitted/received using any media including for example: telephone, wireless, personal devices, voice to text, text to voice or automated applications. Messages can include attachments of image, audio, video, program applications, network invoking mechanisms (including hyperlinks, Web URLs) and the like.

In one embodiment, SkillTap comprises a throttling means to limit the number of messages. Responses to the requester are limited by any of a predetermined number of messages, a predetermined time window, a predetermined algorithm of priority (based on message content) or message sender's credentials and the like.

In another embodiment, SkillTap prioritizes publication of the request such that an initial publication goes to one set of listeners, a second publication goes to another set of listeners. The decision to publish to sets of listeners is either time based, response based, or explicitly requested by the requester.

In a preferred embodiment, SkillTap first sends the request to an active agent that queries a database for responses. The database is preferably a FAQ database but in another implementation, may be a query on cached responses accumulated from other SkillTap sessions.

In a preferred implementation, SkillTap requests include keywords to direct SkillTap action. A question to listeners uses "Ask"; a question to FAQ uses "FAQ", an IM to SkillTap to set parameters or controls uses "PARM". In another implementation, SkillTap interacts with the requester. For example, the requester submits a question using "Ask" and SkillTap responds with a list of groups for the request to be directed to such as "All", "US", "Japan", "Hardware", "Programmer", "Marketing", "FAQ". The requester responds with his selection and SkillTap then broadcasts the request to the selected group of listeners.

Figure 18:
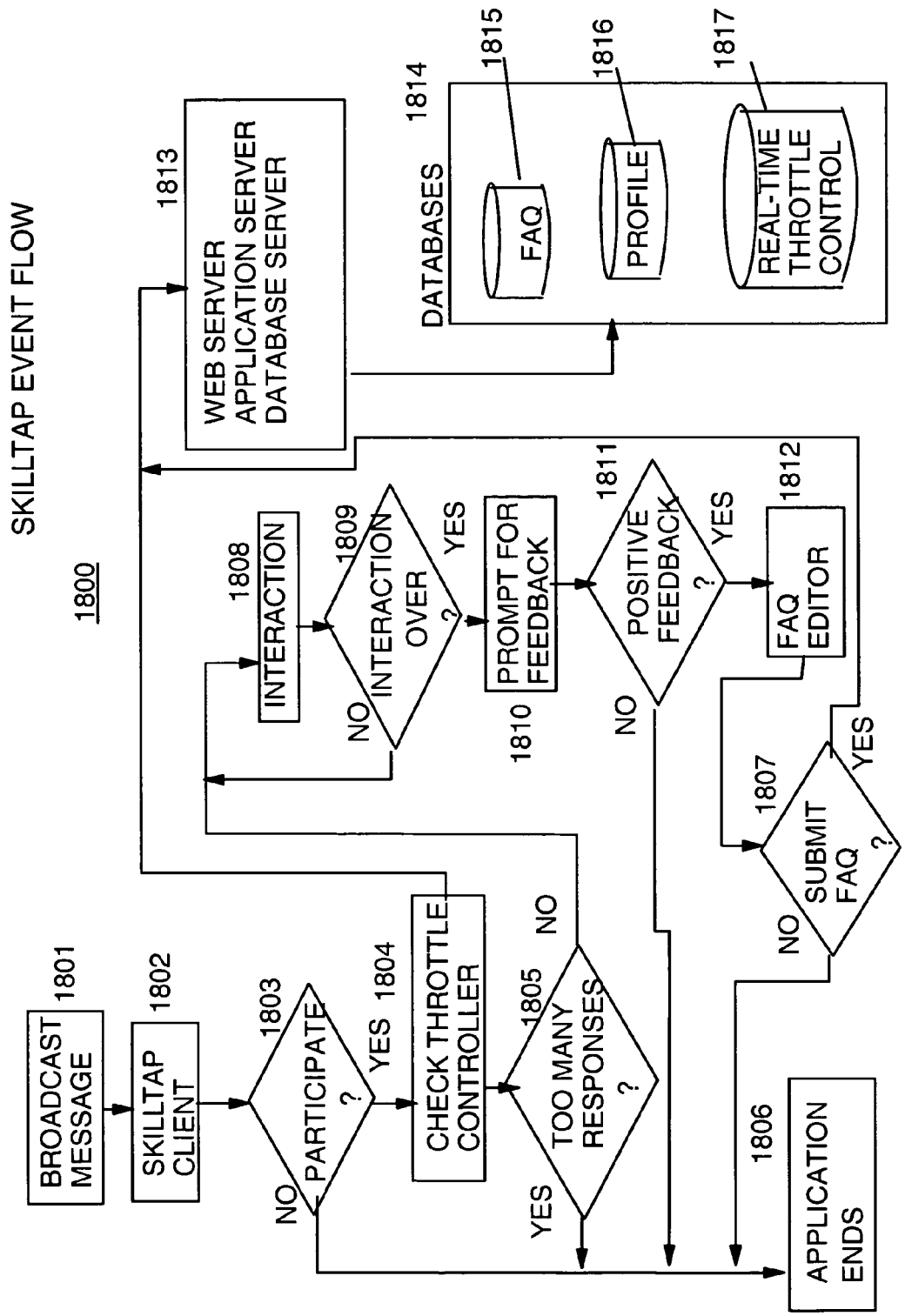
FIG. 18 is a flowchart of the events of an embodiment of the invention.

FIG. 18 depicts a flowchart of the SkillTap events. The requesters message is broadcast 1801 (published) to SkillTap client applications 1802 (listeners) that have subscribed to SkillTap. The SkillTap client application looks at the message and decides whether to present it to the user (listener). If the user decides to participate 1803, he sends a response message. The SkillTap throttle controller 1804 checks to determine if the throttle threshold has been met using parameters in the database 1817. If there aren't too many responders, interaction is enabled 1808 between the requester and responder(s). When the requester finishes his interaction 1809, he is prompted for feedback 1810 about the value of the responder. If the requester elects 1811 to create a FAQ entry, he does so using the FAQ editor 1812. When the FAQ is complete, it is submitted 1807 to the database 1815.

Figure 19:
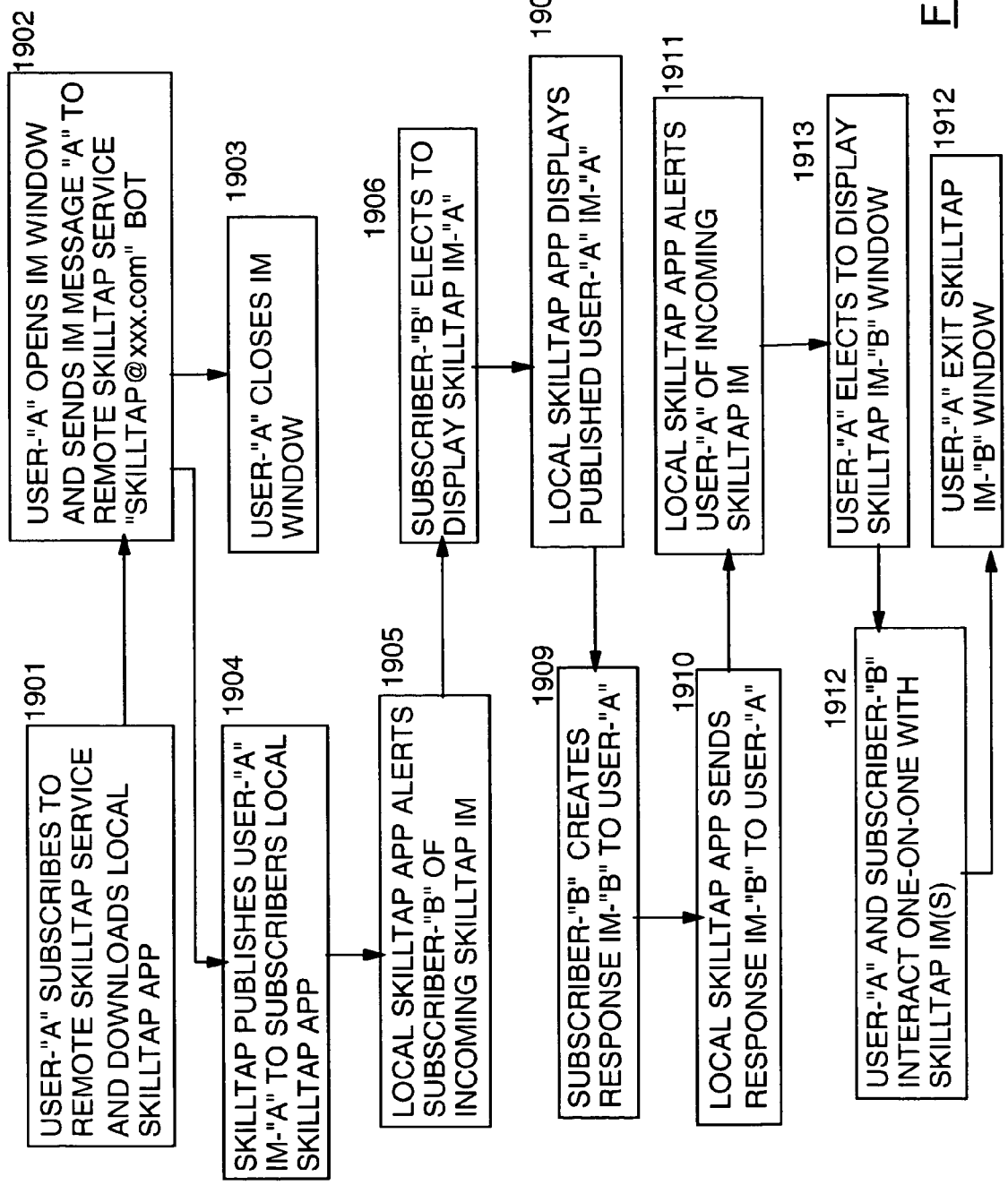
FIG. 19 is a flowchart depicting function of the invention.

FIG. 19 depicts the major events of setting up a skilltap channel, broadcasting a communication request via a pub/sub engine, engaging in communication with a subscriber to the skilltap channel and closing a communication session.

A User "A" wishes to participate in skilltap group communication. He downloads to his client a local skilltap application 1901. He also downloads a shotgun application (may be part of the download of skilltap). Shotgun provides the GUI for subscribing to a channel of skilltap and for setting up message options such as filters, throttles and the like for skilltap messages. The Shotgun server maintains a list of subscribers for each channel. When a new subscriber joins the channel, he is authenticated and authorized and his network address is added to the list of approved subscriber for the channel (the channel's community of users). A user can use the GUI at any time to join or leave a Channel or alter his options. The user uses the GUI to get authorization to subscribe and/or publish for each channel. He is authenticated and approved based on credentials required by the specific implementation.

Figure 20:
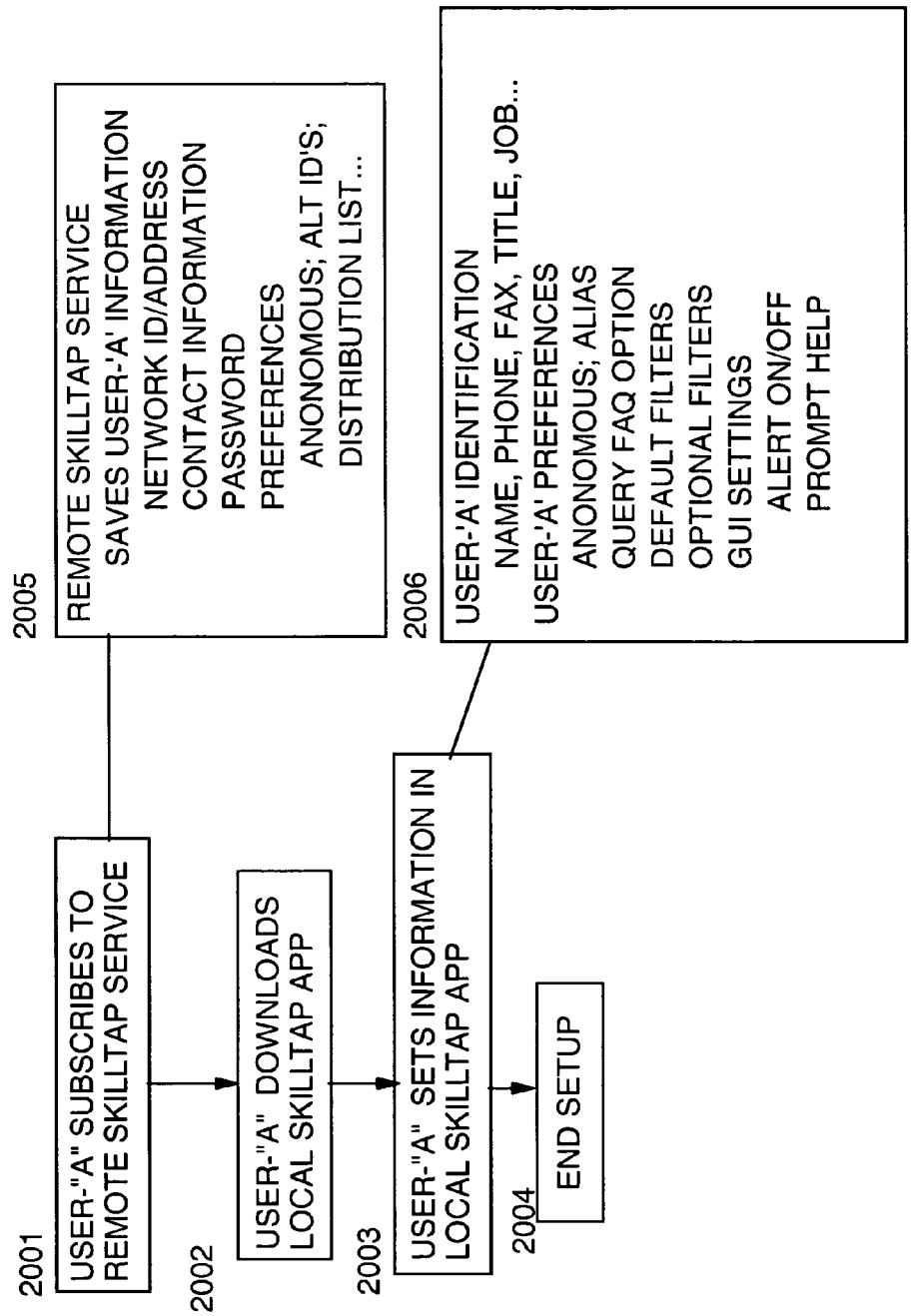
FIG. 20 is a flowchart expanding a setup scenario.

In FIG. 20, User "A" interacts 1901 2001 with a web based subscription service (or alternatively, after downloading Skilltap, opens the Skilltap GUI and uses it) to subscribe 2001 to the remote skilltap service 2005. The remote service in one embodiment saves information about User "A" during the subscription process. Such information as the user's network address/ID, contact information (telephone number, email . . . ), nickname, password, and preferences. Preferences include such things as: whether the user wants to be anonymous in transactions with other users in a skilltap session. Anonymity is maintained by skilltap by acting as a forwarding address for communication where skilltap supplies a temporary address/ID for others to use in communication with user "A"; Alternate ID's, where User "A" wishes to provide more than one network address/ID, and Distribution lists for SkillTap to forward messages to others to allow others to participate in the communication session or alternatively, for SkillTap to provide temporary subscription to a group so that the user can provide an adjunct list of group members. The user downloads a local skilltap application 2002 to his client if he hasn't already.

The local skilltap application is personalized 2003 with information 2006 useful for communications sessions. Information includes identifying information such as User "A"'s Name, nickname, phone number(s), Fax number(s), Job Title, Expertise and the like. Local Skilltap also records the user's preferences for SkillTap such as if he wants anonymity or warning if he is about to break anonymity, his alias name, whether he wants to invoke a FAQ active agent robot as one of the recipients of his messages, default global filters for incoming messages, optional filters which can be invoked by a skilltap GUI may be nicknamed so the user associate their function easily. The Skilltap GUI settings identify whether the user wants to be alerted to incoming messages, whether he wants prompts and whether he wants a help function. The user then closes his setup GUI window 2004 and he is ready to go. In the preferred embodiment, anyone who wants to participate in SkillTap must download skilltap and perform the setup for their client. In another embodiment, Skilltap at the remote server, performs subscription and publishes IMs to subscribers who use standard IM applications to respond. The response IM is sent to the skilltap service as if it were the requester. The requester opens and closes an IM session with SkillTap as in other embodiments but in this embodiment, SkillTap service opens a second standard IM session to subscribers who respond in the second IM session. SkillTap then opens a third standard IM session with the initiator as a surrogate for the responder. The Skilltap service forwards the IM to the requester on behalf of the user. Thus, no local copy of skilltap is required.

Figure 21:
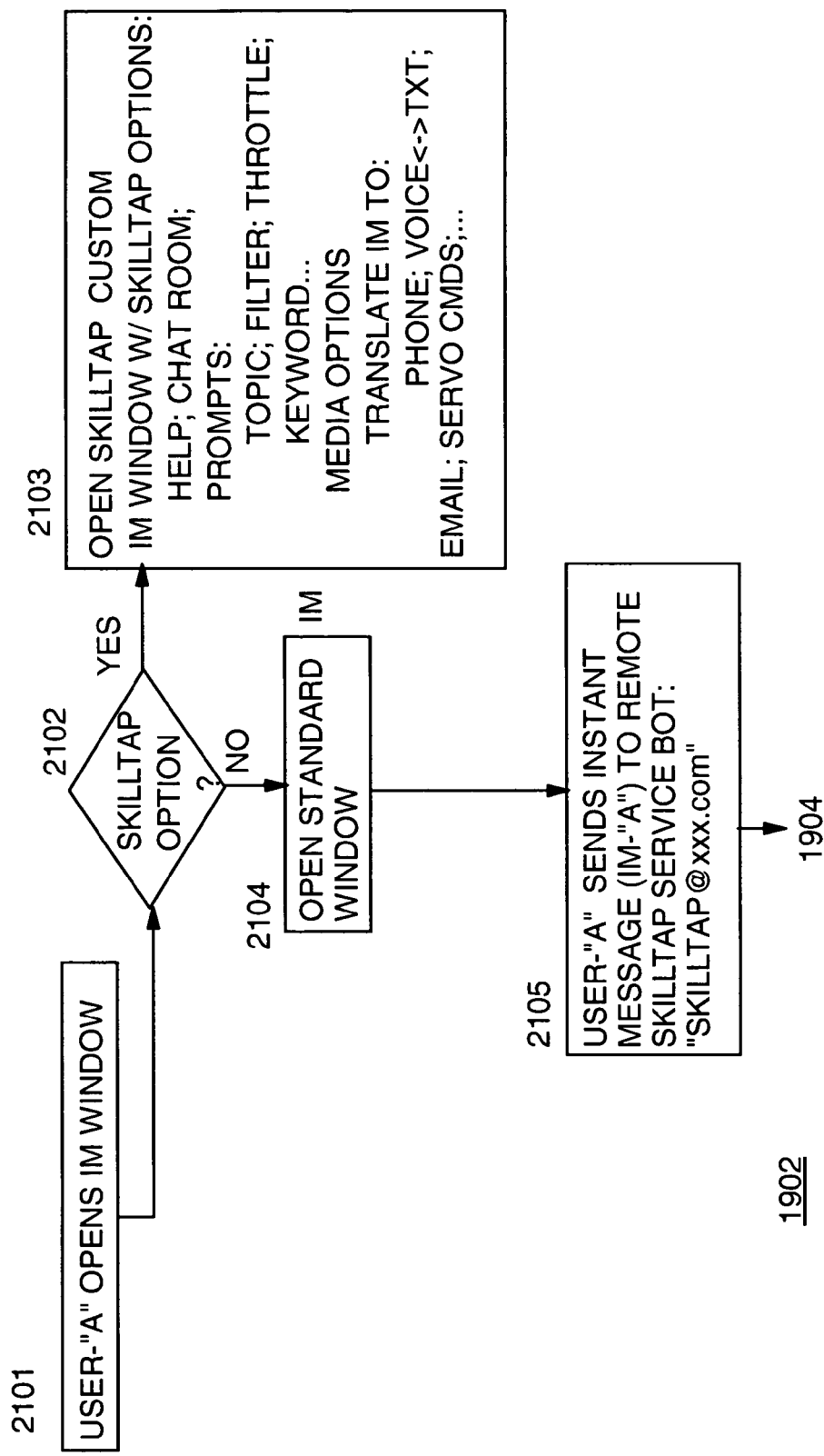
FIG. 21 is a flowchart expanding initiating a message to skilltap.

When User "A" wishes to initiate a conversation FIG. 21 with subscribers 1902 (send a request message: "Ask . . . "), he does so by sending a standard IM message 2105 to a Bot "SkillTap@xxx.com". The IM message is sent to an active agent in the SkillTap service via IM 2104. In another embodiment, the user can elect 2103 to have SkillTap provide a special GUI for IMs 2103. The special GUI provides IM services and SkillTap options. The options include Help, invoking a temporary chat room, prompting the initiator for such things as Topic of conversation, Filters and Throttles for response messages, Keyword prompts for special functions (Ask . . . ) also media options such as invoking a translator to allow IMs to translate to/from phones, Voice <-> Text; email, mechanical controls for automation of machines and any media available to one skilled in the art.

Figure 22:
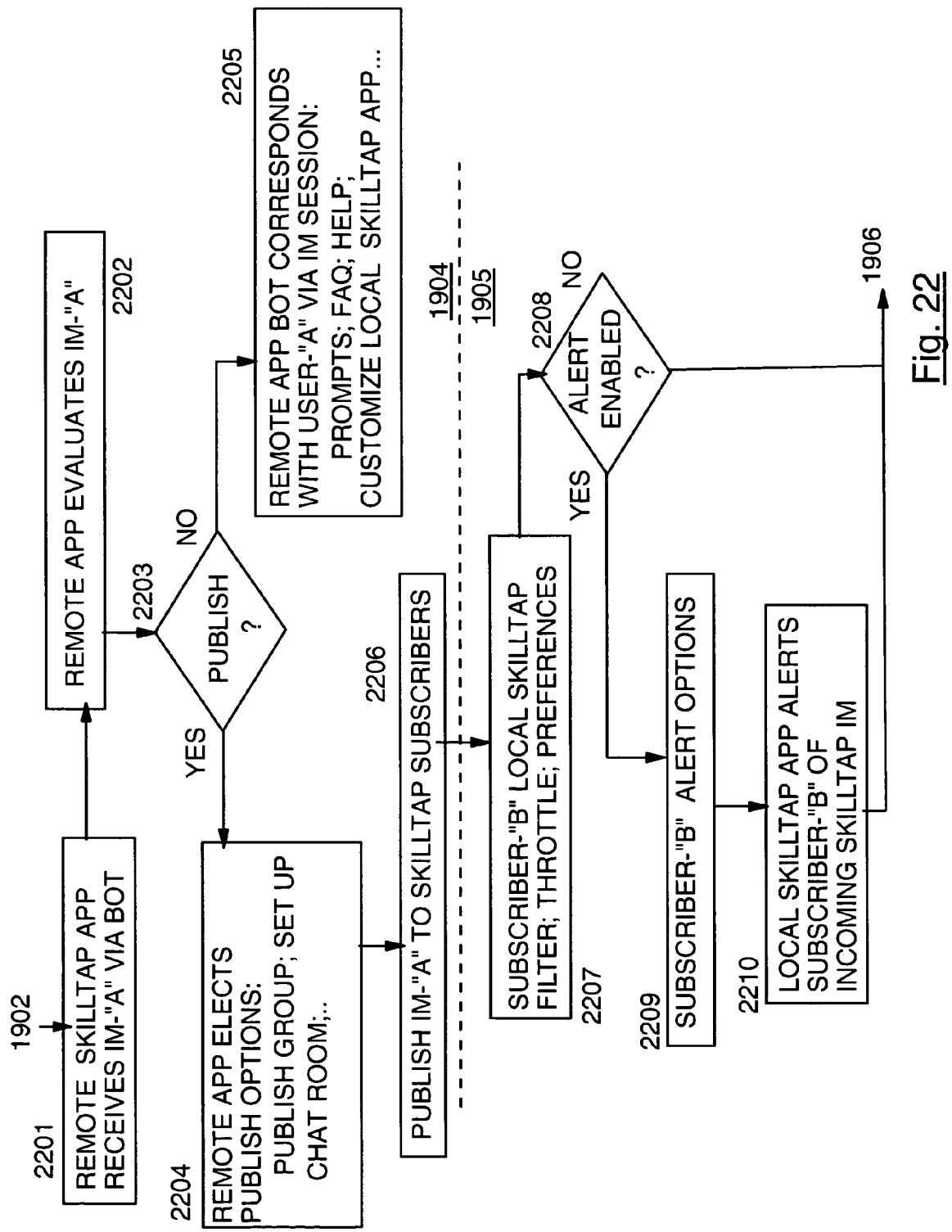
FIG. 22 is a flowchart expanding receiving an initiating message.

Referring to FIG. 22, the SkillTap service (Remote SkillTap App) receives the IM message "A" from User "A" 1903 2201 and evaluates the message 2202. SkillTap decides 2203 to either publish 2206 the message 2204 or not 2205. SkillTap retrieves the list of approved subscribers assigned to a channel which list includes the network address for the subscribers. Skilltap will publish IM message "A" to the addresses on the list. In one embodiment 2204, SkillTap publishes to a subscriber group or elects to create a Chat Room such that the User 'A' conversation can be joined by more than one Subscriber. Some IM messages to SkillTap 2205 may not be published but used by IM to converse with User "A". These IM conversations support such things as SkillTap Prompts for such things as how-to, SkillTap FAQ access, Help support, SkillTap Web masters, customizing of local SkillTap applications and plug-in requests. When IM message "A" is published to subscribers 2206, User "A" closes his IM session and waits for responders to initiate SkillTap IM sessions.

Subscriber "B" is one of the subscribers to the SkillTap channel User "A" is using. Subscriber "B" has setup his local SkillTap application (as described for User "A" 1901) to Filter incoming messages, Throttle the incoming message activity and setup preferences for incoming communication. As part of the setup Subscriber "B" can elect to be warned of incoming messages by enabling 2208 an alert mechanism. In one embodiment, Alert options 2209 include whether the alert is an audible signal, a visual signal or a displayed icon.

When the Standard IM message "A" is published to Subscriber "B", the Local SkillTap application 1905 alerts 2210 him of the incoming message. The Alert in one embodiment is includes electing to display information about User "A", a Topic, or the full text message. A second alert in the embodiment (not shown) allows the user to elect whether or not to display other media such as a Browser URL site.

Figure 23:
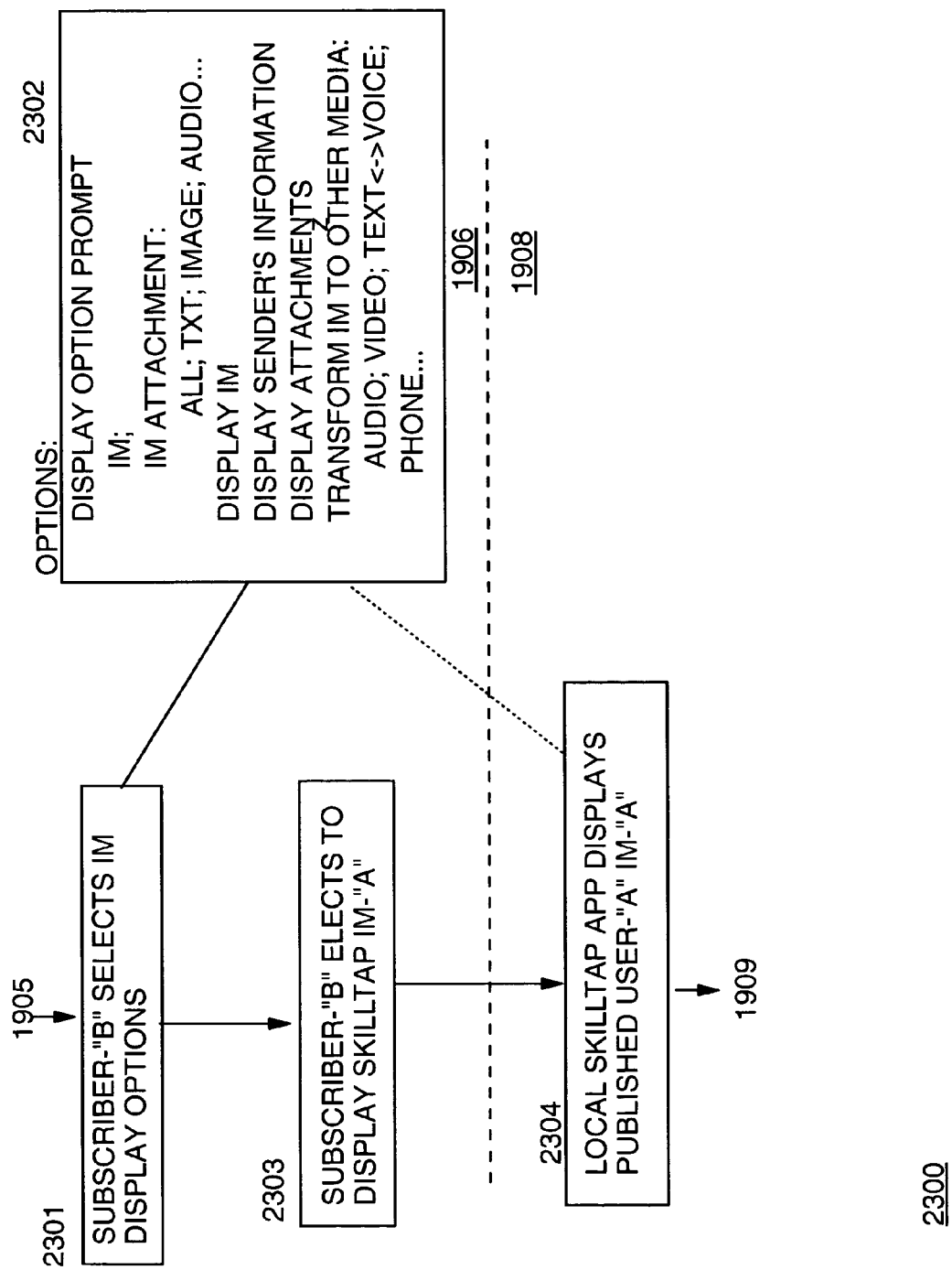
FIG. 23 is a flowchart expanding displaying an initiating message.

In FIG. 23, if the subscriber elects to display options (from the alert icon) 1906 2301, a GUI allow him to optionally select 2302 being prompted for display of the IM text, IM attachments (i.e., Text Files, Images, Audio, Video, Text <-> Voice . . . He can elect to display the IM messages, Display User "A" information (Name, title, job), or display of the IM text, IM attachments (i.e., Text Files, Images, Audio, Video, Text <-> Voice . . . Using the options, the Subscriber displays 2303 the incoming IM message "A" 1908 2304 in a Special SkillTap IM GUI window.

Figure 24:
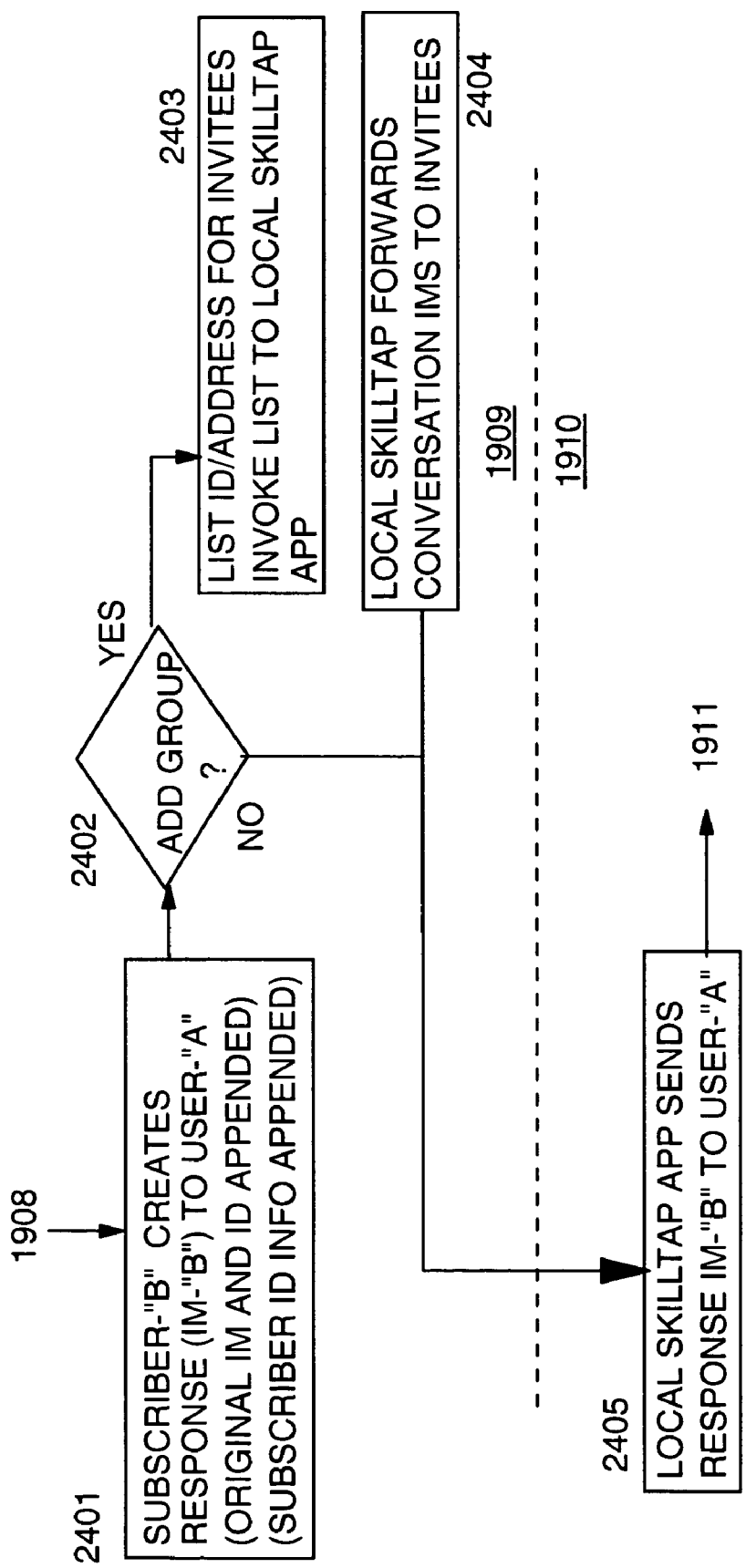
FIG. 24 is a flowchart expanding responding to an initiating message.

If Subscriber "B" wishes to respond 1909 (join a conversation with User "A") FIG. 24, he types a response text and optionally attaches other media into the special GUI. The special GUI in a preferred embodiment appends the original message to the text and identifying information about the Subscriber (Name, Phone, Title . . . ) 2401. In one embodiment, the Subscriber elects 2402 to add a group distribution list to copy messages 2404 to other IM users for this conversation. In another embodiment, the Subscriber invokes a temporary Chat Room function for the conversation by way of his local SkillTap application. The subscriber's response is transmitted to User "A" 1910 2405.

Figure 25:
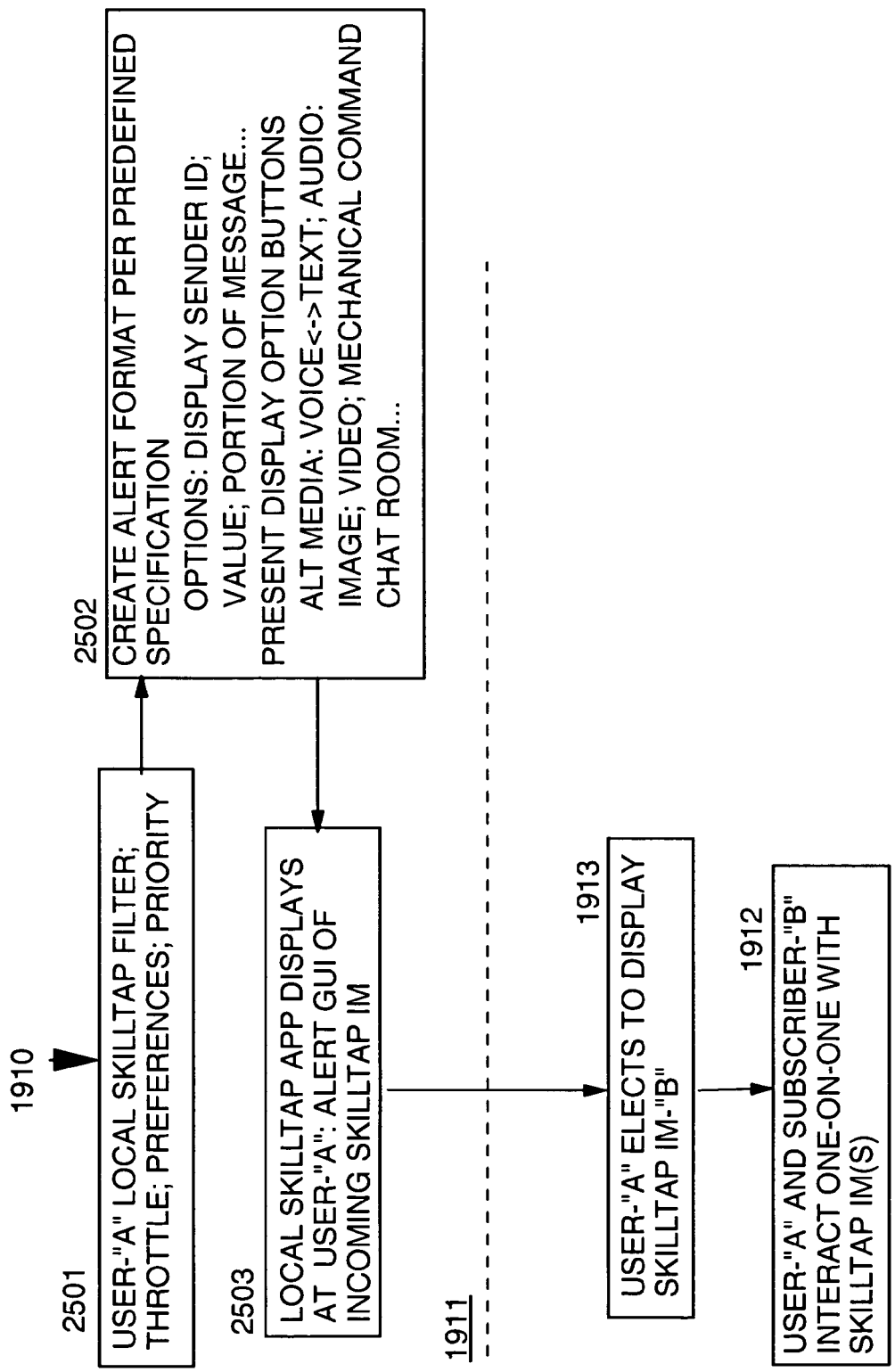
FIG. 25 is a flowchart expanding receiving response message.

In FIG. 25 1911, the response IM message "B" from Subscriber "B" SkillTap IM message "B" is operated on 2501 by Content Filters, Throttling techniques, User preferences and message priority. The preferences 2502 include customizing the special incoming alert message GUI and display options. Based on the options, a local SkillTap application presents an alert of an incoming SkillTap response IM 2503. If the User "A" elects to display the response skilltap IM message "B" and join the conversation with Subscriber "B" 1913, the one to one special IM conversation is begun 1912. During the conversation, the original IM is appended. If User "A" wishes to start a new session, he issues a standard IM to the SkillTap Bot and a new conversation window will be opened. For that matter, a separate conversation window is opened by an initial response from each subscriber. In another embodiment, a common window is opened for a session using Chat Room technology allowing the Initiator (User "A" to selectively allow more than one Subscriber to join the conversation in a common GUI window.

In one embodiment, an active agent responds to the publication of User "A"'s initial message providing responses by querying a FAQ database. User "A" may or may not be informed that the responder is a robot Bot.

Figure 26:
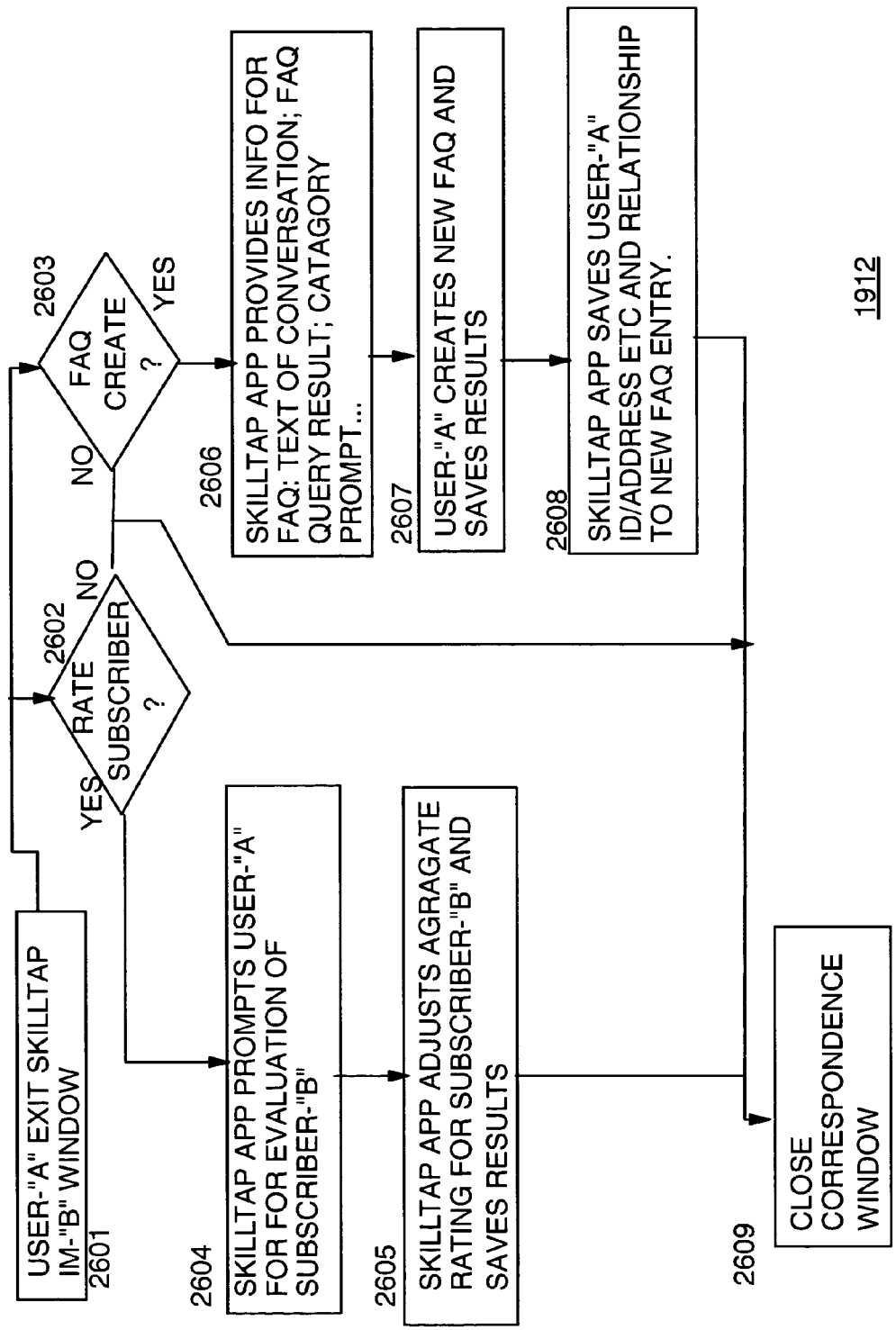
FIG. 26 is a flowchart expanding post correspondence options.

Referring to FIG. 26 at 1912, after User "A" has finished his conversation with Subscriber "B", he exits the special SkillTap GUI IM window 2601. SkillTap provides the option for User "A" to elect 2602 to evaluate Subscriber "B'"s help and to elect 2603 to create a FAQ.

In rating the Subscriber, the SkillTap application prompts User "A" for evaluation categories and ratings 2604. SkillTap in a preferred embodiment, aggregates ratings for the subscriber (may be a simple averaging of scores accumulated from all requests to subscriber "B") into a single rating. This score is optionally presented with any response from Subscriber "B". It can also be used by filters to prioritize responses from subscribers. In one embodiment, evaluations of subscribers is also related to topic such that the same subscriber may have a value rating of 5 for computers and 3 for programs. The topics are pre-assigned by SkillTap.

If the user elects 2603 to create a FAQ, SkillTap provides an editable GUI containing the messages from the conversations from all subscribers responding to the request or in another embodiment 2606, the GUI only displays the Subscriber "B" information. The GUI can optionally display related FAQ information as a result of a user query and can prompt User "A" to step him through the FAQ creation steps. When the user is satisfied with his new FAQ entry, SkillTap saves the results 2607 in the FAQ database. In one embodiment 2608 SkillTap associates User "A" with the FAQ entry such that when the FAQ is queried in the future, the users can see who the expert was that created the entry and how to contact him (network ID/Address, Phone etc). When the user is done, he closes his special SkillTap conversation GUI window 2609.

The present invention provides a method for creating dynamic interactive messages, also known as notifications or alerts. Such messages may be defined by an extensible message format to define graphical user interface representation and the methods by which the computer environment and end user might interact with said message.

The following represents example services enabled by the present invention. The first three examples uses alerts in an Education domain such as High School, University or Commercial enterprise:

| | |
|---|---|
| Domain | Education |
| Purpose | Curriculum component |
| Description | Real-time ask/answer with greater population during classroom learning. "Back channel" type learning . . . asking community about topic being covered. |
| Domain | Education |
| Purpose | Support network/Tutoring |
| Description | Basic Q&A. Tutor/Teacher communicating to class/pupils for real time feedback or instruction. |
| Domain | Education |
| Purpose | Academic collaboration |
| Description | Researchers networked to do live Q&A or knowledge validation. Parallel proofing or experiment verification. |
| Domain | Science |
| Purpose | P2P/Grid Applications/Computational or Experimental Process |
| Description | Real time notification/coordination. Thinking P2P applications like the Gene splicing or SETI do computation on the same work unit many times over. This system would provide a method by which when a given unit has been identified as having been completed, blast and response notification can be performed to interrupt and current redundant efforts. |
| Domain | Science |
| Purpose | Experiment plumbing |
| Description | Stimulus response mechanism. Broadcast to entire community a question or visual etc. Response happens in real time across entire population. |

-continued

| | |
|---|---|
| Domain | Medial |
| Purpose | Counsel |
| Description | Real-time medical analysis broadcast for diagnosis. Real-time second opinion. Blast including health charts, pointer to health charts etc. Blast containing persona information to enable richer response. |
| Domain | Medical |
| Purpose | Emergency notification and counsel |
| Description | EMT to hospital or doctor/specialist. EMT arrives on the scene where they are able to stabilize but clearly there is immediate need to attention. Unable to move the victim. Call for which hospital is available for triage. Call for medical professional advice/counsel medical instruction. |
| Domain | Education |
| Purpose | Curriculum component |
| Description | Real-time ask/answer with greater population during classroom learning. "Back channel" type learning . . . asking community about topic being covered. |
| Domain | Airline |
| Purpose | Safety plane to plane communication |
| Description | Real-time Q&A assessment on weather or technical operation. |
| Domain | Airline |
| Purpose | Data verification |
| Description | Pilots/machines automatically requesting verification of current flight data. i.e. current bearing is long, lat, alt and speed. Verification from other entities to verify they can confirm said attitude. |
| Domain | Law Enforcement |
| Purpose | Task assessment |
| Description | Rookie or newbie to task is confronted with procedure. Request for help. Collaboration on task. |
| Domain | Law Enforcement |
| Purpose | Activity collaboration |
| Description | Political demonstrations happening on blocks x, y, z. Broadcast of current status or event such as an altercation, a breach of security etc. Coordination system. |
| Domain | Law Enforcement |
| Purpose | Advice counsel |
| Description | Local officer has stopped an out of state car. Real-time connection to out of state and federal jurisdiction support. Interstate crime collaboration . . . real-time jurisdiction hand off and coordination. |
| Domain | Security/Law enforcement |
| Purpose | 911/Alert |
| Description | Broadcast alert of a 911 status. Not just the police anymore. Anyone who is listening. |
| Domain | Security/Law enforcement |
| Purpose | Accident Alert |
| Description | Broadcast alert of accidents or delays on highway. Community as defined by automobiles or entities in the area is broadcasted to. |
| Domain | Security/Law enforcement |
| Purpose | Crime notification |
| Description | Auto theft or crime alert. Pertinent info with blast. |
| Domain | Security/Law enforcement |
| Purpose | Fire Alarm |
| Description | Alarm notification with instructions and location of danger. |
| Domain | Military |
| Purpose | Strategy collaboration |
| Description | Real-time status by community/battalion. Strategy collaboration and coordination. |
| Domain | Military |
| Purpose | Automatic "listen in" or "watch" request |
| Description | Real-time request for audio or visual access of a given community. Wherein request is automatically handled by target recipients and said recipients enable report audio and video streaming of their current situation and location. Think instant video wall ;-) |

-continued

| Domain | Support group/Therapy/Psychology |
|---|---|
| Purpose | Networking |
| Description | Interested in connecting with other people who supper from sleeping disorders etc. |
| Domain | Support group/Therapy/Psychology |
| Purpose | Help/Support |
| Description | Suicide hotline equivalent. Provides reach out capability to a possible anonymous community of support staff/community members. Which medications should not be mixed. |
| Domain | Business |
| Purpose | Human Resources/Job Applicant/Head Hunting |
| Description | Real-time credential check/personal voucher . . . anyone else get Joe Somebody applying for employment? What was the drug test? What was his last known address? Can you vouch for him/her . . . their credentials etc? |
| Domain | Business |
| Purpose | Human Resources/Job Applicant/Head Hunting |
| Description | Real-time job placement. Request for XYZ person. Applicants/hunters respond. |
| Domain | Business |
| Purpose | Human Resources/Job Applicant/Head Hunting |
| Description | Real-time job placement. Request for XYZ person. Applicants/hunters respond. |
| Domain | Business |
| Purpose | Shipping/Inventory |
| Description | Real-time coordination. Warehouse is running out, who has more of widget A? |
| Domain | Business |
| Purpose | Dispatch |
| Description | Which truck is in the area to take a package to Florida? |
| Domain | Business |
| Purpose | Dispatch/Routing |
| Description | Truck asks for more freight as they make stops across country. Negotiates location, travel, cost payment etc. |
| Domain | Business |
| Purpose | Marketing questionnaire |
| Description | Survey participation. Market research. |
| Domain | Retail |
| Purpose | Product sales announcement |
| Description | Target real-time community based announcement. Deal or Sale or Awareness message. |
| Domain | Retail |
| Purpose | Technical Support |
| Description | Routing queries to tech support staff. Auto routing to other support communities. Routing problems to all empowered managers. Direct access to lawyers, technical folks. |
| Domain | Retail |
| Purpose | Location based service *larger topic* |
| Description | Retail store broadcasting to community as defined by GPS location and being within a certain radius of store. Furthermore, enabling level 1 type marketing allowing a store to broadcast to only the competition's customers with a request for patronage and possible with incentive via electronic coupon. |
| Domain | Computing |
| Purpose | Autonomic server/system awareness |
| Description | Machine requests to a given community of machines its status. Machines take action on said request. Example: Machine detects its HTTP server has failed. Request to dispatcher (bot) to route a request to the current Network Dispatcher (load balancers) community this status is broadcasted. ND machines remove requester from rotation. |
| Domain | Computing |
| Purpose | Application to application |
| Description | Real-time request for function. Need to save JPEG as GIF. Current program does not know how. Requests local applications to see if they do. An application responds and performs the function. |

Figure 27:
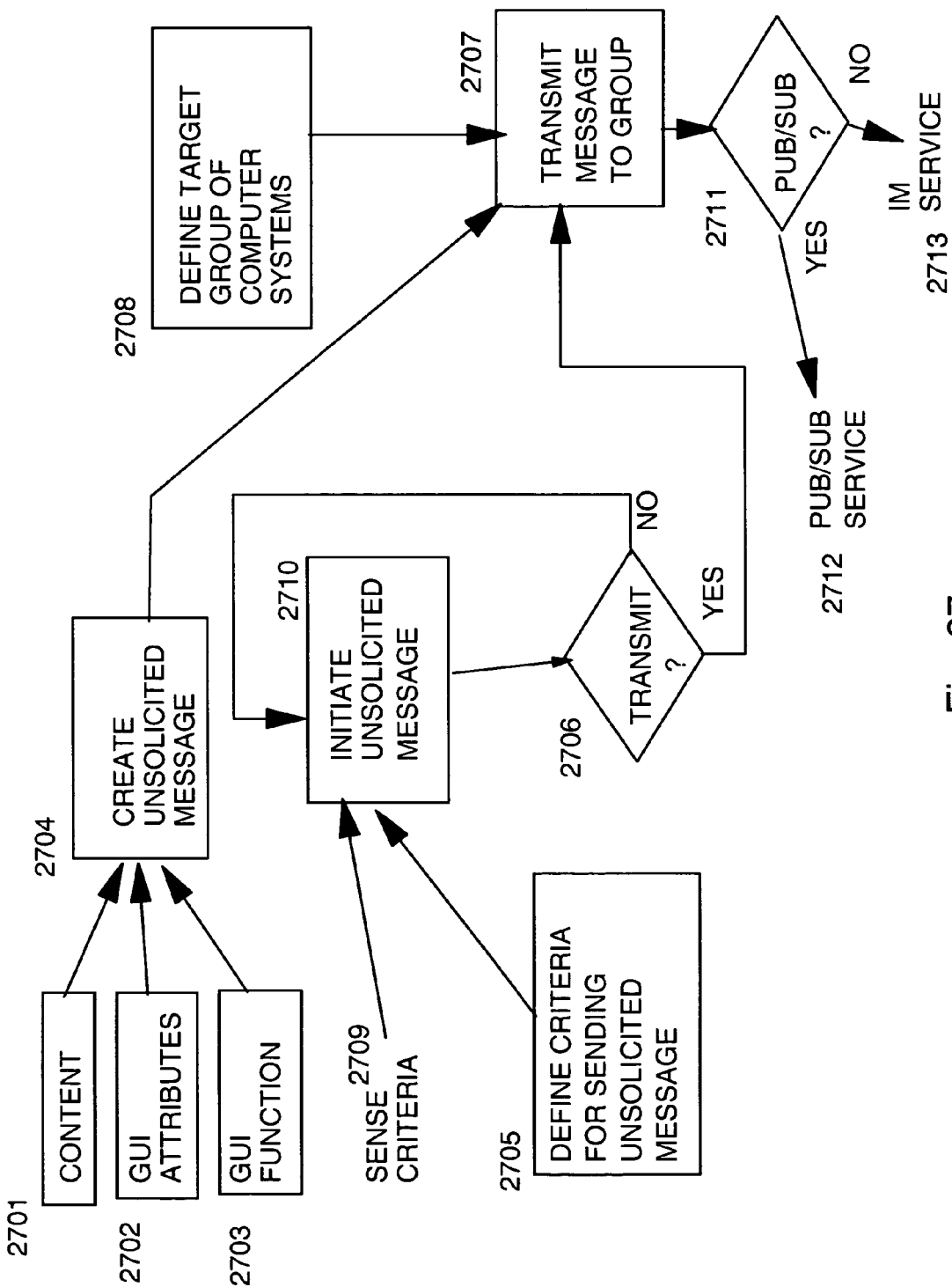
FIG. 27 is a flowchart depicting building and sending an unsolicited Alert message.

In one embodiment, referring to FIG. 27, the method comprises the following steps:

creating the message 2704 at the first computer system, the message comprising message content 2701, the message further defining GUI attributes 2702 and GUI functionality 2703;

causing the message to be transmitted 2707 from the first computer system to a group of computer systems comprising the second computer system, the message being transmitted responsive to 2706 a request for the message, the request initiated 2710 from other than the second computer system 2709.

Figure 28:
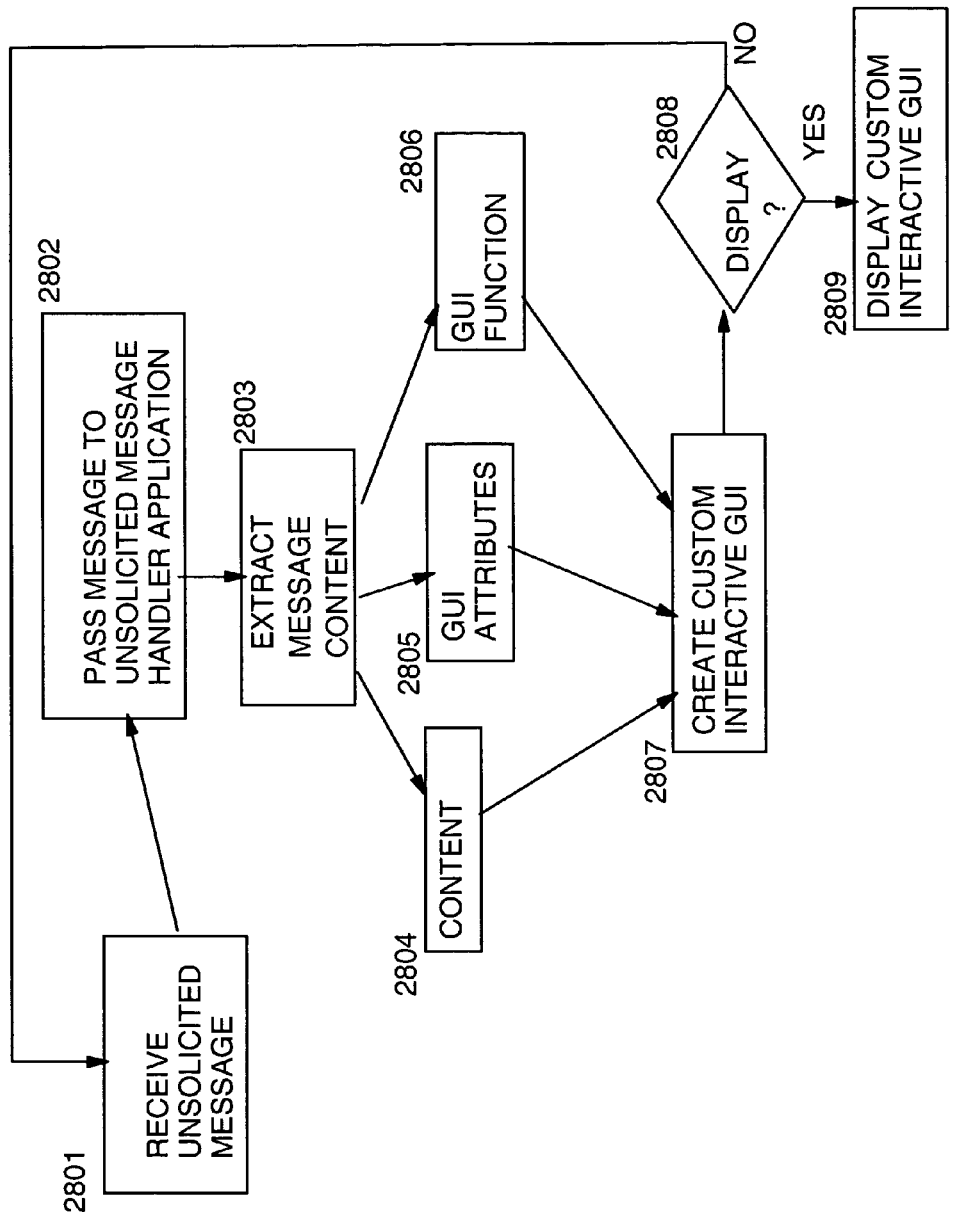
FIG. 28 is a flowchart depicting receiving an unsolicited Alert message.

In one embodiment, referring to FIG. 28, the method further comprises the following steps:

receiving 2801 the message from the first computer system at the second computer system;

decoding 2802 the message at the second computer system, the decoding resulting in a format suitable for processing on second computer system;

extracting 2803 attributes 2805, functionality 2806 and content 2804 from the message at the first computer system, the attributes 2805 comprising any one of background color, background images, length of visual persistence, location on the display, alpha blending of any attribute or the window itself, size of the container or the size of any attribute, the text font, color, size of any or all of the text, the z-order (is window topmost or not), the resizability of the window or features, the movability of the window or features, the associated audio component (e.g. a ding) (and all of the aural possibilities for this sound), the volume, the looping, the equalization, the synthesized voice accent, the speech rate, the stereo/mono aspects, the background music or when and how often any audible or visual animation and synchronization there after, the functionality 2806 comprising any one of buttons, standard, check, radio, menus, toolbars, hyperlinks, tree, table, custom controls described by standard mark up language (e.g. XUL), any widget which is appropriate to the interaction requested by the alert e.g. button to start poll, any widget which is appropriate to the modification of the alert content, e.g. translation of text into multiple languages, any widget which is appropriate to the interaction with the alert content, e.g. button to search text for keywords, start/stop movie or sound, zoom image, any widget which is appropriate to the modification of the alert presentation, e.g. slider to change value of font size, audible cues such as limited response vocabulary, limited response grammar, predefined sounds (e.g. a c-note), any cue which is appropriate to the interaction requested by the alert e.g. say "vote" to start poll, any cue which is appropriate to the modification of the alert content e.g. say "Spanish" to hear the alert in Spanish, any cue which is appropriate to the interaction with the alert content e.g. say "query keyword 'db2'" to repeat last sentence in which db2 was mentioned or say "repeat" to repeat message, any cue which is appropriate to the modification of the alert presentation e.g. play a c-note to hear the message in an Irish woman's voice, any combination of aural and visual elements and the content 2804 comprising any one of text, translated text, translated aural message (according to local and original language), image, video, animation, sound, binary file (and link to execute said file with an application), visual markup, synthesized voice, any combination there of any combination of aural and visual elements;

creating a user interactive GUI representation 2807 at the first computer system, the user interactive GUI representation comprising one or more user input functions, the user input function selectable by a user, the interactive GUI representation further comprising attributes, content and functionality defined by the extracted attributes, content and functionality of the message;

displaying 2809 the user interactive GUI representation at the first computer system.

Message Glossary:

PUBLISHER—An identifier of the sender of the message.

TOPIC—An identifier naming the channel the message has been sent or received on.

INTERNAL MESSAGE—A system level call from one part of compiled code to another.

Content of Internal Message

CHANNEL—An identifier naming the channel the message was intended to be sent or received on.

BLAST—An identifier used to describe the message. It might be treated as the subject.

PUBLISHER—An identifier naming the sender of the message. This could be different than the global PUBLISHER as message might be sent on another PUBLISHER/S behalf.

PAYLOAD—An unrestricted area for content.

BACKFIRE—An identifier specifying specific interactions to be taken with the message.

GUI LAUNCHED APPLICATION—An application that is launched by interacting with a message GUI.

GUI POLLING—A GUI presenting polling interface. Users interact with the dynamic GUI to express opinions.

GUI ONE-TO-ONE CHAT—A chat between one entity and another using a GUI.

GUI ONE-TO-MANY CHAT—A chat between one entity and many using a GUI.

GUI Generate Further Alert to Other User or System

LOCALLY GENERATE—A message/alert generated local to the receiver.

REMOTELY GENERATE—A message/alert generated in a location other than that of the receiver.

In one embodiment a dynamic interactive alert is created by the following steps:

A first computer system receives an extensible network message in the form of Extensible Markup Language (XML) from a second computer system. The message received from a second computer system via a publish subscribe model and protocol;

The first computer system decodes the message;

The first computer system extracts the content of the message, identifying the publisher, topic, and internal message;

The first computer system further extracts the content of the internal message, identifying the channel, blast, publisher, payload and backfire; the first computer creates the fundamental graphical user interface (GUI) elements populating specific elements from the message and internal message;

The first computer uses the content of the payload and or backfire container to define the extra graphical elements to display and then adds them to the base GUI; and, The complete GUI is presented to the end user of the first computer system.

The end user of the first computer system interacts with the GUI in a variety of ways, including launching other applications, polling, one-on-one and many-to-many chat, generating further notifications locally or remotely via the first or second computer and routing the notification to another end user or system.

A Sample Message Format in Table 1 shows a sample XML message format describing a general notification message.

A Sample Message Format Including Base GUI Specification in Table 2 shows an added XML stanza (lines 4-11) describing how GUI attributes might be described in a message. The sub-stanza window (lines 5-10) describes the global height, width, background color and font of the message.

A Sample Message Format Including Sample Routing Data in Table 3 shows and added XML stanza (lines 4-14) describing routing markup. Routing contains sub-stanzas, forwarding (lines 5-8) and returnReceiptRequested (lines 9-13). The forwarding section is communicating that the content is confidential. The return receipt section is indicating that mail should be sent to confirm message receipt.

To illustrate the system, a sample scenario might go as follows:

A user of a system has organized a conference call for 10AM EST and knows from the invite list that more than half of all invites have tentatively accepted the invitation. The user decides to do a quick poll of the invite list to verify availability of participants. Using a system of the present invention, the user selects a channel that includes the invitee list. He then enters the question "RSVP: Are you able to make my 10AM call?" and possible answers of Yes and No. The user submits the question for those users. A message is created similar to that seen in TABLE 4. The message is disseminated invitees.

TABLE 1

| | |
|---|---|
| 1 | SAMPLE MESSAGE FORMAT: |
| 2 | <pubsub> |
| 3 | <publisher>user@xx.server.com</publisher> |
| 4 | <topic>shotgun/application/community</topic> |
| 5 | <message> |
| 6 | <shotgun> |
| 7 | <channel>community</channel> |
| 8 | <blast>This is a test blast message!</blast> |
| 9 | <publisher>Publisher</publisher> |
| 10 | <payload>This is a test payload</payload> |
| 11 | <backfire>backfire url</backfire> |
| 12 | </shotgun> |
| 13 | </message> |
| 14 | </pubsub> |

TABLE 2

SAMPLE MESSAGE FORMAT INCLUDING GUI SPECIFICATIONS:

| | |
|---|---|
| 1 | <pubsub> |
| 2 | <publisher>user@xx.server.com</publisher> |
| 3 | <topic>shotgun/application/community</topic> |
| 4 | <gui> |
| 5 | <window> |
| 6 | <height>200</height> |
| 7 | <width>300</width> |
| 8 | <bgcolor>gray</bgcolor> |
| 9 | <font>Verdana</font> |
| 10 | </window> |
| 11 | </gui> |
| 12 | <message> |
| 13 | <shotgun> |
| 14 | <channel>community</channel> |
| 15 | <blast>This is a test blast message!</blast> |
| 16 | <publisher>Publisher</publisher> |
| 17 | <payload>This is a test payload</payload> |
| 18 | <backfire>backfire url</backfire> |
| 19 | </shotgun> |
| 20 | </message> |
| 21 | </pubsub> |

TABLE 3

SAMPLE MESSAGE FORMAT INCULDING SAMPLE ROUTING DATA:

```
1     <pubsub>
2       <publisher>user@xx.server.com</publisher>
3       <topic>shotgun/application/community</topic>
4       <routing>
5         <forwarding>
6           <code>1</code>
7           <description>confidential</description>
8         </forwarding>
9         <returnReceiptRequested>
10          <code>1</code>
11          <method>SMTP</method>
12          <target>user@xxx.server.com</target>
13        </returnReceiptRequested>
14      </routing>
15      <message>
16        <shotgun>
17          <channel>community</channel>
18          <blast>This is a test blast message!</blast>
19          <publisher>Publisher</publisher>
20          <payload>This is a test payload</payload>
21          <backfire>backfire url</backfire>
22        </shotgun>
23      </message>
24    </pubsub>
```

TABLE 4

POLLING EXAMPLE:

```
1     <pubsub>
2       <publisher>bgoodman@us.ibm.com</publisher>
3       <topic><![CDATA[shotgun/pollcast/bgoodman@us.ibm.com]]></topic>
4       <routing>
5         <forwarding>
6           <code>1</code>
7           <description>confidential</description>
8         </forwarding>
9         <returnReceiptRequested>
10          <code>1</code>
11          <method>SMTP</method>
12          <target>user@xxx.server.com</target>
13        </returnReceiptRequested>
14      </routing>
15      <gui>
16        <window>
17          <height>200</height>
18          <width>300</width>
19          <bgcolor>gray</bgcolor>
20          <font>Verdana</font>
21        </window>
22      </gui>
23      <message>
24        <shotgun>
25          <blast><![CDATA[RSVP: Are you able to make the 10AM meeting?]]>
26          </blast>
27          <payload><![CDATA[
28          <PollCast session="67FC1DD3ED4E49F4">
29          <questiondata type="multi-single" timelimit="60">
30          <question>
31          RSVP: Are you able to make a 10AM call?
32          </question>
33          <option>Yes</option>
34          <option>No</option>
35          <option>This Poll is Inappropriate</option>
36          </questiondata>
37          </PollCast>
38          ]]></payload>
39          <backfire><![CDATA[ ]]></backfire>
40          <proxy>bgoodman@us.ibm.com</proxy>
41        </shotgun>
42      </message>
43    </pubsub>
```

First note in table 4, the portion of the message that is called "shotgun" lines 24-41. This is a subsection of "message" and maps to what has been previously termed internal message. This section identifies the blast, or summary of the message and the payload lines 27-38. The payload happens to describe the question and the data necessary to represent the poll. It enumerates the options as Yes and No. These might be represented as radio boxes or a dropdown, or other means such that they are mutually exclusive. Payload stanza lines 27-38 communicates elements necessary to create the extra graphical elements to be appended as part or separately from the base GUI.

Secondly, note the "GUI" section of TABLE 4 lines 15-22. This describes some GUI parameters of the message. It indicates the window should be 300×200 and have a background color of gray.

Finally, note the "routing" section of TABLE 4 lines 4-14. This section describes any specific characteristics of the message concerning routing. The "forwarding" stanza lines 5-8 shows that it is a confidential message and should be "treated" as such. In this case it might mean the message will not be saved or printed. It might also mean that it displayed in a different manner, indicating the sensitivity of the message. The "return receipt requested" stanza lines 9-13 identifies that a return receipt is requested, that it should be done via SMTP and that the target of the message is "user@xxx.server.com". Upon viewing the message and poll, an email will be generated and sent to that email address.

In another embodiment a first computer system receives an extensible message from a second computer system using any number of network protocols including SOAP transmission, SMTP, SNMP, POP3 or local system loop back type methodologies including hyper-sockets.

In yet another embodiment a first computer system receives extensible network messages from a second computer system using a model other than publish/subscribe.

In another embodiment the extensible network message is in a format other than XML.

In yet another embodiment the message includes other attributes defining the base GUI, such as window size, location, background color, foreground color, font style, font size, font color, background images, foreground image, layout of said artifacts and associated behaviors.

In yet another embodiment the message includes other attributes defining the potential routing capabilities, for example return receipt requested, for eye's only (no printing allowed), forward at will etc.

In yet another embodiment the internal message includes other attributes defining context specific attributes such as GUI initialization parameters, data such as inline images audio data or binaries and other artifacts and associated behaviors.

In another embodiment the message contains digital signatures and or encryption enabling authenticity and non-repudiation to be identified and verified as part of the decoding process.

In another embodiment the message and or internal message contains a preferred input method such as mouse, keyboard, biometric device such as video camera or voice. For example in the case of voice a limited vocabulary might be defined as part of the message and is then used to interact with said message.

In one embodiment, alerts are processed by plug-in applications. An application plug-in resides in a parent application or in cooperation with another application wherein the two applications might exchange services. Messages might be operated by one or all of the applications in an environment. Having received a message from a local or remote computer, an application makes a request to create an alert for notifying and end user. In this embodiment, the interaction would be of the form of optionally launching another application with parameters from the original message. Message are received over a pub/sub message system.

To provide alerting functionality in this embodiment the following code components are used: GryphonConnectionInstance, BCSPlugin, BCSBroadcast, ICTAlertManagerPlugin, ICTAlertWindow, AlertWindowHandleBar and ICTAlertContentComposite.

First, a message is received from the pubsub system using GryphonConnectionInstance. BCSPlugin takes the raw message, decodes the XML message. Specific parts of the message are stored in a memory object (BCSBroadcast), to be passed on a common message system. An internal message notifies plug-ins and applications that a new message has arrived. Any application can request an alert be made. This is done through calls to ICTAlertManagerPlugin.

The message can optionally be sent in a compressed for resulting in the receiver decoding the message, uncompressing the message. Compression reduces the size of the message. Alternatively the message can be sent in an encrypted form resulting in the receiver decrypting the message. The intent of encryption is to protect the content from entities other than those intended.

The ICTAlertManagerPlugin code listens for notification requests. Part of an application's request includes a set of keys values. Key values represent unique objects that map to corresponding elements in a lookup table. For example: "size" might equal "medium". These keys are transmitted as part of the request to ICTAlertManagerPlugin. ICTAlertManagerPlugin references the keys to query a settings table to determine if the end user has predefined global attributes for any alert window. In the absence of such custom settings the default settings are used. The original alert message, the alert content, the global and default settings are then used to produce the alert window. The creation of the alert window starts the alerting procedure.

The ICTAlertWindow builds a title bar, using the "title" of the alert, a handle bar for moving the alert around and the dynamic content of the alert. The content of the alert request specifies the text of the body of the alert, optional words to highlight and text/action pairs. The text of the body of the alert is displayed in a text area. If keywords are supplied the text will be displayed with the matching keywords in the body text bolded and red. The text/action pairs are used to create the dynamic action controls at the bottom of the alert window. Text represents human readable text that is used to populate the dynamic action controls and the action represents instructions for the application to execute when the corresponding control is selected. There can be multiple sets of these pairs. If there is only one pair in a set a simple button will be shown. If there is more than one pair in a set a button with a dropdown menu will be shown to offer all of the possible actions.

In other embodiments any one of the following attributes might be communicated by the initial alert message: global, user or application settings: background color, background images, length of visual persistence, location on the display, alpha blending of any attribute or the window itself, size of the container or the size of any attribute, the text font, color, size of any or all of the text, the z-order (is window topmost or not), the resizability of the window or features, the movability of the window or features, the associated audio component (e.g. a ding) (and all of the aural possibilities for this sound), the volume, the looping, the equalization, the synthesized voice accent, the speech rate, the stereo/mono aspects, the background music or when and how often any audible or visual animation and synchronization there after.

In other embodiments any one of the following functionalities might be communicated by the initial alert message, global, user or application settings: buttons, standard, check, radio, menus, toolbars, hyperlinks, tree, table, custom controls described by standard mark up language (e.g. XUL, an XML based language enabling portable user interfaces), any widget which is appropriate to the interaction requested by the alert e.g. button to start a poll, any widget which is appropriate to the modification of the alert content (e.g. translation of text into multiple languages, any widget which is appropriate to the interaction with the alert content; e.g. button to search text for keywords), start/stop movie or sound, zoom image, any widget which is appropriate to the modification of the alert presentation, e.g. slider to change value of font size, audible cues such as limited response vocabulary, limited response grammar, predefined sounds (e.g. a c-note), any cue which is appropriate to the interaction requested by the alert (e.g. say "vote" to start poll), any cue regarding the modification of the alert content (e.g. say "Spanish" to hear the alert in Spanish), any cue regarding interaction with the alert content (e.g. say "query keyword 'db2'" to repeat last sentence in which db2 was mentioned or say "repeat" to repeat the message), any cue regarding the modification of the alert presentation (e.g. play a c-note to hear the message in an Irish woman's voice)

In other embodiments any one of the following content types might be communicated by the initial alert message, translated text/aural message (according to local and original language), image, video, animation, sound, binary file (and link to launch the binary file with a local application), visual markup, synthesized voice, any combination there of any combination of aural and visual elements.

After the alert is built, a call to display the alert is made. The settings queried from the settings table above contain values for the placement, duration of persistence and effect used to display the alert (For example: the alert may be displayed with one of 3 effects, FadeEffect, SlideEffect, NullEffect all of which inherit base function from TransitionEffect). These properties are as defined by the alert message, the global, user or application/plug-in settings. These effects have instructions for dealing with the display, persistence and discard of the alert. In the slide example the alert window is instructed to slide from a side of the screen until fully visible, remain on screen for the desired time, slide off the edge of the screen until completely hidden then the window is persisted into a history log logged and the original window is then destroyed. Each of the effects also persist the message on the screen if user has placed his pointer over the alert window. The alert stays until the pointer is removed.

In one embodiment, the application program at the user computer receiving the Alert message further comprises program code for preprocessing the message content before building the GUI according to the content of the message. Such preprocessing may comprise:
 Highlight words using a predefined list of keywords
 Highlight proper nouns based on word pattern
 Link proper nouns to resources containing more information
 Pre-fetch content that is referenced by URL (if the message has a link to an image, go get it before alerting)

Virus scan message
Spam identification
Gather information of sender to display along with notification
Identify if the sender is currently online
Identify the sender's current location to facilitate time difference visuals (guy in Japan is up late)
Identify the sender's current phone number or other attribute to facilitate contact
Decryption
Digital signature verification
Decompression
Decoding (message is in base64 encoding and needs to be changed)
Character set mapping (message sent in US but needs to be in Turkish)
Language translation
Loading another program as part of notification event
Validation of message format
Translation of older message formats to newer message formats
Log the message
Use the message content to generate statistics of types of content received
Use the message content to generate and tweak spam identification heuristics
Charge either the sender or the receiver for the transaction In one embodiment, the application program at the user computer receiving the Alert message further comprises program code for post-processing the message content after building the GUI according to the content of the message. Such post-processing may comprise:

Compression for saving space in long term storage
Encryption for secure storage
Add event to calendar application
Add event to to-do application
Add event to history listing
Use interaction data to derive "closeness" and present visualization of social circles.
Log the message
Use the message content to generate statistics of types of content received
Use the message content to generate and tweak spam identification heuristics
Charge either the sender or the receiver for the transaction The referenced Computer Program Listing Appendix on compact disc includes files demonstrating implementations of aspects of the present invention:

In the JAVA version:
ShotgunApplication.java—Abstract super class which encompasses base functionality for all shotgun applications.
ShotgunApplicationConfigParser.java—Configuration parser code for all shotgun applications.
ShotgunApplicationHistory.java—Recent broadcasts container and logic.
ShotgunApplicationHistoryItem.java—Individual recent broadcast listing UI and logic.
ShotgunApplicationSendForm.java—The common UI and logic for all shotgun applications broadcast forms.
ShotgunApplicationSettingsPage.java—The common UI and logic for all shotgun applications subscription forms.
ShotgunChannelsDisplayPage.java—UI for browse channels page.
ShotgunChannelsDisplayPageTableEntry.java—Logic for a single browse channel entry.
ShotgunChannelsParser.java—Parsing logic for the list of available channels.
ShotgunConstants.java—Common shotgun constants.
ShotgunPlugIn.java—The core shotgun logic which forwards messages to shotgun applications, and broadcasts messages from shotgun applications.
ShotgunPlugInSettingsPage.java—Configuration UI for the shotgun plugin.
ShotgunSOAP.java—Logic for making all shotgun related soap calls.
ShotgunXMLParser.java—Parsing logic for shotgun blasts, and applications list.
xSkilltapAccessProxy.java—WebService proxy object for ease of making SkillTap WebService calls.
xSkilltapPlugIn.java—Main class which handles all SkillTap logic for how to handle messages that are received from Shotgun and from the main bus.
xSkilltapRequest.java—Object to describe a single SkillTap request, storing information including what the request is, who made the request, and on which channel.
SkilltapSendForm.java—Extends ShotgunApplicationSendForm to add specific elements for publishing to a SkillTap channel.

In the SASH version:
auth.htm—Legacy version of "login.htm".
BasicFilter.htm—Filter builder GUI.
channels.htm—Channel subscription management GUI.
docs.htm—Code to automatically point to latest documentation.
HelperWindows.js—Code to help manage dialog windows (Channel/filter UIs).
info.htm—Help UI.
login.htm—Authentication GUI and method calls for authentication.
logviewer.htm—GUI management and views of debug log.
notify.htm—Alert GUI.
Shotgun_main.htm—Main code module for Shotgun UI and function and PUB/SUB management.
startup.html—Code to manage startup process.
xorcrypt.js—Encryption libraries.
shotgun_util.js—Common utilities for dealing with shotgun XML messages.
ChatClient.htm—The original SkillTap UI and application and Sametime functionality.
faq_editor.htm—UI for editing, view information and submitting FAQs.
main.htm—Main SkillTap code and Sametime functionality.
resp.htm—Session feedback UI.

Alert Jars:
AlertManagerPlugIn.jar—producing visual alerts
AwarenessGuiPlugIn.jar—GUI for accessing plugins and their function
BCSPlugIn.jar—general broadcast function—this forwards on broadcast message to the appropriate applications
FreeJamPlugIn.jar—handling freejam messages
GryphonPlugIn.jar—connecting to the broadcast server
ICT.jar—the UI and logic that allows users to login to the system and load the plugins
ImChatWindowPlugIn.jar—instant messaging chat window
IMHubPlugIn.jar—the instant messaging hub—the visual display of other users on the IM system
MagicCarpet.jar—the message processing bus and logic
PollCastPlugIn.jar—handle pollcast messages
SametimePlugIn.jar—connecting to a sametime server
SkillTapPlugIn.jar—handling skilltap messages TeamRingPlugIn.jar—handling teamring messages
w3alertPlugIn.jar—handling w3alert messages The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims:

What is claimed is:

1. A method for creating a message at a first computer system for display on a second computer system, the method comprising the steps of:
   initiating a request for a GUI message in response to an event wherein the event and the initiating of the request are external to the second computer system wherein said message is a notification of said event;
   defining GUI message attributes;
   defining GUI message functionality;
   creating the message at the first computer system, the message comprising message content including an alert message, the GUI message attributes and the GUI message functionality such that the message includes aspects of how the second computer system is to display the message content; and
   in response to the request, transmitting the message from the first computer system to a group of computer systems wherein the group of computer systems comprises the second computer system, each computer system in said group of computer systems subscribing to messages from said first computer, each computer system in said group of computer systems extracting from said message, said attributes and functionality to instruct said each computer system how to display the user interactive GUI representation at said each computer system, the display of the message under individual control of each computer system in said group of computer systems; and
   filtering the message by a filter in each computer system in said group of computer systems, each filter for filtering for keywords of interest to the respective other computer system such that the message would have to contain the keywords of interest before the respective computer system sees the message and messages not containing the keywords are blocked by said filter from being seen by said respective computer system.

2. The method according to claim 1 wherein the attributes comprise any one of:
   background color, background images, shape of GUI image, location on the display, alpha blending of any attribute, alpha blending of a window, size of the container, size of an attribute, text font, text color, size of text, the z-order (is window topmost or not), the resizability of window, resizeability of features, the movability of the window, movability of features, the associated audio component, audio volume, audio looping, audio equalization, audio synthesized voice accent, audio speech rate, audio stereo/mono aspects, audio background music, audible animation, visual animation, audio/visual synchronization, inline binary data, computer program instructions, rich media content, instructions for displaying the GUI, GUI display location, GUI display size, GUI display shape or preferred input types, the preferred input types comprising any one of keyboard, mouse, voice, biometric system, application program interface or network attached device.

3. The method according to claim 1 wherein the functionality for said alert message comprises any one of:
   removing the GUI image after a predetermined time, removing the GUI image unless a user takes an action within a predetermined time, moving the GUI image across a display when instantiating the GUI image, moving the GUI image across the display when removing the GUI image, saving a history of messages, saving active messages off screen, buttons, standard, check, radio, menus, toolbars, hyperlinks, tree, table, custom controls described by standard mark up language (e.g. XUL), a widget which is appropriate to the interaction requested by the alert message, a button widget to start poll, a widget which is appropriate to the modification of the alert content, a widget to translate text to or from languages, a widget which is appropriate to the interaction with the alert message content, a button widget to search text for keywords, a start/stop movie widget, a start/stop sound widget, zoom image, a widget which is appropriate to the modification of the alert message presentation, a slider widget to change value of font size, audible cue widget, audible cue widget for limited response vocabulary, limited response grammar, predefined sounds, a cue which is appropriate to the interaction requested by the alert message, a text cue to start a poll, a cue which is appropriate to the modification of the alert message content, a text cue to select a language in which to hear the alert message content, a cue which is appropriate to the interaction with the alert message content, a query keyword, a repeat message keyword, a cue which is appropriate to the modification of the alert message presentation or a combination of aural and visual elements.

4. The method according to claim 1 wherein the content comprises any one of text, translated text, translated aural message, translated aural message according to location, translation of aural message according to local language, image, video, animation, sound, binary file, hyperlink to execute a file with an application, visual markup, synthesized voice or a combination of an aural and visual element.

5. The method according to claim 1 wherein the message further comprises routing information for any one of forwarding or acknowledging the message.

6. The method according to claim 1 wherein each computer system in said group of computer systems is anonymous to the first computer system and the other computer systems in said group of computer systems, and the message is transmitted to the group by way of a pub/sub service.

7. The method according to claim 1 wherein the message is any one of unsolicited by the first computer system, initiated by a program event, or initiated by a user action, and said message includes instructions for a desired length of time said alert message is to be displayed.

8. A method for presenting a message received from a first computer system for display on a second computer system, the method comprising the steps of:
  subscribing by said second computer system, to messages from said first computer system;
  receiving the message from the first computer system at the second computer system wherein the message includes an alert message of an event wherein the event is external to the second computer system, said message including aspects of how the second computer system is to display the message, the display of the message under individual control of the second computer system;
  decoding the message at the second computer system, the decoding resulting in a format suitable for processing on second computer system;
  extracting said aspects including attributes, functionality and content from the message at the second computer system to instruct said second computer system how to display the user interactive GUI representation;
  creating a user interactive GUI representation at the second computer system, the user interactive GUI representation comprising one or more user input functions, the user input function selectable by a user, the interactive GUI representation further comprising attributes, content and functionality defined by the extracted attributes, content and functionality of the message;
  filtering the message by a filter in said second computer system, said filter for filtering for keywords of interest to the second computer system such that the message would have to contain the keywords of interest before the second computer system sees the message and messages not containing the keywords are blocked by said filter from being seen by said second computer system; and
  displaying the user interactive GUI representation seen at the second computer system.

9. The method according to claim 8 wherein the attributes comprise any one of:
  background color, background images, shape of GUI image, location on the display, alpha blending of any attribute, alpha blending of a window, size of the container, size of an attribute, text font, text color, size of text, the z-order (is window topmost or not), the resizability of window, resizeability of features, the movability of the window, movability of features, the associated audio component, audio volume, audio looping, audio equalization, audio synthesized voice accent, audio speech rate, audio stereo/mono aspects, audio background music, audible animation, visual animation, audio/visual synchronization, inline binary data, computer program instructions, rich media content, instructions for displaying the GUI, GUI display location, GUI display size, GUI display shape or preferred input types, the preferred input types comprising any one of: keyboard, mouse, voice, biometric system, application program interface or network attached device.

10. The method according to claim 8 wherein the functionality of said alert message comprises any one of: removing the GUI image after a predetermined time, removing the GUI image unless a user takes an action within a predetermined time, moving the GUI image across a display when instantiating the GUI image, moving the GUI image across the display when removing the GUI image, saving a history of messages, saving active messages off screen, buttons, standard, check, radio, menus, toolbars, hyperlinks, tree, table, custom controls described by standard mark up language (e.g. XUL), a widget which is appropriate to the interaction requested by the alert message, a button widget to start poll, a widget which is appropriate to the modification of the alert content, a widget to translate text to or from languages, a widget which is appropriate to the interaction with the alert message content, a button widget to search text for keywords, a start/stop movie widget, a start/stop sound widget, zoom image, a widget which is appropriate to the modification of the alert message presentation, a slider widget to change value of font size, audible cue widget, audible cue widget for limited response vocabulary, limited response grammar, predefined sounds, a cue which is appropriate to the interaction requested by the alert message, a text cue to start a poll, a cue which is appropriate to the modification of the alert message content, a text cue to select a language in which to hear the alert message content, a cue which is appropriate to the interaction with the alert message content, a query keyword, a repeat message keyword, a cue which is appropriate to the modification of the alert message presentation or a combination of aural and visual elements.

11. The method according to claim 8 wherein the content comprises any one of:
  text, translated text, translated aural message, translated aural message according to location, translation of aural message according to local language, image, video, animation, sound, binary file, hyperlink to execute a file with an application, visual markup, synthesized voice or a combination of an aural and visual element.

12. The method according to claim 8 wherein the second computer system is anonymous to the first computer system and the other computer systems and the message is received by way of a pub/sub service.

13. The method according to claim 8 wherein the message is any one of unsolicited by the second computer system, initiated by a program event or initiated by a user action, and said message includes instructions for a desired length of time said alert message is to be displayed.

14. The method according to claim 8 wherein extracting content of the message comprises the further steps of:
  identifying routing information.

15. The method according to claim 14 comprising the further step of modifying the GUI based on the routing information.

16. The method according to claim 8 comprising the further step of launching an application program according to attributes of the message content.

17. The method according to claim 8 wherein the attributes comprise any one of inline binary data, computer program instructions, rich media content, instructions for displaying the GUI, GUI display, size or shape.

18. The method according to claim 8 wherein the attributes identify preferred input types, the types comprising any one of keyboard, mouse, voice, biometric system, application program interface or network attached device.

19. The method according to claim 8 wherein the GUI display is overridden by local GUI settings.

20. The method according to claim 8 comprising the further step of saving the message in a list view, the list view comprising history of messages.

21. The method according to claim 8 comprising the further step of pre-processing the message before the creating the GUI step.

22. The method according to claim 21 wherein pre-processing comprises any one of:

highlighting words using a predefined list of keywords, highlighting proper nouns based on word pattern, linking proper nouns to resources containing more information, pre-fetching content that is referenced by a URL, virus scanning the message, identifying SPAM, gathering, information of sender to display along with notification, identifying if the sender is currently online, identifying the sender's current location to facilitate time difference visuals, identifying the sender's attribute to facilitate contacting the sender, decrypting, verifying digital signature, decompression, decoding the message, mapping character, language translation, loading another program as part of notification event, validation of message format, translation of older message formats to newer message formats, logging the message, using the message content to generate statistics of types of content received, using the message content to generate and tweak SPAM identification heuristics, or charging either the sender or the receiver for the transaction.

23. The method according to claim 8 comprising the further step of post-processing the message after the creating the step.

24. The method according to claim 23 wherein post-processing comprises any one of:
compression for saving space in long term storage, encryption for secure storage, adding an event to calendar application, adding an event to to-do application, adding an event to history listing, using interaction data to derive "closeness", using interaction data to present visualization of social circles, logging the message, generating statistics of types of content received, generating SPAM identification heuristics or charging either the sender or the receiver for the transaction.

25. A system for creating a message at a first computer system for display on a second computer system, the system comprising:
a network;
the second computer system in communication with the network;
the first computer system in communication with the network, wherein the first computer system includes storage for storing computer instructions to execute a method comprising:
initiating a request for a GUI message in response to an event wherein the event and the initiating of the request are external to the second computer system wherein said message is a notification of said event;
defining GUI message attributes;
defining GUI message functionality;
creating the message at the first computer system, the message comprising message content including an alert message, the GUI message attributes and the GUI message functionality such that the message includes aspects of how the second computer system is to display the message content; and
in response to the request, transmitting the message from the first computer system to a group of computer systems wherein the group of computer systems comprises the second computer system, each computer system in said group of computer systems subscribing to messages from said first computer, each computer system in said group of computer systems extracting from said message, said attributes and functionality to instruct said each computer system how to display the user interactive GUI representation at said each computer system, the display of the message under individual control of the second computer system such that the display of the message at the second computer system is determined by a user of the second computer system, and the message content defines a problem;
a filter in each computer system in said group of computer systems for filtering the problem defined in said message, each filter for filtering for keywords of interest to the respective other computer system such that the message would have to contain the keywords of interest before the respective computer system sees the message and messages not containing the keywords are blocked by said filter from being seen by said respective computer system.

26. The system according to claim 25 wherein the attributes comprise any one of:
background color, background images, length of visual persistence, shape of GUI image, location on the display, alpha blending of any attribute, alpha blending of a window, size of the container, size of an attribute, text font, text color, size of text, the z-order (is window topmost or not), the resizability of window, resizeability of features, the movability of the window, movability of features, the associated audio component, audio volume, audio looping, audio equalization, audio synthesized voice accent, audio speech rate, audio stereo/mono aspects, audio background music, audible animation, visual animation, audio/visual synchronization, inline binary data, computer program instructions, rich media content, instructions for displaying the GUI, GUI display location, GUI display size, GUI display shape or preferred input types, the preferred input types comprising any one of keyboard, mouse, voice, biometric system, application program interface or network attached device.

27. The system according to claim 25 the functionality for said alert message comprises any one of:
removing the GUI image after a predetermined time, removing the GUI image unless a user takes an action within a predetermined time, moving the GUI image across a display when instantiating the GUI image, moving the GUI image across the display when removing the GUI image, saving a history of messages, saving active messages off screen, buttons, standard, check, radio, menus, toolbars, hyperlinks, tree, table, custom controls described by standard mark up language (e.g. XUL), a widget which is appropriate to the interaction requested by the alert message, a button widget to start poll, a widget which is appropriate to the modification of the alert content, a widget to translate text to or from languages, a widget which is appropriate to the interaction with the alert message content, a button widget to search text for keywords, a start/stop movie widget, a start/stop sound widget, zoom image, a widget which is appropriate to the modification of the alert message presentation, a slider widget to change value of font size, audible cue widget, audible cue widget for limited response vocabulary, limited response grammar, predefined sounds, a cue which is appropriate to the interaction requested by the alert message, a text cue to start a poll, a cue which is appropriate to the modification of the alert message content, a text cue to select a language in which to hear the alert message content, a cue which is appropriate to the interaction with the alert message content, a query keyword, a repeat message keyword, a cue which is appropriate to the modification of the alert message presentation or a combination of aural and visual elements.

28. The system according to claim 25 wherein the content comprises any one of: text, translated text, translated aural message, translated aural message according to location, translation of aural message according to local language, image, video, animation, sound, binary file, hyperlink to execute a file with an application, visual markup, synthesized voice or a combination of an aural and visual element.

29. The system according to claim 25 wherein the message further comprises routing information for any one of forwarding or acknowledging the message.

30. The system according to claim 25 wherein each computer system in said group of computer systems is anonymous to the first computer system and the other computer systems in said group of computer systems, and the message is transmitted to the group by way of a pub/sub service.

31. The system according to claim 25 wherein the message is any one of unsolicited by the second computer system, initiated by a program event or initiated by a user action, and said message includes instructions for a desired length of time said alert message is to be displayed.

32. A system for presenting a message received from a first computer system for display on a second computer system, the system comprising:
  a network;
  the first computer system in communication with the network;
  the second computer system in communication with the network, wherein the second computer system includes storage for storing computer instructions to execute a method comprising:
  subscribing by said second computer system, to messages from said first computer system;
  receiving the message from the first computer system at the second computer system wherein the message includes an alert message of an event wherein the event is external to the second computer system, said message including aspects of how the second computer system is to display the message, the display of the message under individual control of the second computer system;
  decoding the message at the second computer system, the decoding resulting in a format suitable for processing on second computer system;
  extracting said aspects including attributes, functionality and content from the message at the second computer system to instruct said second computer system how to display the user interactive GUI representation;
  creating a user interactive GUI representation at the second computer system, the user interactive GUI representation comprising one or more user input functions, the user input function selectable by a user, the interactive GUI representation further comprising attributes, content and functionality defined by the extracted attributes, content and functionality of the message;
  filtering the message by a filter in said second computer system, said filter for filtering for keywords of interest to the second computer system such that the message would have to contain the keywords of interest before the second computer system sees the message and messages not containing the keywords are blocked by said filter from being seen by said second computer system; and
  displaying the user interactive GUI representation seen at the second computer system.

33. The system according to claim 32 wherein the attributes comprise any one of:
  background color, background images, shape of GUI image, location on the display, alpha blending of any attribute, alpha blending of a window, size of the container, size of an attribute, text font, text color, size of text, the z-order (is window topmost or not), the resizability of window, resizeability of features, the movability of the window, movability of features, the associated audio component, audio volume, audio looping, audio equalization, audio synthesized voice accent, audio speech rate, audio stereo/mono aspects, audio background music, audible animation, visual animation, audio/visual synchronization, inline binary data, computer program instructions, rich media content, instructions for displaying the GUI, GUI display location, GUI display size, GUI display shape or preferred input types, the preferred input types comprising any one of: keyboard, mouse, voice, biometric system, application program interface or network attached device.

34. The system according to claim 32 wherein the functionality of said alert message comprises any one of:
  removing the GUI image after a predetermined time, removing the GUI image unless a user takes an action within a predetermined time, moving the GUI image across a display when instantiating the GUI image, moving the GUI image across the display when removing the GUI image, saving a history of messages, saving active messages off screen, buttons, standard, check, radio, menus, toolbars, hyperlinks, tree, table, custom controls described by standard mark up language (e.g. XUL), a widget which is appropriate to the interaction requested by the alert message, a button widget to start poll, a widget which is appropriate to the modification of the alert content, a widget to translate text to or from languages, a widget which is appropriate to the interaction with the alert message content, a button widget to search text for keywords, a start/stop movie widget, a start/stop sound widget, zoom image, a widget which is appropriate to the modification of the alert message presentation, a slider widget to change value of font size, audible cue widget, audible cue widget for limited response vocabulary, limited response grammar, predefined sounds, a cue which is appropriate to the interaction requested by the alert message, a text cue to start a poll, a cue which is appropriate to the modification of the alert message content, a text cue to select a language in which to hear the alert message content, a cue which is appropriate to the interaction with the alert message content, a query keyword, a repeat message keyword, a cue which is appropriate to the modification of the alert message presentation or a combination of aural and visual elements.

35. The system according to claim 32 wherein the content comprises any one of:
  text, translated text, translated aural message, translated aural message according to location, translation of aural message according to local language, image, video, animation, sound, binary file, hyperlink to execute a file with an application, visual markup, synthesized voice or a combination of an aural and visual element.

36. The system according to claim 32 wherein the second computer system is anonymous to the first computer system and the other computer systems, and the message is received by way of a pub/sub service.

37. The system according to claim 32 wherein the message is any one of unsolicited by the first computer system, initiated by a program event or initiated by a user action, and said message includes instructions for a desired length of time said alert message is to be displayed.

38. The system according to claim 32 wherein extracting content of the message comprises the further steps of:
  identifying routing information.

39. The system according to claim 38 comprising the further step of modifying the GUI based on the routing information.

40. The system according to claim 32 comprising the further step of launching an application program according to attributes of the message content.

41. The system according to claim 32 wherein the attributes comprise any one of inline binary data, computer program instructions, rich media content, instructions for displaying the GUI, GUI display, size or shape.

42. The system according to claim 32 wherein the attributes identify preferred input types, the types comprising any one of keyboard, mouse, voice, biometric system, application program interface or network attached device.

43. The system according to claim 32 wherein the GUI display is overridden by local GUI settings.

44. The system according to claim 32 comprising the timber step of saving the message in a list view, the list view comprising history of messages.

45. The system according to claim 32 comprising the further step of pre-processing the message before the creating the GUI step.

46. The system according to claim 45 wherein pre-processing comprises any one of:
highlighting words using a predefined list of keywords, highlighting proper nouns based on word pattern, linking proper nouns to resources containing more information pre-fetching content that is referenced by a URL, virus scanning the message, identifying SPAM, gathering, information of sender to display along with notification, identifying if the sender is currently online, identifying the sender's current location to facilitate time difference visuals, identifying the sender's attribute to facilitate contacting the sender, decrypting, verifying digital signature, decompression, decoding the message, mapping character, language translation, loading another program as part of notification event, validation of message format, translation of older message formats to newer message formats, logging the message, using the message content to generate statistics of types of content received, using the message content to generate and tweak SPAM identification heuristics, or charging either the sender or the receiver for the transaction.

47. The system according to claim 32 comprising the further step of post-processing the message after the creating the step.

48. The system according to claim 47 wherein post-processing comprises any one of:
compression for saving space in long term storage, encryption for secure storage, adding an event to calendar application, adding an event to to-do application, adding an event to history listing, using interaction data to derive "closeness", using interaction data to present visualization of social circles, logging the message, generating statistics of types of content received, generating SPAM identification heuristics or charging either the sender or the receiver for the transaction.

49. A computer program product for creating a message at a first computer system for display on a second computer system, the computer program product comprising:
a non-transitory storage medium readable by a processing circuit and storing instructions for execution by the processing circuit for performing a method comprising:
initiating a request for a GUI message in response to an event wherein the event and the initiating of the request are external to the second computer system wherein said message is a notification of said event;
defining GUI message attributes;
defining GUI message functionality;
creating the message at the first computer system, the message comprising message content including an alert message, the GUI message attributes and the GUI message functionality such that the message includes aspects of how the second computer system is to display the message content;
in response to the request, transmitting the message from the first computer system to a group of computer systems wherein the group of computer systems comprises the second computer system, each computer system in said group of computer systems subscribing to messages from said first computer, each computer system in said group of computer systems extracting from said message, said attributes and functionality to instruct said each computer system how to display the user interactive GUI representation at said each computer system, the display of the message under individual control of each computer system in said group of computer systems; and
filtering the message by a filter in each computer system in said group of computer systems, each filter for filtering for keywords of interest to the respective other computer system such that the message would have to contain the keywords of interest before the respective computer system sees the message and messages not containing the keywords are blocked by said filter from being seen by said respective computer system.

50. The computer program product according to claim 49 wherein the attributes comprise any one of:
background color, background images, shape of GUI image, location on the display, alpha blending of any attribute, alpha blending of a window, size of the container, size of an attribute, text font, text color, size of text, the z-order (is window topmost or not), the resizability of window, resizeability of features, the movability of the window, movability of features, the associated audio component, audio volume, audio looping, audio equalization, audio synthesized voice accent, audio speech rate, audio stereo/mono aspects, audio background music, audible animation, visual animation, audio/visual synchronization, inline binary data, computer program instructions, rich media content, instructions for displaying the GUI, GUI display location, GUI display size, GUI display shape or preferred input types, the preferred input types comprising any one of: keyboard, mouse, voice, biometric system, application program interface or network attached device.

51. The computer program product according to claim 49 wherein the functionality for said alert message comprises any one of:
removing the GUI image after a predetermined time, removing the GUI image unless a user takes an action within a predetermined time, moving the GUI image across a display when instantiating the GUI image, moving the GUI image across the display when removing the GUI image, saving a history of messages, saving active messages off screen, buttons, standard, check, radio, menus, toolbars, hyperlinks, tree, table, custom controls described by standard mark up language (e.g. XUL), a widget which is appropriate to the interaction requested by the alert message, a button widget to start poll, a widget which is appropriate to the modification of the alert content, a widget to translate text to or from languages, a widget which is appropriate to the interaction with the alert message content, a button widget to search text for keywords, a start/stop movie widget, a start/stop sound widget, zoom image, a widget which is appropriate to the modification of the alert message presentation, a slider widget to change value of font size, audible cue widget, audible cue widget for limited response vocabulary, limited response grammar, predefined sounds, a cue which is appropriate to the interaction requested by the alert message, a text cue to start a poll, a cue which is appropriate to the modification of the alert message content, a text cue to select a language in which to hear the alert message content, a cue which is appropriate to the interaction with the alert message content, a query keyword, a repeat message keyword, a cue which is appropriate to the modification of the alert message presentation or a combination of aural and visual elements.

52. The computer program product according to claim 49 wherein the content comprises any one of:
text, translated text, translated aural message, translated aural message according to location, translation of aural message according to local language, image, video, animation, sound, binary file, hyperlink to execute a file with an application, visual markup, synthesized voice or a combination of an aural and visual element.

53. The computer program product according to claim 49 wherein the message further comprises routing information for any one of forwarding or acknowledging the message.

54. The computer program product according to claim 49 each computer system in said group of computer systems is anonymous to the first computer system and the other computer systems in said group of computer systems, and the message is transmitted to the group by way of a pub/sub service.

55. The computer program product according to claim 49 wherein the message is any one of unsolicited by the second computer system, initiated by a program event or initiated by a user action, and said message includes instructions for a desired length of time said alert message is to be displayed.

56. A computer program product recorded on a non-transitory computer readable medium for presenting a message received from a first computer system for display on a second computer system, the computer program product comprising:
subscribing by said second computer system, to messages from said first computer system;
receiving the message from the first computer system at the second computer system wherein the message includes an alert message of an event wherein the event is external to the second computer system, said message including aspects of how the second computer system is to display the message, the display of the message under individual control of the second computer system:
decoding the message at the second computer system, the decoding resulting in a format suitable for processing on second computer system;
extracting said aspects including attributes, functionality and content from the message at the second computer system to instruct said second computer system how to display the user interactive GUI representation;
creating a user interactive GUI representation at the second computer system, the user interactive GUI representation comprising one or more user input functions, the user input function selectable by a user, the interactive GUI representation further comprising attributes, content and functionality defined by the extracted attributes, content and functionality of the message;
filtering the message by a filter in the second computer system, said filter for filtering for keywords of interest to the second computer system such that the message would have to contain the keywords of interest before the second computer system sees the message and messages not containing the keywords are blocked by said filter from being seen by said second computer system; and
displaying the user interactive GUI representation seen at the second computer system.

57. The computer program product according to claim 56 wherein the attributes comprise any one of:
background color, background images, shape of GUI image, location on the display, alpha blending of any attribute, alpha blending of a window, size of the container, size of an attribute, text font, text color, size of text, the z-order (is window topmost or not), the resizability of window, resizeability of features, the movability of the window, movability of features, the associated audio component, audio volume, audio looping, audio equalization, audio synthesized voice accent, audio speech rate, audio stereo/mono aspects, audio background music, audible animation, visual animation, audio/visual synchronization, inline binary data, computer program instructions, rich media content, instructions for displaying the GUI, GUI display location, GUI display size, GUI display shape or preferred input types, the preferred input types comprising any one of: keyboard, mouse, voice, biometric system, application program interface or network attached device.

58. The computer program product according to claim 56 wherein the functionality of said alert message comprises any one of:
removing the GUI image after a predetermined time, removing the GUI image unless a user takes an action within a predetermined time, moving the GUI image across a display when instantiating the GUI image, moving the GUI image across the display when removing the GUI image, saving a history of messages, saving active messages off screen, buttons, standard, check, radio, menus, toolbars, hyperlinks, tree, table, custom controls described by standard mark up language (e.g. XUL), a widget which is appropriate to the interaction requested by the alert message, a button widget to start poll, a widget which is appropriate to the modification of the alert content, a widget to translate text to or from languages, a widget which is appropriate to the interaction with the alert message content, a button widget to search text for keywords, a start/stop movie widget, a start/stop sound widget, zoom image, a widget which is appropriate to the modification of the alert message presentation, a slider widget to change value of font size, audible cue widget, audible cue widget for limited response vocabulary, limited response grammar, predefined sounds, a cue which is appropriate to the interaction requested by the alert message, a text cue to start a poll, a cue which is appropriate to the modification of the alert message content, a text cue to select a language in which to hear the alert message content, a cue which is appropriate to the interaction with the alert message content, a query keyword, a repeat message keyword, a cue which is appropriate to the modification of the alert message presentation or a combination of aural and visual elements.

59. The computer program product according to claim 56 wherein the content comprises any one of:
text, translated text, translated aural message, translated aural message according to location, translation of aural message according to local language, image, video, animation, sound, binary file, hyperlink to execute a file with an application, visual markup, synthesized voice or a combination of an aural and visual element.

60. The computer program product according to claim 56 wherein the second computer system is anonymous to the first computer system and the other computer systems, and the message is received by way of a pub/sub service.

61. The computer program product according to claim 56 wherein the message is any one of unsolicited by the first computer system, initiated by a program event or initiated by a user action, and said message includes instructions for a desired length of time said alert message is to be displayed.

62. The computer program product according to claim 56 wherein extracting content of the message comprises the further steps of:
identifying routing information.

63. The computer program product according to claim 62 comprising the further step of modifying the GUI based on the routing information.

64. The computer program product according to claim 56 comprising the further step of launching an application program according to attributes of the message content.

65. The computer program product according to claim 56 wherein the attributes comprise any one of inline binary data, computer program instructions, rich media content, instructions for displaying the GUI, GUI display, size or shape.

66. The computer program product according to claim 56 wherein the attributes identify preferred input types, the types comprising any one of keyboard, mouse, voice, biometric system, application program interface or network attached device.

67. The computer program product according to claim 56 wherein the GUI display is overridden by local GUI settings.

68. The computer program product according to claim 56 comprising the further step of saving the message in a list view, the list view comprising history of messages.

69. The computer program product according to claim 56 comprising the further step of pre-processing the message before the creating the GUI step.

70. The computer program product according to claim 69 wherein pre-processing comprises any one of:
highlighting words using a predefined list of keywords, highlighting proper nouns based on word pattern, linking proper nouns to resources containing more information pre-fetching content that is referenced by a URL, virus scanning the message, identifying SPAM, gathering, information of sender to display along with notification, identifying if the sender is currently online, identifying the sender's current location to facilitate time difference visuals, identifying the sender's attribute to facilitate contacting the sender, decrypting, verifying digital signature, decompression, decoding the message, mapping character, language translation, loading another program as part of notification event, validation of message format, translation of older message formats to newer message formats, logging the message, using the message content to generate statistics of types of content received, using the message content to generate and tweak SPAM identification heuristics, or charging either the sender or the receiver for the transaction.

71. The computer program product according to claim 56 comprising the further step of post-processing the message after the creating the step.

72. The computer program product according to claim 71 wherein post-processing comprises any one of:
compression for saving space in long term storage, encryption for secure storage, adding an event to calendar application, adding an event to to-do application, adding an event to history listing, using interaction data to derive "closeness", using interaction data to present visualization of social circles, logging the message, generating statistics of types of content received, generating SPAM identification heuristics or charging either the sender or the receiver for the transaction.

* * * * *